United States Patent
DeVaul et al.

(10) Patent No.: US 10,153,644 B2
(45) Date of Patent: Dec. 11, 2018

(54) DELIVERING AND NEGOTIATING WIRELESS POWER DELIVERY IN A MULTI-RECEIVER SYSTEM

(71) Applicant: X Development LLC, Mountain View, CA (US)

(72) Inventors: Richard Wayne DeVaul, Mountain View, CA (US); Brian John Adolf, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 209 days.

(21) Appl. No.: 14/941,017

(22) Filed: Nov. 13, 2015

(65) Prior Publication Data

US 2017/0141584 A1    May 18, 2017

(51) Int. Cl.
*H02J 5/00* (2016.01)
*H04W 76/14* (2018.01)
(Continued)

(52) U.S. Cl.
CPC .............. *H02J 5/005* (2013.01); *H02J 50/05* (2016.02); *H02J 50/12* (2016.02); *H02J 50/40* (2016.02); *H02J 50/80* (2016.02); *H04B 5/0012* (2013.01); *H04B 5/0037* (2013.01); *H04B 5/0075* (2013.01); *H04W 76/14* (2018.02)

(58) Field of Classification Search
None
See application file for complete search history.

(56) References Cited

U.S. PATENT DOCUMENTS 6,980,000 B2    12/2005    Wong et al.
8,143,746 B2    3/2012    Marzetta et al.
(Continued)

FOREIGN PATENT DOCUMENTS

WO    15/119458 A1    8/2015

OTHER PUBLICATIONS

Notice of Allowance dated Sep. 5, 2017 of U.S. Appl. No. 14/940,762, filed Nov. 13, 2015.
(Continued)

*Primary Examiner* — Cassandra Cox
(74) *Attorney, Agent, or Firm* — McDonnell Boehnen Hulbert & Berghoff LLP

(57) ABSTRACT

A transmitter includes a first resonator to generate an oscillating field at a resonant frequency in response to receiving power from a power source. The transmitter includes a first communication interface and a first controller to control the first resonator and to communicate data via the first communication interface. One of a plurality of receivers includes a second resonator to be wirelessly coupled to the first resonator. The second resonator resonates at the common mode resonant frequency in response to the oscillating field. The one receiver includes a second communication interface to establish wireless side-channel communications with the first communication interface and to communicate the data with the first communication interface via the wireless side-channel communications. The first controller identifies the one receiver from the plurality of receivers according to the communicated data, and in response, the first resonator transfers the power to the second resonator.

37 Claims, 26 Drawing Sheets

(51) Int. Cl.
*H04B 5/00* (2006.01)
*H02J 50/40* (2016.01)
*H02J 50/12* (2016.01)
*H02J 50/05* (2016.01)
*H02J 50/80* (2016.01)

(56) References Cited

U.S. PATENT DOCUMENTS

| | | | |
|---|---|---|---|
| 8,421,408 B2 | 4/2013 | Hamedi-Hagh et al. | |
| 8,461,719 B2 | 6/2013 | Kesler et al. | |
| 8,513,915 B2 | 8/2013 | Patel | |
| 8,754,548 B2 | 6/2014 | Hong et al. | |
| 8,824,588 B2 | 9/2014 | Emmanuel et al. | |
| 8,854,176 B2 | 10/2014 | Zeine | |
| 9,024,484 B2 | 5/2015 | Park et al. | |
| 9,106,203 B2 | 8/2015 | Kesler et al. | |
| 9,124,122 B2 | 9/2015 | Kim et al. | |
| 9,190,850 B2 | 11/2015 | Onizuka et al. | |
| 9,647,485 B2 * | 5/2017 | Kim | H02J 5/005 |
| 2008/0266007 A1 | 10/2008 | Tsai | |
| 2010/0259108 A1 | 10/2010 | Giler et al. | |
| 2011/0218014 A1 | 9/2011 | Abu-Qahouq | |
| 2011/0254377 A1 | 10/2011 | Wildmer et al. | |
| 2012/0086284 A1 | 4/2012 | Capanella et al. | |
| 2012/0153739 A1 | 6/2012 | Cooper et al. | |
| 2012/0222997 A1 | 9/2012 | Potucek et al. | |
| 2013/0002034 A1 | 1/2013 | Onizuka et al. | |
| 2013/0035126 A1 | 2/2013 | Kim et al. | |
| 2013/0049456 A1 * | 2/2013 | Kim | B60L 11/182 307/9.1 |
| 2013/0049475 A1 | 2/2013 | Kim et al. | |
| 2013/0132317 A1 | 5/2013 | Hinchey et al. | |
| 2013/0134793 A1 | 5/2013 | Ryu et al. | |
| 2013/0142230 A1 | 6/2013 | Chintala | |
| 2013/0221915 A1 | 8/2013 | Son et al. | |
| 2013/0300205 A1 | 11/2013 | Tzanidis et al. | |
| 2013/0307345 A1 | 11/2013 | Kobayashi | |
| 2013/0307468 A1 * | 11/2013 | Lee | H02J 7/0052 320/108 |
| 2014/0080409 A1 | 3/2014 | Frankland et al. | |
| 2014/0111151 A1 | 4/2014 | Keeling et al. | |
| 2014/0125145 A1 | 5/2014 | Bae | |
| 2014/0139034 A1 | 5/2014 | Sankar et al. | |
| 2014/0217967 A1 | 8/2014 | Zeine et al. | |
| 2014/0232331 A1 | 8/2014 | Stamenic et al. | |
| 2014/0273835 A1 | 9/2014 | Ghovanloo et al. | |
| 2014/0287681 A1 | 9/2014 | Ollikainen et al. | |
| 2014/0306654 A1 * | 10/2014 | Partovi | H02J 7/025 320/108 |
| 2014/0319926 A1 | 10/2014 | Jung | |
| 2014/0361628 A1 | 12/2014 | Huang et al. | |
| 2014/0371931 A1 | 12/2014 | Lin et al. | |
| 2014/0375256 A1 * | 12/2014 | Lee | H02J 7/025 320/108 |
| 2015/0051750 A1 | 2/2015 | Kurs et al. | |
| 2015/0077037 A1 | 3/2015 | Leabman et al. | |
| 2015/0091706 A1 | 4/2015 | Chemishkian et al. | |
| 2015/0097438 A1 * | 4/2015 | Aioanei | H02J 7/025 307/104 |
| 2015/0123402 A1 | 5/2015 | Wagoner et al. | |
| 2015/0123496 A1 | 5/2015 | Leabman et al. | |
| 2015/0137748 A1 * | 5/2015 | Kim | H02J 17/00 320/108 |
| 2015/0148955 A1 | 5/2015 | Chin et al. | |
| 2015/0171657 A1 | 6/2015 | Wheeland et al. | |
| 2016/0023557 A1 | 1/2016 | Dimke et al. | |
| 2016/0052415 A1 | 2/2016 | Bell et al. | |
| 2017/0141582 A1 | 5/2017 | Adolf et al. | |
| 2017/0141583 A1 | 5/2017 | Adolf et al. | |
| 2017/0141584 A1 * | 5/2017 | DeVaul | H02J 5/005 |
| 2017/0317529 A1 * | 11/2017 | Smith | H02J 50/10 |

OTHER PUBLICATIONS

International Search Report and Written Opinion of the International Searching Authority issued in co-pending International Application No. PCT/US2016/061360, ISA/KR, dated Mar. 6, 2017, 11 pages.

Mathew et al., "Multi-robot Rendezvous Planning for Recharging in Persistent Tasks", IEEE, Jan. 2013, 14 pages, DOI: 10.1109/TRO.2014.2380593.

Griffin, et al. "Resonant Wireless Power Transfer to Ground Sensors from a UAV," IEEE, May 2012, 6 pages, DOI: 10.1109/ICRA.2012.6225205.

International Search Report dated Feb. 20, 2017, issued in connection with International Application No. PCT/US2016/061569, filed Nov. 11, 2016, 5 pages.

Written Opinion of the International Searching Authority dated Feb. 20, 2017, issued in connection with International Application No. PCT/US2016/061569, filed Nov. 11, 2016, 6 pages.

International Search Report dated Mar. 8, 2017, issued in connection with International Application No. PCT/US2016/061560, filed Nov. 11, 2016, 3 pages.

Written Opinion of the International Searching Authority dated Mar. 8, 2017, issued in connection with International Application No. PCT/US2016/061560, filed Nov. 11, 2016, 7 pages.

* cited by examiner

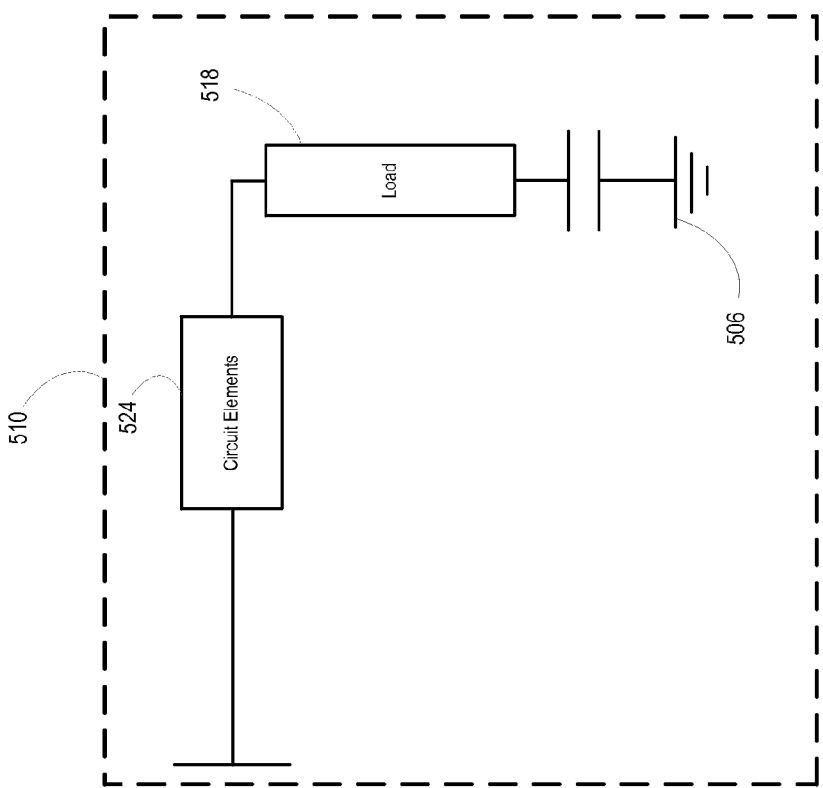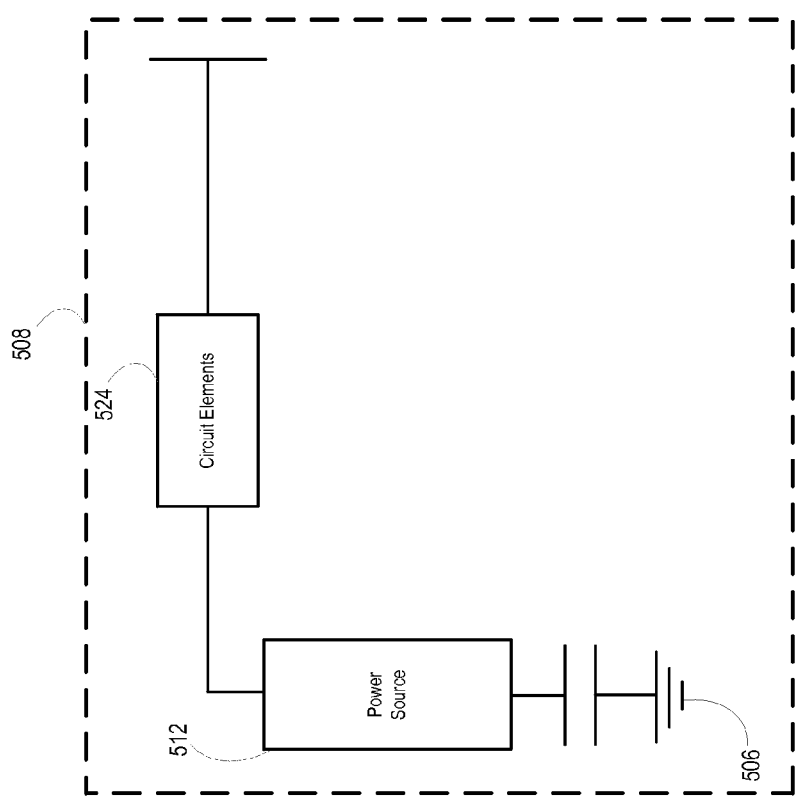
FIG. 5C

| Operational States | Common Mode (Capacitive) | Differential Mode (Capacitive) | Inductive Mode |
|---|---|---|---|
| Operational State 1 | ON | OFF | OFF |
| Operational State 2 | OFF | ON | OFF |
| Operational State 3 | OFF | OFF | ON |
| Operational State 4 | ON | ON | OFF |
| Operational State 5 | OFF | ON | ON |
| Operational State 6 | ON | OFF | ON |
| Operational State 7 | ON | ON | ON |
| Operational State 8 | OFF | OFF | OFF |

FIG. 8

DELIVERING AND NEGOTIATING WIRELESS POWER DELIVERY IN A MULTI-RECEIVER SYSTEM

BACKGROUND

Unless otherwise indicated herein, the materials described in this section are not prior art to the claims in this application and are not admitted to be prior art by inclusion in this section.

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay connected to a power source via wires. Thus, electronic devices may use batteries to supply electric power when a device is not coupled to a fixed power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged. Also, as the number of devices connected to a charging source increases, the number of wires in the proximity of an electrical outlet may increase, causing "cord clutter."

SUMMARY

Because of limitations in wired delivery of power, solutions for wireless power delivery are desirable. Some example systems disclosed herein use resonating elements, such as inductors and capacitors, to generate and couple with resonating magnetic and/or electric fields. Such systems may include a resonating element in a transmitter, and a resonating element in one or more receivers. Further, such systems may use the resonating element in the transmitter to generate a resonating field, and may use the resonating element in a receiver to couple with the resonating field. As such, some example systems may allow for wireless power delivery from a transmitter to a receiver via the resonating field.

In one aspect, a system for wireless power transfer includes a transmitter. The transmitter includes a first resonator configured to receive power from a power source and to transfer the power. The first resonator includes at least a first common mode capacitor formed between a first common mode conductor and ground. The first common mode capacitor is configured to generate a common mode oscillating field at a common mode resonant frequency in response to receiving the power from the power source. The system includes a first communication interface. The system includes a first controller configured to control the first resonator and to communicate data via the first communication interface. The system includes a plurality of receivers. One of the receivers includes a second resonator configured to be wirelessly coupled to the first resonator to receive the power from the first resonator. The second resonator includes at least a second common mode capacitor formed between a second common mode conductor and ground. The second common mode capacitor is configured to resonate at the common mode resonant frequency in response to the common mode oscillating field generated by the first common mode capacitor. The system includes a second communication interface configured to establish wireless side-channel communications with the first communication interface and to communicate the data with the first communication interface via the wireless side-channel communications. The first controller is further configured to identify the one receiver from the plurality of receivers according to the data communicated via the wireless side-channel communications. Upon identifying the one receiver, the first controller is further configured to cause the first resonator to transfer the power to the second resonator.

In another aspect, a transmitter for wireless power transfer includes a first resonator configured to receive power from a power source and to transfer the power. The first resonator includes at least a first common mode capacitor formed between a first common mode conductor and ground. The first common mode capacitor is configured to generate a common mode oscillating field at a common mode resonant frequency in response to receiving the power from the power source. The first resonator is further configured to be wirelessly coupled to a second resonator of a receiver to provide the power to the second resonator. The second resonator includes at least a second common mode capacitor formed between a second common mode conductor and ground. The second common mode capacitor is configured to resonate at the common mode resonant frequency in response to the common mode oscillating field generated by the first common mode capacitor. The transmitter includes a first communication interface configured to establish wireless side-channel communications with a second communication interface of the receiver and to communicate data with the receiver via the wireless side-channel communications. The transmitter includes a first controller configured to identify the receiver from a plurality of receivers according to the data communicated via the wireless side-channel communications. Upon identifying the receiver, the first controller is further configured to cause the first resonator to transfer the power to the second resonator.

In yet another aspect, a receiver for wireless power transfer includes a second resonator configured to be wirelessly coupled to a first resonator of a transmitter to receive power from the first resonator. The first resonator includes at least a first common mode capacitor formed between a first common mode conductor and ground. The first common mode capacitor is configured to generate a common mode oscillating field at a common mode resonant frequency in response to receiving the power from the power source. The second resonator includes at least a second common mode capacitor formed between a second common mode conductor and ground, the second common mode capacitor configured to resonate at the common mode resonant frequency in response to the common mode oscillating field generated by the first common mode capacitor. The receiver includes a second communication interface configured to establish wireless side-channel communications with a first communication interface of the transmitter and to communicate data with the transmitter via the wireless side-channel communications. The data communicated via the wireless side-channel communications identifies the receiver from a plurality of receivers for transfer of the power from the first resonator to the second resonator.

BRIEF DESCRIPTION OF THE DRAWINGS

FIG. 5A to 5C illustrate a simplified circuit diagram of common mode capacitive resonant coupling, according to an example embodiment.

FIG. 8 is a table illustrating modes of operation of a system, according to an example embodiment.

DETAILED DESCRIPTION

Figure 1:
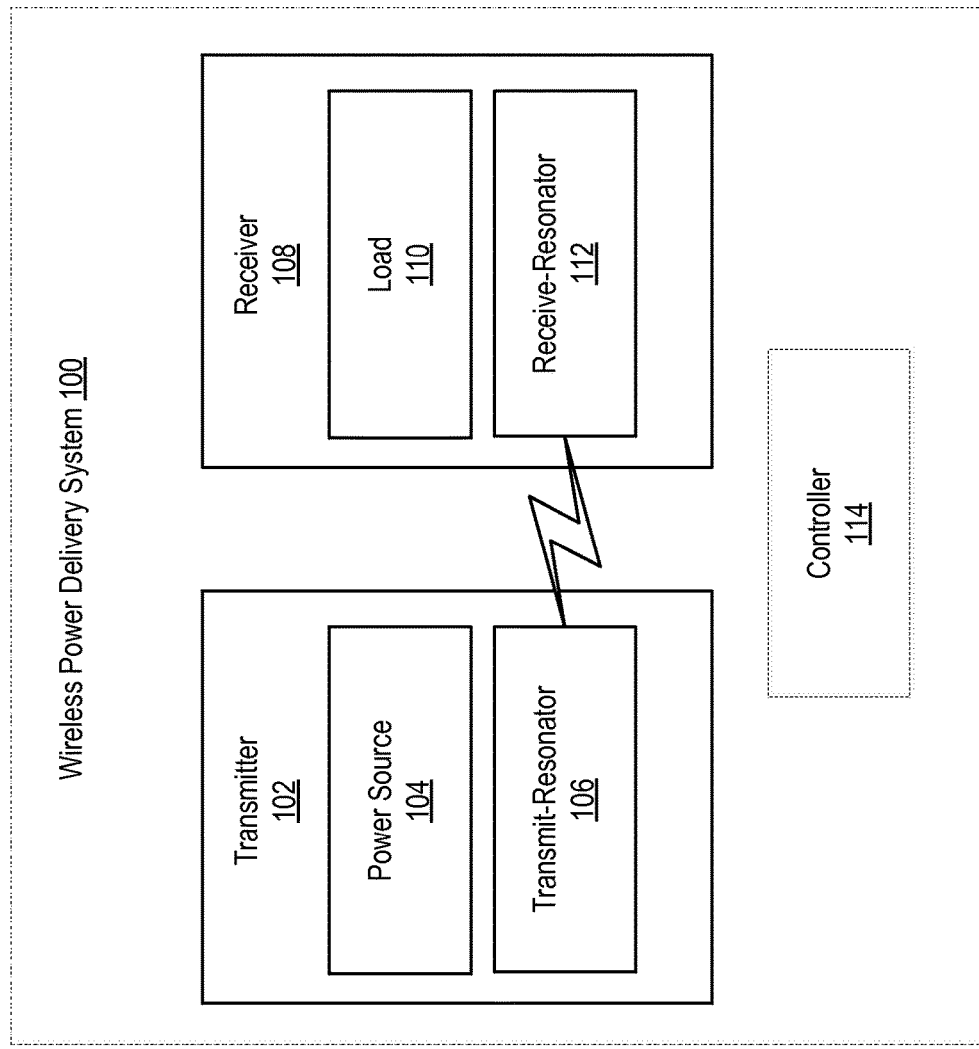
FIG. 1 is a functional block diagram illustrating the components of a wireless power delivery system, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Furthermore, the term "capacitor" as used herein should be understood broadly as any system, including one or more elements, with a capacitive property. As such, the term "capacitor" may be used to refer to a lumped capacitive element and/or to a distributed capacitive element. Similarly, the term "inductor" as used herein should be understood broadly as any system, including one or more elements, with an inductive property. As such, the term "inductor" may be used to refer to a lumped inductive element and/or to a distributed inductive element.

I. Overview

Wireless power transfer involves the transmission of electrical power from a power source to a receiver without coupling the receiver to the power source with solid conductors (e.g., wires). Some conventional wireless power delivery systems may include a transmitter and a receiver that are inductively coupled via an oscillating magnetic field. For instance, a power signal from a power source may be delivered to a transmit-coil in a transmitter to create an oscillating magnetic field. This oscillating magnetic field passes through a receive-coil in a receiver and induces AC to flow in the receiver and to a load. The magnitude of coupling between the transmitter and the receiver can be represented by a coupling factor k, a dimensionless parameter representing the fraction of flux coupling the transmitter and the receiver. In order to establish efficient power transfer in such conventional systems, the coupling factor k must be maintained at a sufficiently high level. Accordingly, the receiver coil usually needs to be located in close proximity to, and precisely positioned relative to, the transmitter coil. In addition, large transmitter and receiver coils may be necessary in order to ensure sufficient coupling and to achieve reasonably efficient power transfer.

Systems, devices, and methods disclosed herein relate to wireless power delivery systems that utilize resonant coupling to transfer power efficiently from a transmitter to a receiver. Such systems and methods may have less stringent proximity and/or positional requirements as compared to conventional inductively-coupled wireless power systems. That is, systems and methods disclosed herein may provide efficient wireless power transfer even when the coupling factor k is small. Specifically, in accordance with example embodiments, power may be transferred between a resonantly-coupled transmitter and receiver via an oscillating field generated by the transmitter. The oscillating field may include an oscillating magnetic field component and/or an oscillating electric field component.

In example systems, the transmitter may include a transmit-resonator and the receiver may include a receive-resonator. A resonator, such as the transmit-resonator or the receive-resonator can be characterized by one or more resonant frequencies, among other factors. In particular, a transmit-resonator and a corresponding receive-resonator may be configured to resonate at a common resonant frequency. When resonating, the receive-resonator may produce an output signal oscillating at the resonant frequency. The output signal may then be rectified or otherwise converted to electrical power, which can be delivered to a load.

An oscillating electric and/or magnetic field may be described by its resonant frequency, $\omega_0$. Such fields have a resonant wavelength $$\lambda_0 = \frac{2\pi c}{\omega_0},$$

where c is the speed of light in the medium through which the field is transmitted. The region within approximately one resonant wavelength from the resonator may be termed the "near field." The electric and/or magnetic field in the near field is predominantly non-radiative. Optionally, the near field may be considered the field that is at or below distances shorter than the $3*\lambda$, where $\lambda$ is a wavelength of the transmitted signal. Further, a field strength of the near field decays very rapidly with distance. The region beyond approximately one or a few resonant wavelengths from the resonator is known as the "far field." The far field is almost exclusively radiative (e.g., RF radiation), and can be described as the region beyond the $3*\lambda$ distance.

A resonator, such as the transmit-resonator and the receive-resonator, may be characterized in terms of an intrinsic loss rate $\Gamma$, which is a metric of energy dissipated over resonant cycles. The ratio $$Q = \frac{\omega_0}{2\Gamma},$$

defines a quality factor for the resonator expressed in terms of energy loss per cycle. A resonator that dissipates a smaller amount of energy per cycle generally has a higher quality factor Q. A system with a high quality factor Q (e.g., above 100) may be considered to be highly resonant.

Resonant systems with high-Q resonators may be operable to transfer power with high efficiency, even in situations where there may be weak coupling between the transmit-resonator and receive-resonator. That is, systems with a low coupling factor k (e.g., k=0.1) may still transfer power with high efficiency by employing resonators with sufficiently high quality factor Q (e.g., Q>100), because the power transfer efficiency is a function of the quality factor Q and the coupling factor k. Accordingly, highly resonant systems may be operable to wirelessly transfer power over a long range. Furthermore, in some embodiments, resonant systems may achieve greater efficiencies than systems employing wired power transfer.

As described above, to transfer power, transmit-resonators and receive-resonators may be coupled via an oscillating magnetic field and/or an oscillating electric field. Accordingly, example embodiments may be operable using any one or more of three coupling modes at any given time: (i) inductive mode, (ii) differential capacitive mode, and (iii) common capacitive mode.

In inductive mode, at least one inductor of the transmit-resonator receives a signal from the power source and resonates to generate a magnetic field that oscillates at a resonant frequency $\omega_0$. In such a scenario, at least one inductor of the receive-resonator may oscillate in response to being in proximity to the magnetic field. In differential capacitive mode, each capacitor of the transmit-resonator and the receive-resonator develops capacitance between two conductors. In common capacitive mode, each capacitor of the transmit-resonator and the receive-resonator develops a capacitance between a first conductor and a ground or common conductor. In common capacitive mode, the ground or common conductor may include an earth connection. In other words, the ground or common conductor may include an electrical connection to the earth's potential. The electrical connection may be a physical connection (e.g., using a metal stake), or may be a capacitive connection to the earth's potential. The transmitter may include a controller to determine whether and when to deliver power via inductive mode, differential capacitive mode, and/or common capacitive mode and to control various elements of the transmitter accordingly.

In resonant wireless power transfer, higher efficiencies may be achieved by dynamically adjusting impedances (resistance and/or reactance) on the transmitting side and/or the receiving side. For instance, the transmitter may include an impedance matching network coupled to the transmit-resonator. The impedance matching network on the transmitting side may be controlled so as to continually or intermittently adjust the impedance of the transmitter and associated elements. Similarly, the receiver may include an impedance matching network coupled to the receive-resonator. The impedance matching network on the receiving side may be controlled so as to continually or intermittently adjust the impedance of the receiver and associated elements.

In an example embodiment, the controller may carry out operations to create a circuit model based on a transmit-receive circuit associated with the transmitter and the receiver. Using this transmit-receive circuit, the coupling factor k can also be calculated. Because the impedance associated with the receiver can be calculated from the reflected power received via the bidirectional RF coupler, the only remaining unknown in the circuit model is the coupling factor k for the transmitter and the receiver. The circuit model determines a specific relationship between the coupling factor k and the impedance of the receiver. By determining the coupling coefficient k, an optimally efficient condition for the power transfer may be calculated or otherwise determined. The impedance(s) on the transmitting and/or receiving sides can be adjusted via the respective impedance matching networks so as to achieve and/or maintain the optimally efficient condition. In particular, dynamic impedance adjustment may be employed as the coupling between the transmit-resonator and the receive-resonator changes when the orientation and spatial relationship between the receiver and the transmitter changes.

In some wireless power delivery systems described herein, the transmitter may be operable to transfer power to any of a plurality of receivers. As many devices may be positioned within range of the transmitter for wireless power transfer, the transmitter may be configured to distinguish legitimate receivers from illegitimate devices that are not intended recipients of power transfer. These illegitimate devices may otherwise act as parasitic loads by receiving power from the transmitter without permission. Thus, prior to transferring power to a respective receiver, the transmitter may carry out an authentication process to authenticate the receiver. The authentication process may be conducted, at least in part, over a wireless side-channel communication link that establishes a secondary channel between the transmitter and the receiver, separate from the resonant power link. Alternatively or additionally, the transmitter may employ time-division and/or frequency-division multiplexing to transfer power to a plurality of legitimate receivers respectively.

In accordance with example embodiments, the resonant wireless power delivery system may include one or more resonant repeaters configured to spatially extend the near-field region of the oscillating field. Such resonant repeaters may be passive, in the sense that they may be powered only by the near field in which they are positioned. A plurality of repeaters may be configured in a chain-like configuration (e.g., a "daisy-chain"), to extend the transmitter near field, such that each subsequent repeater in the chain resonantly repeats the near field of an earlier link in the resonant repeater chain. The spacing between repeaters and/or between a transmitter and a repeater may be limited by decay of the near field from one repeater to the next. Furthermore, a maximum distance to which the transmitter near field may be extended may be limited due to an accumulated phase shift across chained repeaters.

In accordance with example embodiments, both the maximum repeater spacing limitation and the accumulated phase shift limitations may be overcome by including additional capabilities in the repeaters. First, by using active repeaters that each include an independent power source, the active repeaters can "inject" additional power into the repeated fields, and thereby mitigate decay of the near field that may otherwise occur. Second, cumulative phase delay across a chain or array of repeaters may be suppressed or eliminated by including one or more phase adjustment elements in some or all of the repeaters. Additionally or alternatively, phase control may be introduced in repeaters by means of metamaterials. Furthermore, phase control of repeaters may be implemented such that the transmitter and active repeaters behave together as a collective metamaterial.

In accordance with example embodiments, a wireless power delivery system may utilize test signals to probe physical properties of system components and/or wireless power transmission paths between system components. More particularly, a transmitter may include a signal generator, or the like, configured to transmit or broadcast one or more types of wireless signals across the region in which wireless power transfer may occur. Such signals may be reflected by one or more reflecting entities (e.g., receivers, repeaters, etc.), and their reflection may then be received by a test-signal receiver of the transmitter. By analyzing phase and amplitude information of transmitted signals and their reflections, the transmitter may thus determine electrical properties of a reflecting entity, as well as of the transmission path between the transmitter and the reflecting entity. Utilization of the test signal in such a manner may provide diagnostic capabilities similar to that of a vector network analyzer (VNA), as applied to a wireless power delivery system.

In an example system, test signals can span a broad frequency range to provide a frequency sweep, in a manner like that of a VNA frequency sweep. Analysis of such a frequency sweep may then be performed to determine an impedance of one or more receivers, a number of repeaters between the transmitter and a given receiver, a relative location of the transmitter and the given receiver, and a characteristic impedance of a wireless transmission path, among other properties of the system. This information can be used, in turn, to enhance the accuracy of power delivery, and to distinguish between legitimate receivers and possible unauthorized receivers and/or parasitic devices. In other instances, test signals can be generated as pulses or chirps, being more narrowband in frequency and or time. Analysis of reflections of such pulse signals may then be used in ranging applications, for example.

In some scenarios, a device may need wireless power-delivery while the device is out of range of a fixed resonant wireless power source. In some cases, it may be impractical or difficult to provide a fixed transmitter in a location where devices need to operate. Examples include field devices, such as mobile delivery/transportation vehicles, remote communication equipment, and clusters of devices in remote locations where fixed power sources are not available.

In accordance with example embodiments, a system for resonant wireless power delivery may include a mobile node or device that is a hybrid transmitter/receiver (TX/RX) configured to move, travel, and/or "commute" to remote receivers and deliver power wirelessly. In an example system, a hybrid TX/RX device can include a transmitter component (TX) having functionality of a transmitter, a receiver (RX) component having functionality of a receiver, and a power store for storing power (e.g., a battery) for supply to receivers. The power store may also serve as a power supply for various functions of the hybrid TX/RX device including, but not limited to, mobility (commuting), communications, control, and processing. The TX/RX device may take the form of an autonomous unmanned vehicle. In such a scenario, the autonomous unmanned vehicle may be operable to travel between a fixed transmitters and one or more specified locations that may be host to one or more remote receivers. In the location of the one or more remote receivers, the TX component may be operable to wirelessly transfer power from the power store to the one or more remote receivers. While proximate to the location of the fixed transmitter, the RX component may be configured to receive power via wireless power transfer, and to use the received power to at least partially replenish (e.g., refill and/or recharge) its power store.

II. Example Systems and Operation

An example system 100 for wireless transfer of power is shown in FIG. 1. The system 100 may include various subsystems, elements, and components as described below. One or more subsystems may include a controller configured to carry out one or more of a variety of operations. In accordance with example embodiments, a controller may include one or more processors, memory, and machine language instructions stored in the memory that when executed by the one or more processors cause the controller to carry one or more of its controlling functions or operations. A controller may also include one or more interfaces for device control, communications, etc.

In further accordance with example embodiments, various functions and operations described below may be defined as methods that may be carried within the system, where at least some aspects of the methods can be implemented based on functions and/or operations carried out by one or more controllers and/or one or more of processors. Other aspects of the methods may be carried out by other elements or components of the system, under control of one or another controller, in response to environmental factors, or in response to receiving or detecting a signal, for example.

In an example embodiment, a wireless power delivery system may include a power source configured to wirelessly deliver power to a load via a transmitter and a receiver. As shown in FIG. 1, system 100 may include a transmitter 102 and a receiver 108, both of which may be considered subsystems of system 100, and a controller 114. For the sake of brevity in FIG. 1 and elsewhere herein, control functions and operations are generally described as being carried out only by the controller 114. Thus, controller 114 may be viewed conceptually as a unified control function. It should be understood, however, that as subsystems of system 100, the transmitter 102 and receiver 108 may each include its own controller, as described elsewhere herein. Alternatively or additionally, the controller 114 may include a distributed computing system, e.g., a mesh network.

As such, the various control functions and operations attributed to controller 114 may be implemented across one or more controllers, such as ones included (but not shown) in transmitter 102 and receiver 108. For example, an operation described as being carried out by the transmitter could be done so under control of a controller in the transmitter. Similarly, an operation described as being carried out by the receiver could be done so under control of a controller in the receiver.

In addition to each of the transmitter 102 and receiver 108 possibly including its own controller, each of them may also include and/be constructed of various types of electrical components. For example, electrical components may include circuit elements such as inverters, varactors, amplifiers, rectifiers, transistors, switches, relays, capacitors, inductors, diodes, transmission lines, resonant cavities, and conductors. Furthermore, the electrical components may be arranged in any viable electrical configuration, such as lumped or distributed.

Returning to FIG. 1, the transmitter 102 of system 100 may include a transmit-resonator 106. The transmit-resonator 106 may have a high Q value and may be configured to resonate at one or more resonant frequencies. Transmitter 102 may be coupled with power source 104, which may be configured to supply transmit-resonator 106 with a signal oscillating at one of the transmit-resonator resonant frequencies. In an example, the power source 104 may include a power oscillator to generate the oscillating signal, which may be oscillating at one of the transmit-resonator resonant frequencies. The power oscillator may be powered by a power signal received from an electrical outlet. For example, the electrical outlet may supply the power source 104 with an AC voltage of 120 V at a frequency of 60 Hz. In other examples, the power source may include a converter that may use a power from a power signal, which may have a low-frequency (i.e. 60/50 Hz), to generate a carrier signal that has an oscillation frequency of one of the transmit-resonant frequencies. The carrier signal may be modulated to carry the power signal and may thus be the oscillating signal supplied by the power source 104.

Furthermore, the resonant frequency $\omega_0$ that the signal may oscillate at, also called the system resonant frequency, may be chosen by controller 114 of system 100. Transmit-resonator 106 may resonate, upon receiving the oscillating signal from source 104, and consequently, may generate a field oscillating at the system resonant frequency.

Receiver 108 may include a receive-resonator 112. The receive-resonator 112 may have a high Q value and may also be configured to resonate at the system resonant frequency. The receiver 108 may also include a load 110. Thus, if receive-resonator 112 is in the range of the oscillating field (i.e. the field penetrates receive-resonator 112), resonator 112 may wirelessly couple with the oscillating field, thereby resonantly coupling with transmit-resonator 106. Receive-resonator 112, while resonating, may generate a signal that may be delivered to the load 110. Note that in the implementation where the oscillating signal generated by the power source 104 is a modulated carrier signal (generated by a converter), the receiver 108 may include a filter network. The filter network may be used to isolate the power signal from the modulated carrier signal. The power signal (i.e. 50/60 Hz signal) may then be delivered to the load 110.

In example systems, there may be more than one receiver. This is described below in further detail.

Figure 2:
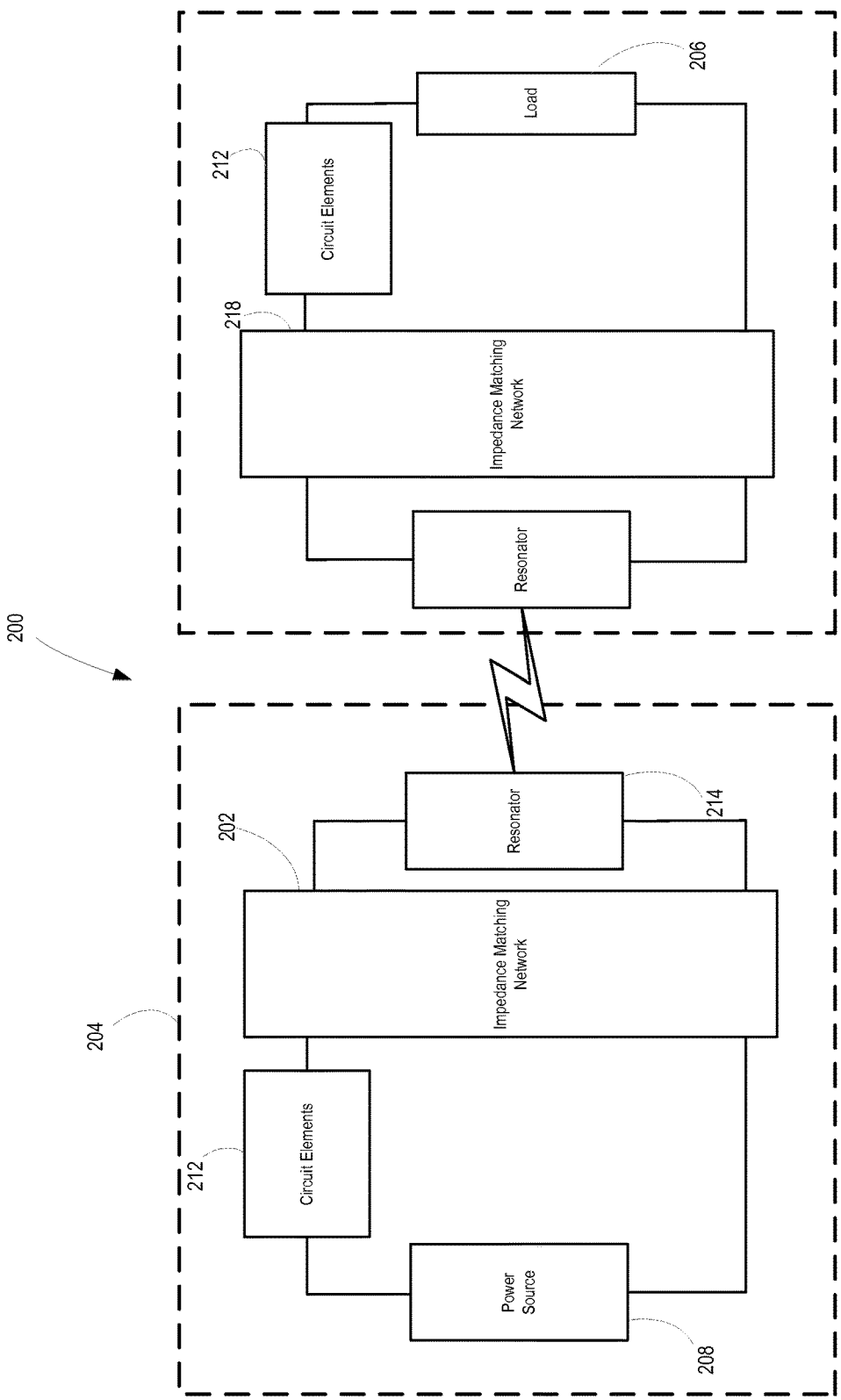
FIG. 2 is a functional block diagram illustrating an impedance matching circuit coupled to a transmitter, according to an example embodiment.

Wireless power delivery systems may include at least one impedance matching network configured to increase the efficiency of wireless power transfer. FIG. 2 illustrates an impedance matching network in a system, according to an exemplary embodiment. As illustrated in FIG. 2, the impedance matching network 202 is coupled to the transmitter 204. Further, the impedance matching network 202 may be in series, parallel, or in any other configuration with the transmit-resonator 214. In some embodiments, an impedance matching network 218 may additionally and/or alternatively be coupled to the receiver. Furthermore, the impedance matching networks 202 and 218 may each include any combination of L matching networks, pi networks, T networks, and/or multi-section matching networks.

In some embodiments, the system may deliver a determined power to the load by configuring an impedance matching network to match determined impedance. Within examples, a controller of the system may determine a power to deliver from the transmitter to the load. The controller may use at least the reflected impedance, from the load to the transmitter, to determine the impedance that the impedance matching network(s) may be configured to match. Accordingly, the system may deliver the determined power to the load when the impedance matching network matches the determined impedance.

More specifically, the controller of the system may generate a model, such as a SPICE model, of the system to determine the impedance that the impedance matching network may match. The model may include known values such as the actual impedance of the load, which the controller may receive from the receiver using methods described herein. However, the controller may need to determine the actual power supplied to the load from the transmitter and the reflected impedance, from the load to the transmitter, in order to fully characterize the model of the system (e.g. to derive the coupling factor k). The controller may use the fully characterized model of the system to dynamically impedance match by precisely determining the impedance that the impedance matching circuit may match.

Therefore, the system may include a bidirectional coupler, which may be used to determine the actual power supplied to the load from the transmitter and the reflected impedance from the load to the transmitter. The bidirectional coupler may be used in conjunction with a computer and/or a controller to precisely solve for an impedance of the load connected to it. The bidirectional coupler may also be used, in conjunction with a computer and/or a controller, to precisely solve for the amount power leaving the power source. The value of the reflected impedance of a load and the amount power leaving the source may be used to adjust the impedance matching network. Accordingly, the system may be configured to dynamically impedance match in a single step by using the bidirectional coupler to determine the actual power supplied by the source and the reflected impedance from the load to the transmitter.

However, the value of the reflected impedance from the load may change due to different factors, such as a change in the coupling between a transmitter and a receiver. The coupling between a transmitter and a receiver may change due to various factors, such as a change in the distance between the transmitter and the receiver.

For example, the receiver may move during power transfer, which may change the coupling between the transmitter and the receiver. Such relative movement may change the reflected impedance of the load. Accordingly, as the reflected impedance from the load to the transmitter changes, the controller may be configured to continuously or intermittently solve for the actual power delivered to the load and the reflected load impedance, in order to dynamically impedance match.

Figure 3:
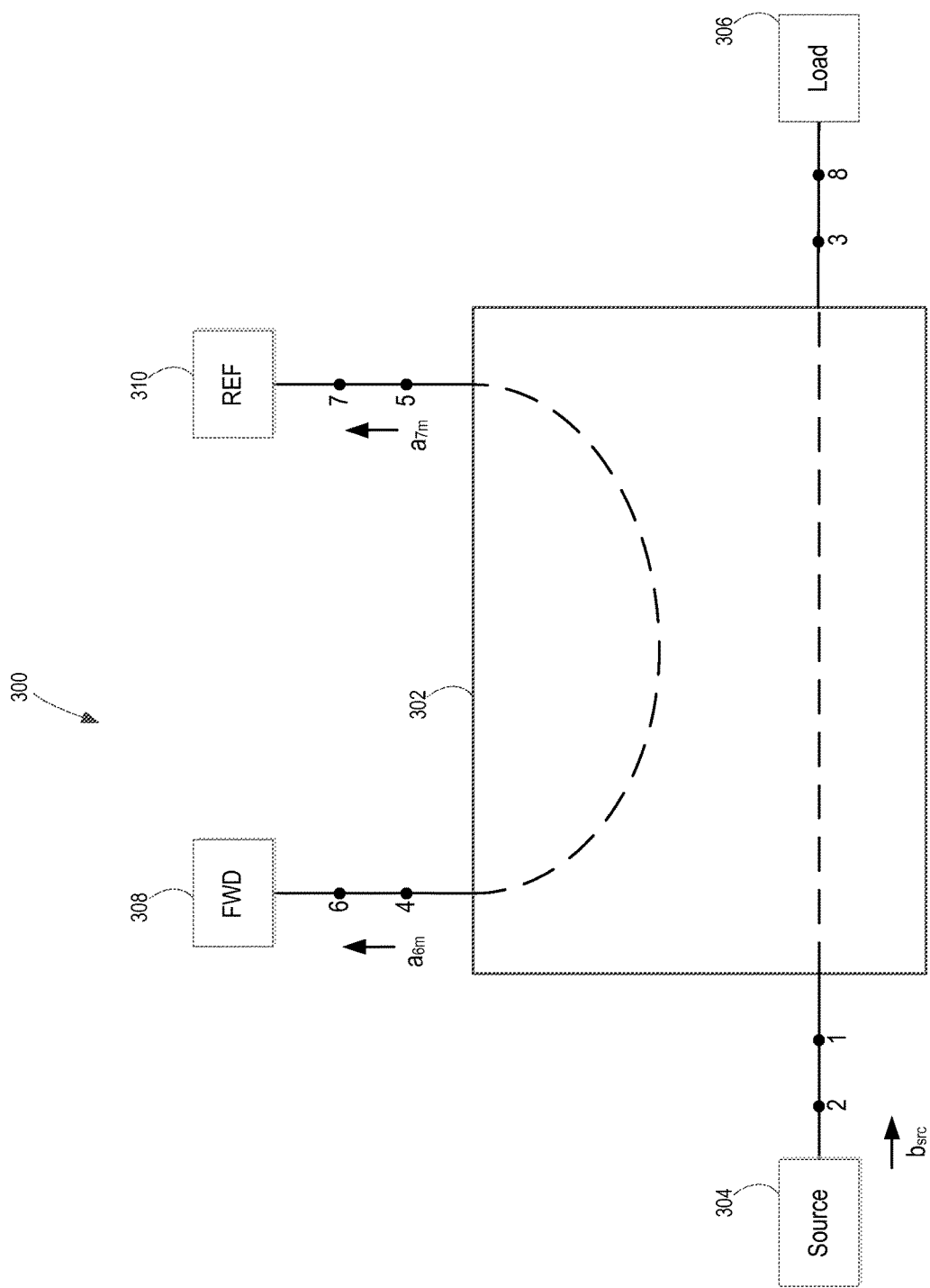
FIG. 3 is a diagram illustrating a representation of a bidirectional coupler used in a mathematical derivation, according to an example embodiment.

FIG. 3 illustrates a network representation of a system, including the bidirectional coupler 302 that is coupled in cascade between a power source 304 and a load 306, according to an exemplary embodiment. As illustrated in FIG. 3, the bidirectional coupler may be coupled between the power source at port 2 and the rest of the system (lumped into load 306) at port 8. Generally, there may be forward and reflected power waves at each port of the bidirectional coupler (ports 1, 3, 4, and 5).

The forward and reflected waves, and thus the power and impedance, at each port, may be precisely determined by fully characterizing the RF properties of the bidirectional coupler. For instance, a mathematical relationship between the incoming and outgoing waves on each of the bidirectional coupler 302's ports may be used to precisely calculate the power delivered to the load 306 and the load 306's reflected impedance back to the source 304. The mathematical relationship may use an S-parameter characterization of the bidirectional coupler 302 to relate between the incoming and outgoing waves on each of the bidirectional coupler 302's ports.

The bidirectional coupler 302 may operate by coupling forward power from port 1 to port 3. An attenuated forward power may be coupled to port 4 and sampled at measurement FWD port 6. Additionally, a small amount of forward power may also be coupled into port 5 and measured at REF port 7.

Likewise, reflected power is coupled from port 3 to port 1, and an attenuated power may be coupled to port 5 and sampled at measurement REF port 7. Additionally, a small amount of reflected power may be coupled into port 4 and measured at FWD port 6. Despite these non-idealities, of the forward power coupling to port 5 and the reflected power coupling to port 4, a computer and/or a controller may precisely calculate the power delivered to the load 306 and the load 306's reflected impedance.

The premeasured values of the mathematical relationship (A) may include the 4×4 S-parameter matrix and the input reflection coefficient, an S-parameter, of power source 302. Further, the non-idealities in the operation of the bidirectional coupler may be accounted for by premeasuring the 4×4 S-parameter matrix of the bidirectional coupler 302. In some embodiments, the S-parameters may be premeasured using a vector network analyzer (VNA). The measured S-parameters may be stored in a lookup table that a controller of system 300 may have access to.

Further, as explained above, the bidirectional coupler 302 may be used to periodically make real-time measurements of waves that may be used to solve for the power delivered to the load 306 and the load 306's reflected impedance. Specifically, in order to precisely calculate the power delivered to the load 306 and the load 306's reflected impedance, both the absolute magnitude of the power signals at ports 6 and 7 may be measured along with the phase of each signal with respect to the other. FWD and REF may include any measurement device or circuitry capable of measuring signals, e.g., an ammeter, a voltmeter, a spectrum analyzer, etc. Furthermore, FWD and REF may send information indicative of the respective measured signals to the controller of the system.

Furthermore, certain configurations of network 300 may simplify the S-parameter characterization of the bidirectional coupler 302. By design, FWD 308 and REF 310 may be impedance matched to the transmission line that carries the signals to each port to prevent signals from reflecting when measured at each port. For example, FWD port 308 and REF port 310 may be 50Ω terminated when a transmission line that has characteristic impedance ($Z_O$) of 50Ω is used to carry the signal to each port.

Accordingly, a controller of a wireless power delivery system may use a bidirectional coupler to solve for the reflected impedance of the load and the power delivered to the load. The system may use the solved for values in the model of the system to fully characterize the system. As such, at least the coupling factor k may be calculated. Further, the controller may use the model of the system to predict the amount of power that may be delivered to a load by adjusting the impedance that the impedance matching circuit may match.

Further, the controller may periodically measure the reflected impedance of the load and the power delivered to the load, according to a predetermined time period, which may range from microseconds to tens of seconds in length. After each measurement, the controller may periodically adjust at least one impedance matching network of the system. In an example, a controller may measure the reflected impedance and may accordingly adjust an impedance matching network every millisecond using the method described above. Other time intervals are possible. Alternatively, the controller may measure the reflected impedance of the load and the power delivered to the load continuously. In such a scenario, the controller may continuously adjust an impedance matching network of the system to deliver a determined power to the load.

In some embodiments, the wireless power delivery system may include a plurality of receivers coupled to a single transmitter with a single bidirectional coupler. In such a scenario, each receiver may reflect a signal to the transmitter due to a possible impedance mismatch at each load coupled to each receiver. The controller may use the measured values to fully characterize the system in order to determine an impedance that the impedance matching network may match.

In some embodiments, a plurality of receivers may be coupled to a single bidirectional coupler. The bidirectional coupler may use time-division multiplexing (TDM) to send the reflected signal of each receiver to the measurement device during a given interval of time. The controller may then use the method described above to solve for the reflected impedance of each load coupled to each respective receiver.

The controller of the system may adjust at least one impedance matching circuit based on the measured values. In an example embodiment, a system with a plurality of receivers may include an impedance matching network coupled to the transmitter and/or to each of the receivers. However, as the transmitter may receive different reflected impedances from each load, it may not be possible for the controller to adjust the impedance matching network to simultaneously match the reflected impedance of each receiver and the impedance of the power source. Accordingly, in some embodiments, the controller may adjust at least one impedance matching network of the impedance matching networks coupled to each of the receivers. In other embodiments, the controller may adjust the impedance matching network, coupled to the transmitter, to match the reflected impedance of a selected receiver from the plurality of receivers. As such, the selected receiver, whose reflected impedance was matched at the impedance matching network, may proportionately receive more power than the other receivers in the system. In some embodiments, wireless power delivery to the selected receiver may be more efficient than such power delivery to other receivers of the plurality of receivers.

In other examples, a system with a plurality of receivers may perform impedance matching according to time-division (TDM) and/or frequency-division (FDM) multiplexing. For instance, in a TDM scheme, each receiver may be configured to couple to the transmitter with a single impedance matching network during a specific time interval. The system may receive a reflected signal from a receiver during the specific time interval that the receiver is coupled to the transmitter. In such a scenario, the controller may adjust the impedance matching network such that each receiver may receive maximum power during the interval that the receiver is coupled to the transmitter. In an example embodiment, each receiver of the plurality of receivers may be assigned a respective time slot according to a receiver priority or a receiver order. The time slots may be equal in duration, but need not be equal. For example, receivers with higher receiver priority may be assigned to longer time slots than those receivers with a lower receiver priority.

In a FDM scheme, each receiver may be configured to couple to the transmitter with on a specific respective frequency. The system may receive a respective reflected signal from each receiver on the specific frequency that the receiver is coupled to the transmitter on. In such a scenario, the controller may adjust the impedance matching network(s), which may be connected to the transmitter and/or to each of the receivers, such that each receiver may receive a determined amount of power.

In yet another example of a system with a plurality of receivers, a controller may determine the power that each receiver may receive simultaneously from the transmitter by adjusting the impedance matching network. Specifically, the impedance of the impedance matching network may determine, at least in part, the amount of power that each receiver may receive. For example, each receiver may receive power based on at least a difference between the receiver's impedance and that of the impedance matching network. Accordingly, the controller may adjust the impedance matching network so as to increase or decrease an amount of power delivered to a respective receiver, based at least on the receiver's impedance.

A controller may determine the amount of power that each receiver may receive from the transmitter based on various parameters. In an example embodiment, each receiver may be associated with a respective priority such that higher priority receivers may receive more power during a single power distribution cycle than lower priority receivers. In other examples, a current charging state of the receiver (if the receiver is coupled to a load that includes a battery), may determine the amount of power that a receiver may receive. That is, a receiver with a low battery level may receive higher priority than a receiver with a full battery. It is understood that the controller may distribute power to each receiver of the plurality of receivers based on a variety of other parameters.

Within examples, a controller may receive information indicative of at least one parameter from a receiver when authenticating the receiver. As such, the controller may generate a dynamic priority list based on the received information. In an example embodiment, the dynamic priority list may be updated when a receiver connects or disconnects from a transmitter. Further, a controller may store the received information and the corresponding dynamic priority lists either locally or on a server. In other examples, a receiver may send a controller updated information if a parameter of the receiver changes after the initial synchronization process. In other examples, a controller may periodically query a receiver, via a side-channel communication link, for example, to request information regarding the state of the receiver. As such, the controller may receive, via the side channel, for example, information such as the current charging state of a battery of a receiver or the current power requirements of a receiver.

In yet other examples, a system may include one or more impedance matching networks in each receiver of the plurality of receivers. A system may additionally or alternatively include impedance matching networks in the transmitter and at least one of the receivers. In such scenarios, a controller may be configured to adjust a plurality of impedance matching networks of the system such that each receiver may receive a determined amount of power from the transmitter.

Additionally or alternatively, the system may use the dynamic impedance matching method described above to detect a parasitic receiver. Specifically, a controller of the system may use information, such as nominal impedance, about authorized receivers to generate a circuit model of at least a portion of the wireless power delivery system. Additionally or alternatively, the controller may generate the circuit model based on an approximation, estimation, or other determination of a coupling condition between the transmitter and the receiver, which may be based on their relative locations. Based on the circuit model, the controller may calculate an ideal power reception amount that it may receive from each receiver. Accordingly, the controller may compare the calculated ideal power received and the actual power received. If the ideal and actual powers received are not equal within a specified margin of error, the controller may determine that a parasitic device may be present in the system. For example, the controller may determine that a parasitic device may be present in the system if the value of the calculated power received varies by more than 10% of the value of the actual power received. Additionally or alternatively, the controller may use other methods disclosed herein to identify parasitic receivers.

A. Coupling Modes

A transmitter and a receiver of a wireless power delivery system may establish a wireless coupling resonant link, and thus become resonantly coupled, via various coupling modes. Each coupling mode is associated with a type of resonator that may be included in a transmitter and/or a receiver. Accordingly, a system may excite a type of resonator so as to provide a wireless resonant link via the associated coupling mode. Furthermore, the system may maintain multiple wireless resonant links of different coupling mode types at any given time. Within examples, a transmitter and a receiver of a system may include at least one of three resonator types. As such, the operational state of a system may utilize at least one of three resonant coupling modes.

Figure 4A:
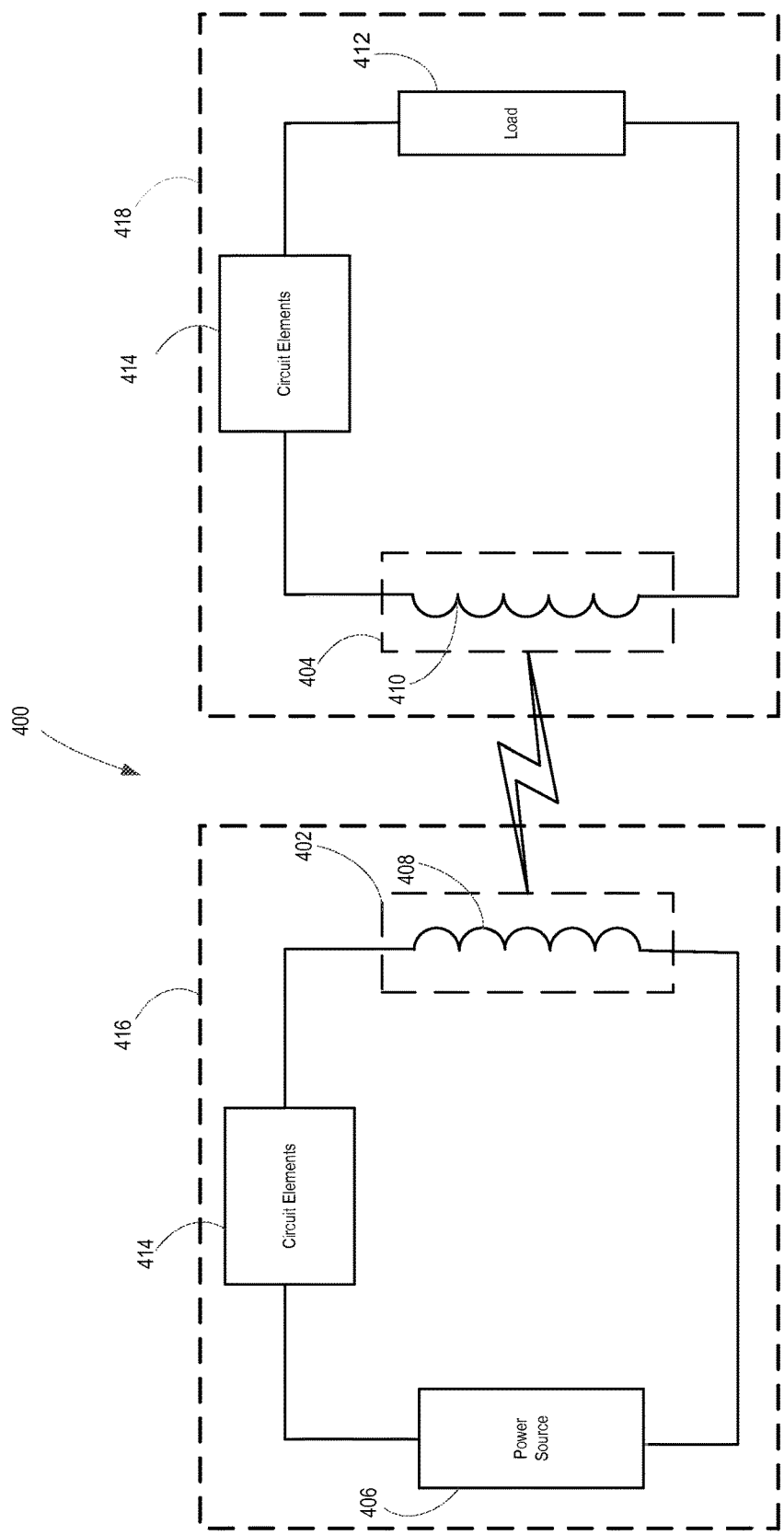
FIG. 4A to 4B illustrate a simplified circuit diagram of inductive resonant coupling, according to an example embodiment.
Figure 4B:
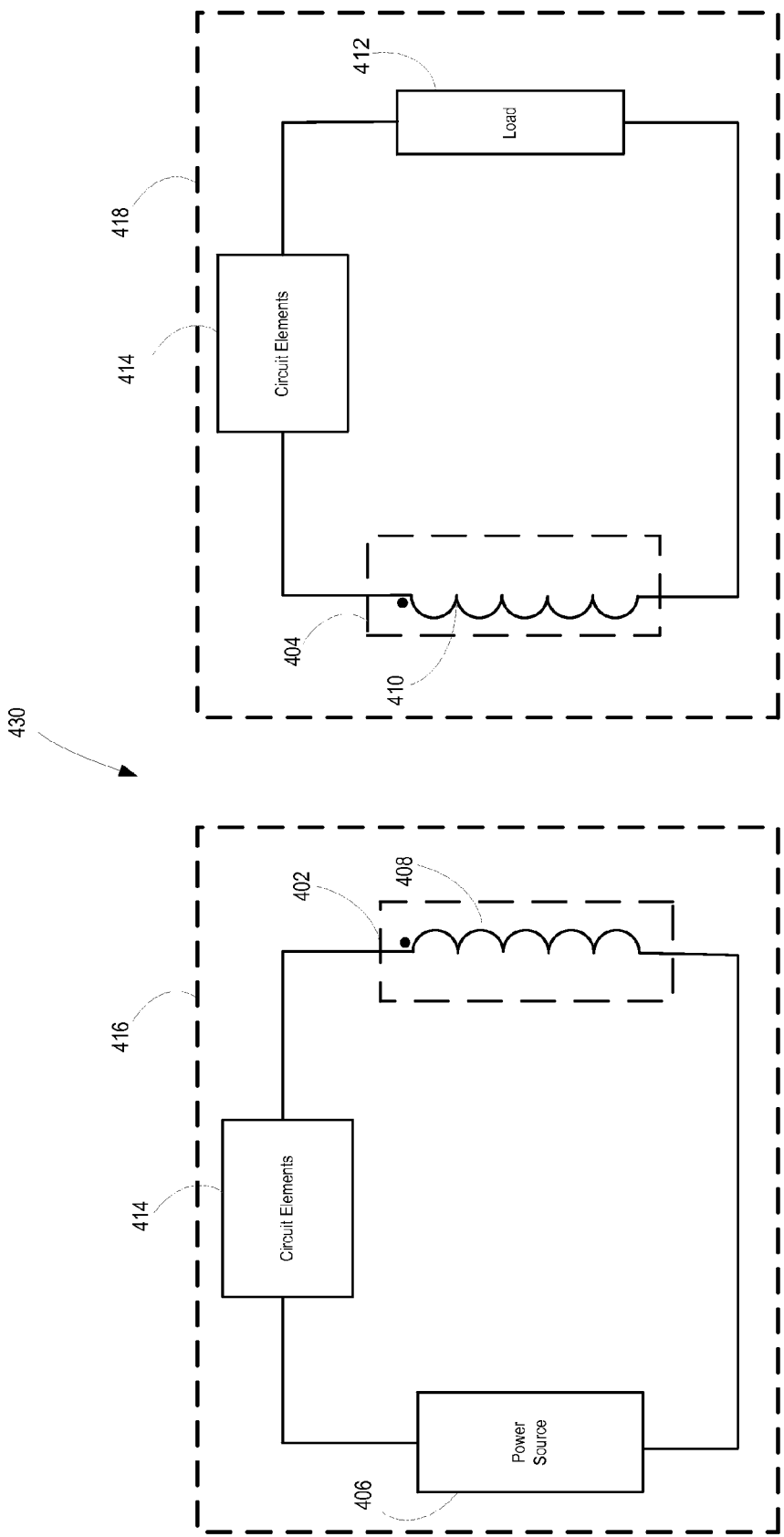

FIG. 4A and FIG. 4B illustrate an inductive resonant coupling mode, the first coupling mode, according to an exemplary embodiment. Each of transmit-resonator 402 and receive-resonator 404 may include at least an inductor. Further, each resonator may be configured to resonate at least at the system resonant frequency of system 400. Transmit-resonator 402 may resonate upon receiving a signal, from power source 406, that is oscillating at the system resonant frequency. Thus, transmit inductor 408 of transmit-resonator 402 may generate a magnetic field oscillating at the system resonant frequency. Receive-resonator 404 may couple with the oscillating magnetic field if it is within proximity to the transmit-resonator 402. As a result, a wireless coupling resonant link may be established. Coupled receive-resonator 404 may then resonate, and may therefore generate a signal that may be delivered to load 412.

Additionally or alternatively, the system may include a transmitter and/or a receiver that include a capacitive resonator, which may be operable to couple the transmitter and the receiver. In an example embodiment, each of the transmitter capacitive resonator and the receiver capacitive resonator may include at least a capacitor. The transmit-resonator may resonate upon receiving, from the power source, a signal oscillating at the system resonant frequency. As the transmit-resonator resonates, the capacitor of the transmit-resonator may generate an electric field oscillating at the system resonant frequency. The receive-resonator, if in proximity to the transmit-resonator, may couple with the oscillating electric field; thereby establishing a wireless coupling link between the transmitter and the receiver. As such, the receive-resonator may resonate, and may therefore generate a signal that may be delivered to a load coupled to the receiver.

In an example embodiment, a system may include at least one of two types of capacitive resonators, each of which may be associated with a respective coupling mode. The two capacitive resonators differ in the configuration of their respective capacitors. The first capacitive resonator may include a common mode capacitor, which may support a capacitance between a single conductor and ground. A common mode capacitive resonator may be operable to provide a wireless coupling link via a coupling mode termed common mode. The second capacitive resonator type may include a differential mode capacitor, which may support a capacitance between two conductors. A differential mode capacitive resonator may be operable to provide a wireless coupling link via a coupling mode termed differential mode.

Figure 5A:
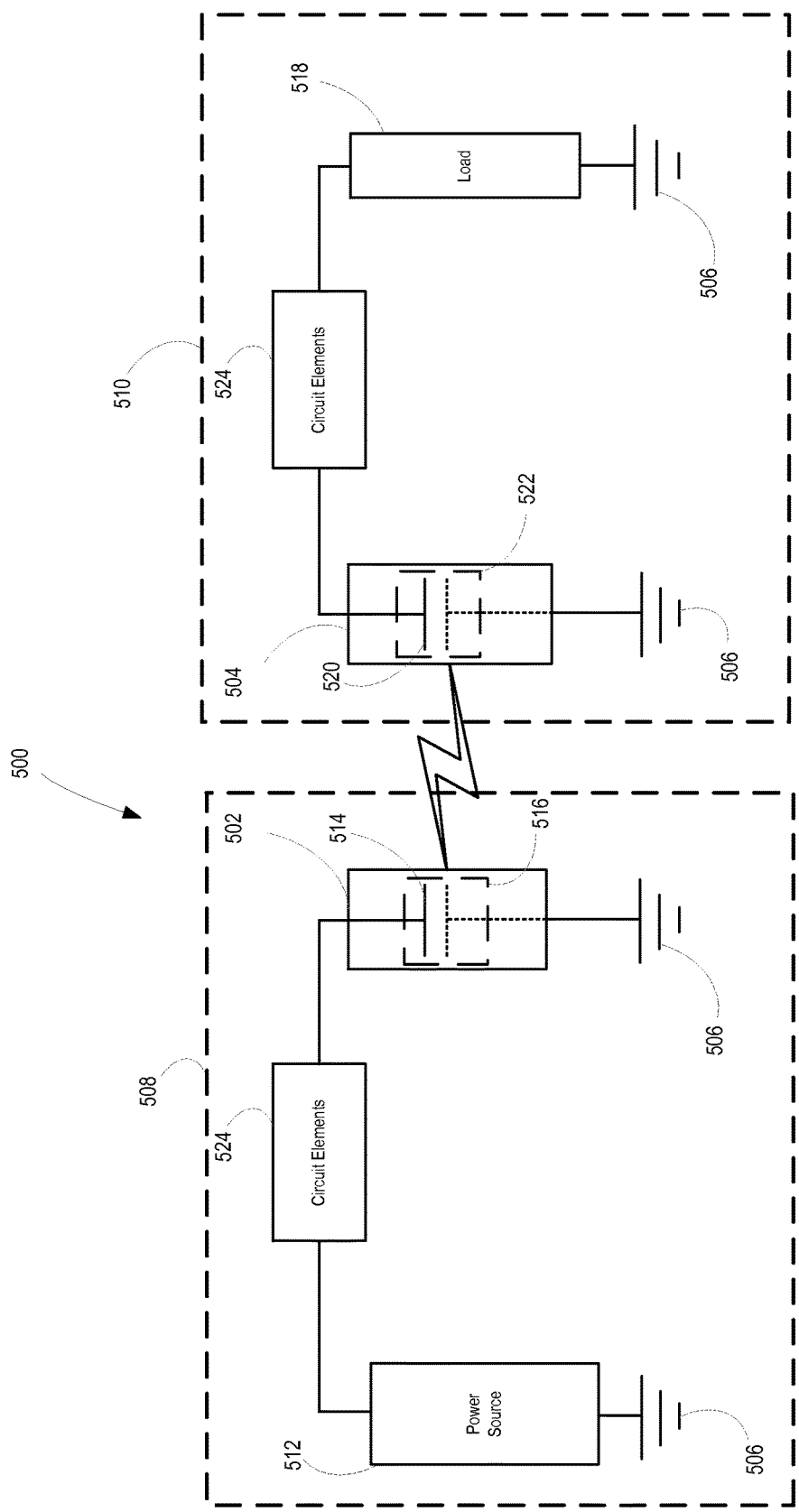
Figure 5B:
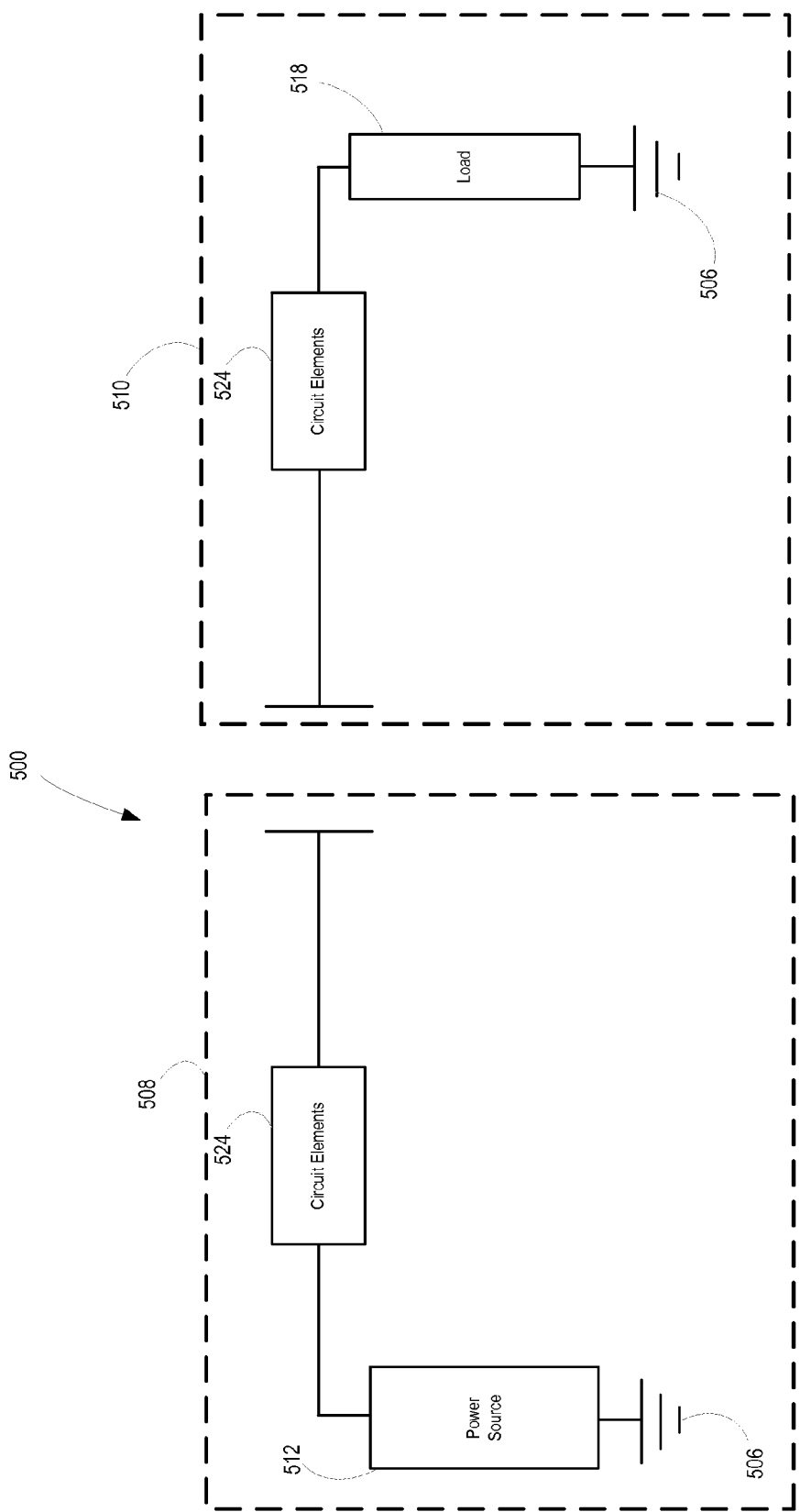

FIG. 5A, FIG. 5B, and FIG. 5C illustrate a system, in three representations, that includes a common mode capacitive resonator, according to an exemplary embodiment. Each of transmit-resonator 502 and receive-resonator 504 includes a common mode capacitive resonator. As such, each resonator includes a common mode capacitor that includes a conductor and ground reference 506. Ground reference 506 may conduct current to complete the circuit of transmitter 508 and receiver 510. Further, transmitter 508 may be coupled with power source 512 that may be connected on one end to ground reference 506 and on the other end to at least transmitter conductor 514. Optionally power source 512 need not be connected to the ground reference 506. Transmit-resonator 502 may resonate upon receiving, from power source 512, a signal that is oscillating at the system resonant frequency. As the transmit-resonator 502 resonates, common mode capacitor 516 of the transmit-resonator 502 may generate an electric field oscillating at the system resonant frequency. Receiver 510 may include load 518 that may be connected on one end to ground reference 506 and on the other end to receiver conductor 520. If within the near field of transmit-resonator 502, the receive-resonator 504 (which includes common mode capacitor 522) may couple with the oscillating electric field, thereby establishing a wireless resonant coupling link. As such, receive-resonator 504 may resonate, and may generate a signal that may be delivered to the load.

In some embodiments, the ground reference of the common mode capacitors may be connected to earth ground via a direct or an indirect connection. For example, the ground reference may include the infrastructure of a building housing the wireless power system, which may include an indirect connection to earth ground. In other examples, the ground reference may include a conductive object connected to common mode capacitors. As such, the conductive object may provide a conductive return path in a circuit including a transmitter and/or a receiver.

Figure 6A:
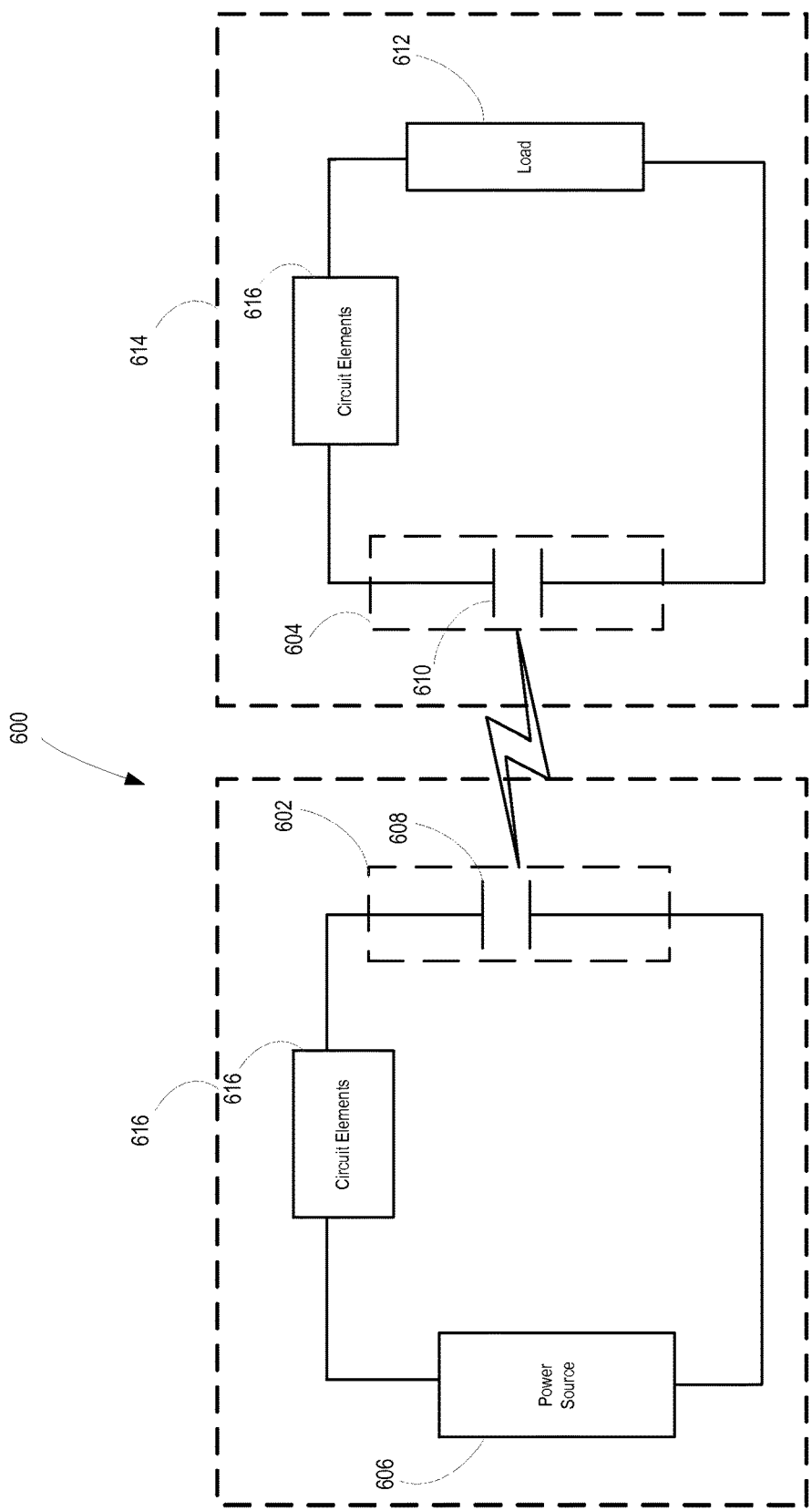
FIG. 6A to 6B is a simplified circuit diagram illustrating differential mode capacitive resonant coupling, according to an example embodiment.
Figure 6B:
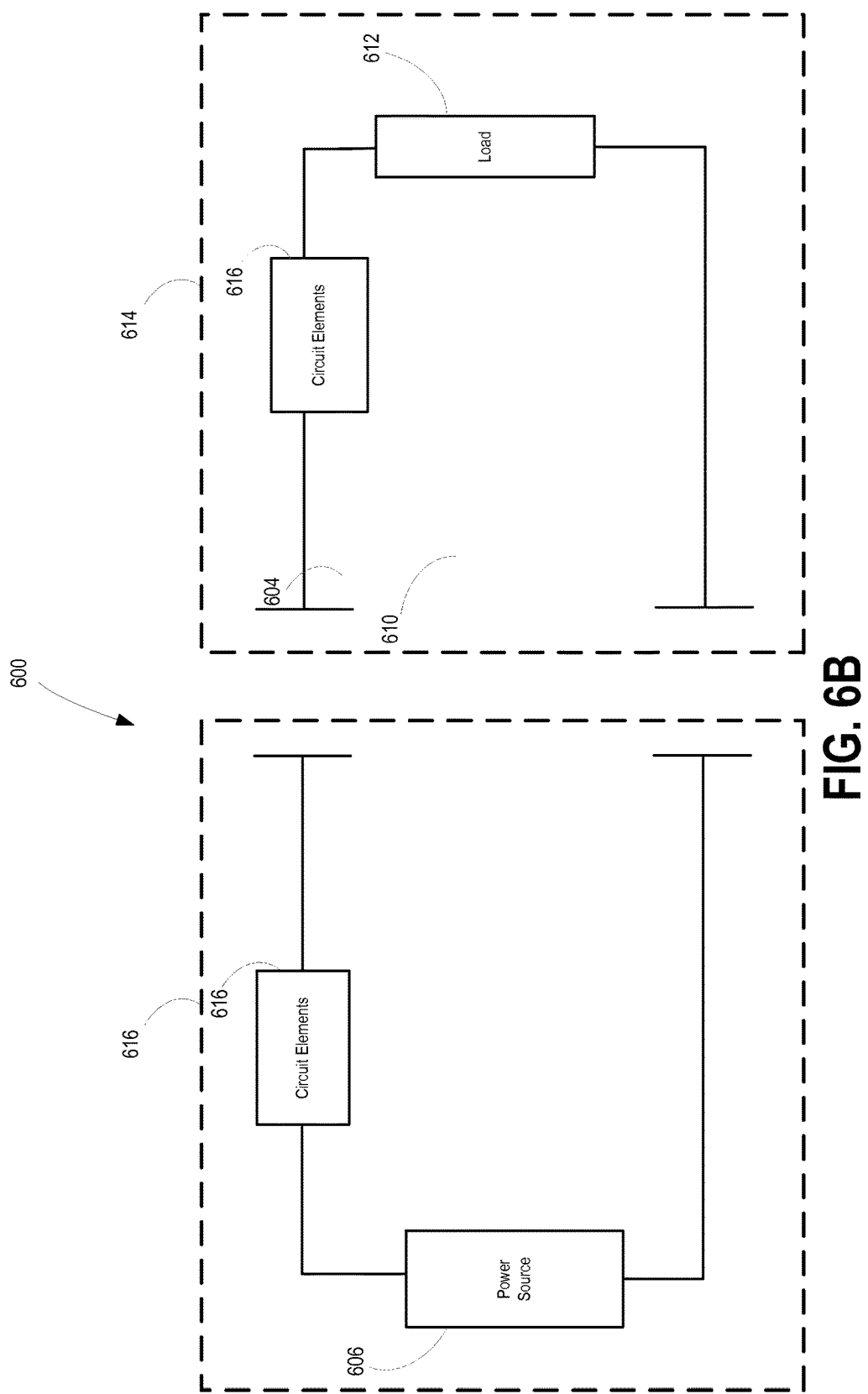

FIGS. 6A and 6B illustrate a system 600, in two representations, which includes a differential mode capacitor, according to an exemplary embodiment. Each of transmit-resonator 602 and receive-resonator 604 may include at least one capacitor. Power source 606 may supply a signal oscillating at a system resonance frequency to transmit-resonator 602. Transmit-resonator 602 may resonate upon receiving the signal from source 606. As transmit-resonator 602 resonates, transmitter differential mode capacitor 608 may generate an electric field oscillating at the system resonant frequency. Receive-resonator 604, if in proximity to the transmit-resonator 602, may couple with the oscillating electric field. As such, a wireless resonant coupling link may be established between the transmitter and the receiver. Furthermore, receiver differential mode capacitor 610 may resonate, and may therefore generate a signal that may be delivered to load 612 coupled to receiver 614.

In example embodiments, a system may establish a wireless resonant coupling link between a transmitter and a receiver according to one or more coupling modes that include a capacitive resonant coupling mode and an inductive resonant coupling mode. A transmitter and a receiver may each include the resonators necessary to establish a wireless link in each of the coupling modes. Furthermore, a wireless coupling link may be maintained between the transmitter and the receiver that utilizes different coupling modes simultaneously or individually. In some examples, the resonators may include a single circuit element that may be configured to operate either as an inductor, a capacitor, or both. In an example, an element may include coils shaped like a pair of conductor plates, such that the element may operate as an inductor and/or a capacitor. In other examples, a transmitter or receiver may include multiple resonators arranged in a resonator bank. The resonator bank may include at least one resonator that may include an inductor, and at least one resonator that may include a capacitor. Accordingly, the resonator bank may be configured to establish wireless resonant coupling links in capacitive and inductive resonant coupling modes.

Figure 7:
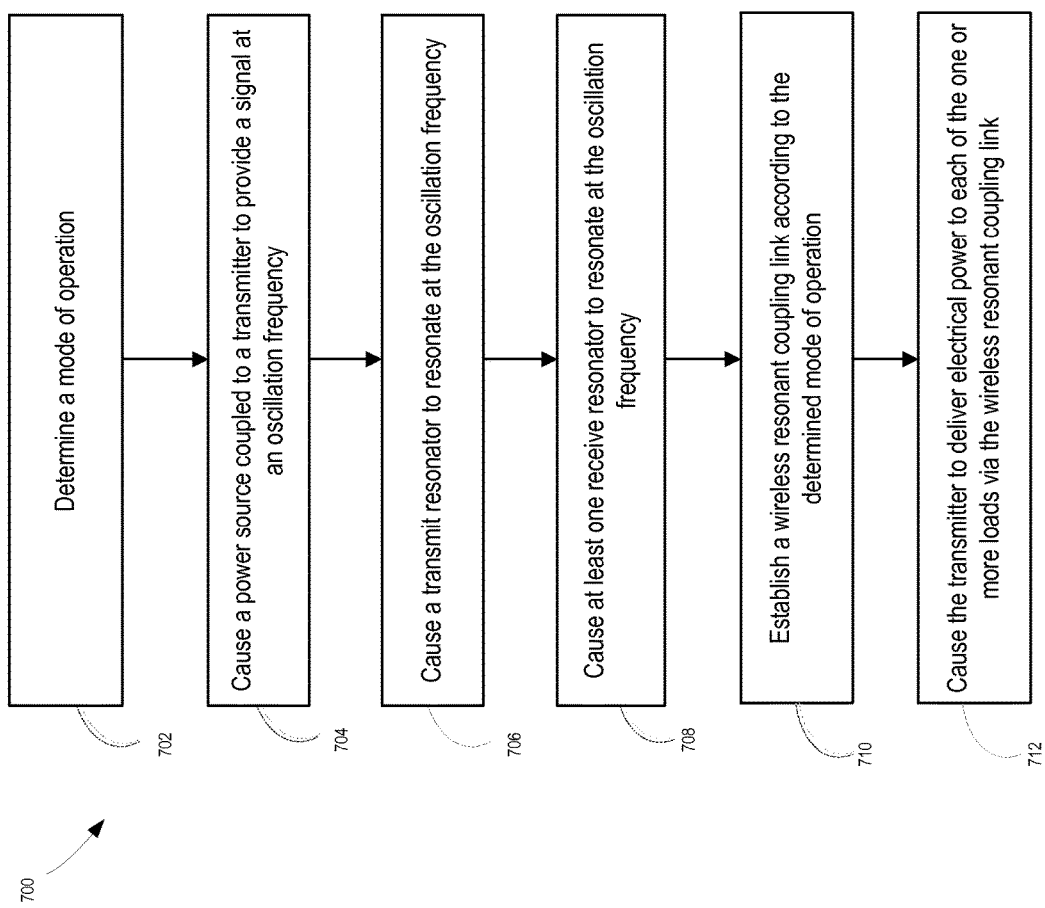
FIG. 7 illustrates a method of delivering electrical power from a transmitter to one or more loads, according to an example embodiment.

FIG. 7 illustrates a flowchart showing a method 700 that may establish a wireless resonant coupling link between a transmitter and a receiver of a system, according to an exemplary embodiment. In some embodiments, method 700 may be carried out by a controller of a system.

Furthermore, as noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 7. For example the one or more processors may be part of controller 114. Where used, program code can be stored on any type of non-transitory computer-readable medium, for example, such as a storage device including a disk or hard drive.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702, of FIG. 7, method 700 may involve determining an operational state of a system. The determined operational state may include at least one coupling mode. For example, the determined operational state may include any of the wireless coupling modes described herein. Within examples, the determined operational state may be determined by a controller of the system. As shown by block 704, method 700 further includes causing a power source that is coupled to a transmitter of a system to provide a signal at an oscillation frequency. For example, the oscillation frequency may be one of the one or more resonant frequencies of the transmitter. In some embodiments, the oscillation frequency may be a frequency within a range of resonant frequencies of the transmit-resonator.

Accordingly, as shown by block 706, a transmit-resonator may resonate at the oscillation frequency upon receiving the signal from the power source of the system. The oscillating transmit-resonator may generate a field oscillating at the oscillation frequency. In some embodiments, the transmit-resonator may generate a field that may be oscillating at a frequency within a range of resonant frequencies of the receive-resonator. As shown by block 708, if a receive-resonator is located within the range of the oscillating field generated by the transmit-resonator, the receive-resonator may also resonate at the oscillation frequency. As a result, as shown by block 710, a wireless resonant coupling link may be established according to the determined operational state. Finally, method 700 may cause the transmitter to deliver electrical power to each of the one or more loads via the established wireless resonant coupling link, as shown by block 712.

FIG. 8 illustrates different combinations of coupling modes that may form wireless resonant coupling link, according to an exemplary embodiment. In an example embodiment, a system may include a transmitter and a receiver both having three different types of resonator elements (e.g. an inductor, a common-mode capacitor, and a differential-mode capacitor). Accordingly, a wireless resonant coupling link between the transmitter and the receiver may include various combinations of the three different coupling modes. Accordingly, combinations 1-7 each include supporting a wireless resonant coupling link via at least one coupling mode. Operational state 8 represents when the system is not operating or when the transmitter and receiver are not coupled via a wireless resonant coupling link. Within examples, the various combinations of coupling modes forming the wireless coupling link between the transmitter and the receiver may be determined and controlled by a controller. In other examples, a user may provide an input to the controller that may direct the system to form a wireless resonant coupling link with a given combination of coupling modes.

In an example embodiment, a system may establish wireless resonant coupling links between a transmitter and a plurality of receivers. In such a scenario, the plurality of receivers may all operate in a single operational state to establish simultaneous links to the transmitter. In other scenarios, each of the receivers may establish a wireless resonant coupling link with the transmitter using a different coupling mode. Transmitters of such systems may include a resonator bank configured to enable simultaneous links with a plurality of receivers via one or more coupling modes.

As explained elsewhere herein, a system may employ time division multiple access (TDMA) to establish a wireless resonant coupling link that may be shared by a plurality of receivers. Specifically, the wireless resonant coupling link may be divided into different time slots within a given time frame. As such, each receiver of the plurality of receivers may receive electrical power from the transmitter during an assigned time slot within the given time frame. In other words, within the given time frame, the transmitter may distribute power to a given receiver during a given time slot. Each receiver may be assigned to receive power during one or more time slots within the time frame.

Figure 9A:
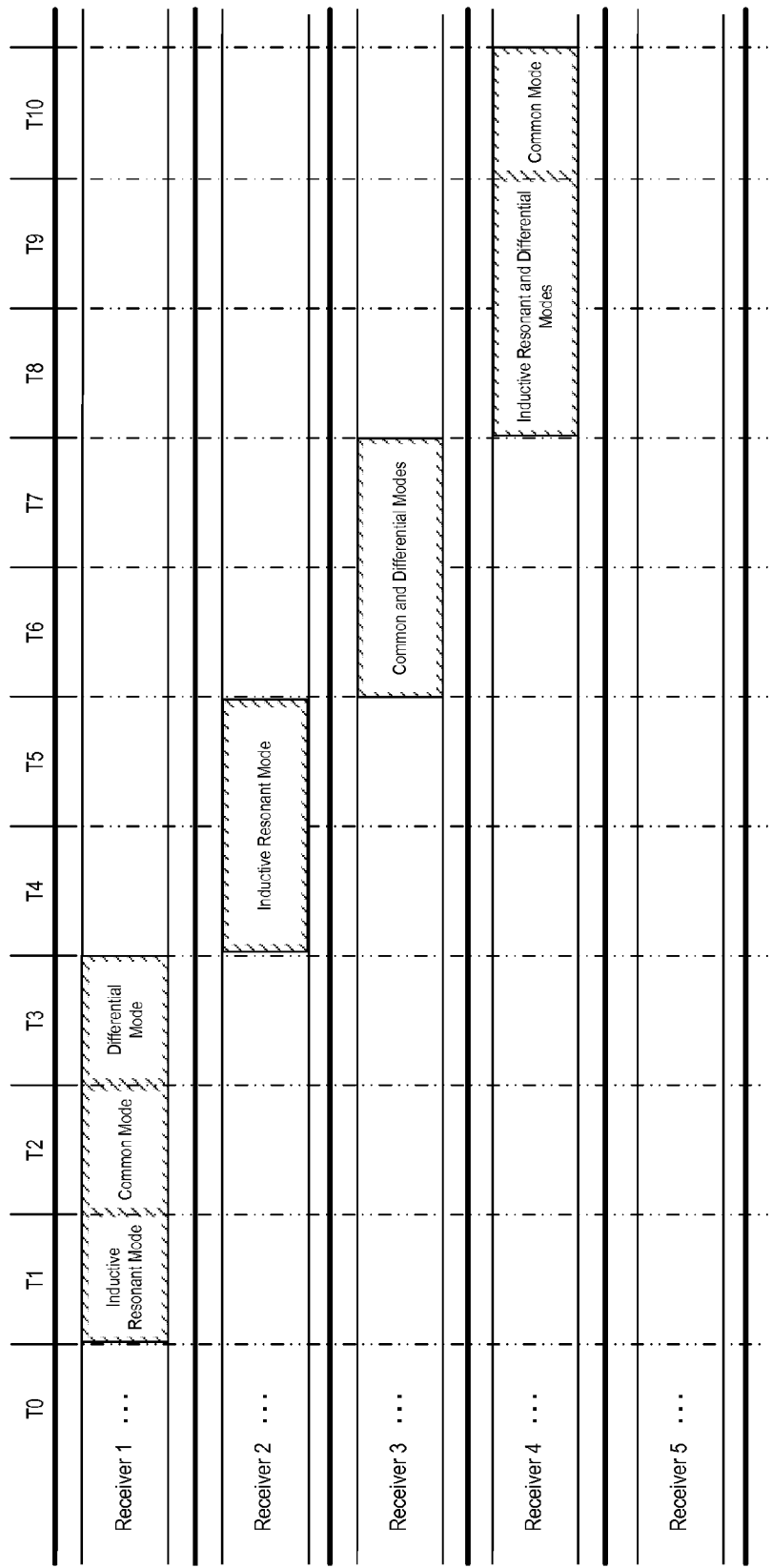
FIG. 9A to 9B illustrate a TDMA wireless resonant coupling channel, according to an example embodiment.

FIG. 9A illustrates a TDMA wireless resonant coupling link, according to an exemplary embodiment. Specifically, the ten time slots (T1-T10) may represent a single time frame of power distribution. The same distribution may be repeated in subsequent time slots T11-T20 and/or time frames (not shown). Furthermore, a controller of the system may assign each receiver of the system one or more time slots during which the receiver may receive power from the transmitter. In this example, receivers 1-4 are configured to receive power from the transmitter during various time slots of this time frame, whereas receiver 5 is not configured to receive power. In such a scenario, a controller may assign receivers 1-4 specific time slots during which they may receive power from the transmitter. The power may be transferred to a receiver during a given time slot according to any of the modes of operation of a system. Within examples, the controller may determine the operational state (e.g., the coupling mode type(s)) of each receiver during each interval of time. In other examples, the operational state may be input by a user of the respective receiver.

Figure 9B:
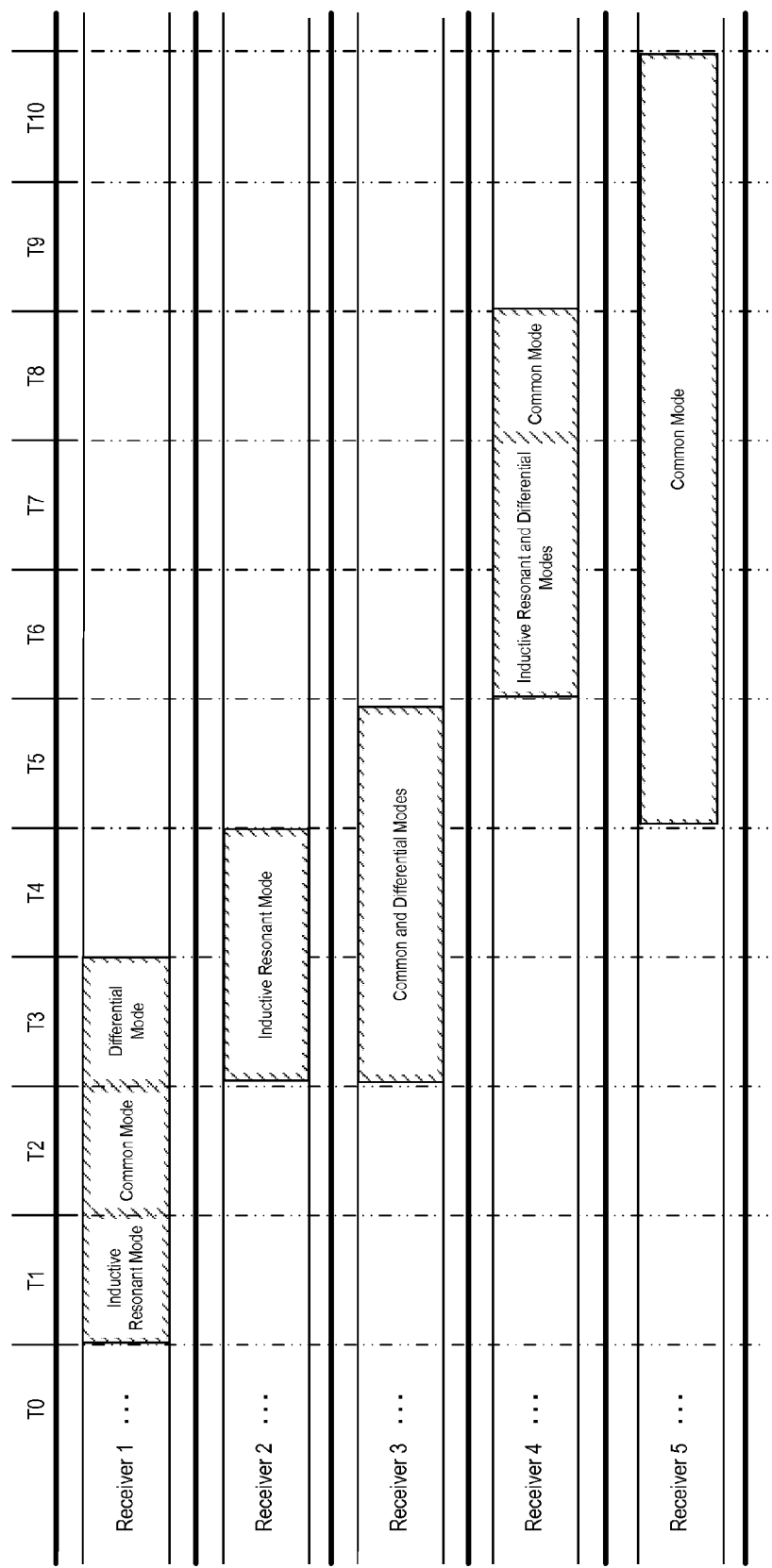

FIG. 9B illustrates a TDMA wireless resonant coupling link, according to an exemplary embodiment. Similar to the system illustrated in FIG. 9A, the ten time slots (T1-T10) may represent a single frame of power distribution. However, as illustrated in FIG. 9B, more than one receiver may receive power simultaneously from the transmitter. Furthermore, each receiver may receive power according to any of the modes of operation of the system. In some examples, the receivers receiving power simultaneously may receive power according to the same mode of operation. In other examples, the receivers receiving power simultaneously may receive power according to different modes of operation.

In accordance with some embodiments, the components (e.g., transmitter and receiver) of a system may include circuit elements (shown as element 212 in FIG. 2, element 414 in FIG. 4, element 524 in FIG. 5, and element 616 in FIG. 6), such as inductors, capacitors, transistors, inverters, amplifiers, rectifiers, varactors, relays, diodes, transmission lines, resonant cavities and switches, which may be arranged to facilitate switching between the different coupling modes of a system. For example, a system may switch between the different modes by having both a coil and one or two (or more) conductors in a combination of series-parallel connections. In other examples, a system may dynamically suppress or enhance a coupling mode by dynamically adding lumped element reactive components in series or parallel between the elements of the resonator of each mode.

In some examples, the operational state of a system may be determined by a controller of the system. For example, a controller may determine the mode of the operation of the system based on data that it may receive from a receiver, such as the receiver's power demands, preferred operational state, and location. Alternatively or additionally, the controller may determine the operational state based on data that may be input by a user of the system. Furthermore, the operational state may be determined based on the status of the system and/or environmental conditions.

In some embodiments, a controller may switch the operational state in response to detecting a parasitic device (using methods described herein) that may be diverting power from a legitimate receiver. In an example, a system may be operating in a state that utilizes common mode resonant coupling. However, a controller may detect a parasitic device that may also be coupled to the transmitter using common mode. In response, the controller may stop wireless power delivery via the common mode, and may enable wireless power delivery via a differential capacitive coupling mode, an inductive resonant coupling mode, or both. In other embodiments, a controller may use environmental conditions to determine the system's operational state. For example, a controller may receive information indicative of a presence of high ferrite content objects in the system's environment. Accordingly, the controller may determine to operate in a mode that does not utilize inductive resonant coupling mode.

A controller may also determine an amount of electrical power that a system may deliver to each load in the system. The controller may also make a determination of how much electrical power to deliver to each load via each available coupling mode in the system. Accordingly, in an example, the controller may cause the power source to direct the determined amount of power to a resonator bank and further control the delivery of power to the respective receivers via the respective determined coupling modes.

Furthermore, external elements may be installed in a system's environment, which may be configured to improve or otherwise modify the performance of the system. In some embodiments, field concentrators may be configured to shape an oscillating magnetic field (of an inductive resonator), an oscillating electric field (of a capacitive resonator), or both. For example, high permeability materials, such as ferrites, may be installed in a system's environment. In an example embodiment, while the system is operating in inductive resonant coupling mode, the high permeability material may be arranged so as to shape the oscillating magnetic field and extend its range. Similarly, high permittivity dielectric materials may be arranged in a system's environment. A capacitor of the system may utilize the high permittivity dielectric materials to increase or otherwise modify its capacitance, and hence adjust the properties of the electric field produced by a resonant capacitor. Furthermore, conductors may also be arranged in a system's environment so as to affect the magnetic and/or electric field produced by the system's resonators.

Within examples, a system may include circuit elements that may be used as necessary in the system to implement the system's functionality. For example, a system may include circuit elements such as inverters, varactors, amplifiers, transmission lines, resonant cavities rectifiers, transistors, switches, relays, capacitors, inductors, diodes, and conductors. A relay may be used for switching between circuit elements configured to operate each coupling mode. As explained herein, a switch may connect a load to a receiver, such that the load is switchably coupled to the receive-resonator. Other examples of possible uses for various circuit elements are possible.

B. Power Transfer to Legitimate Receiver(s)

Figure 10:
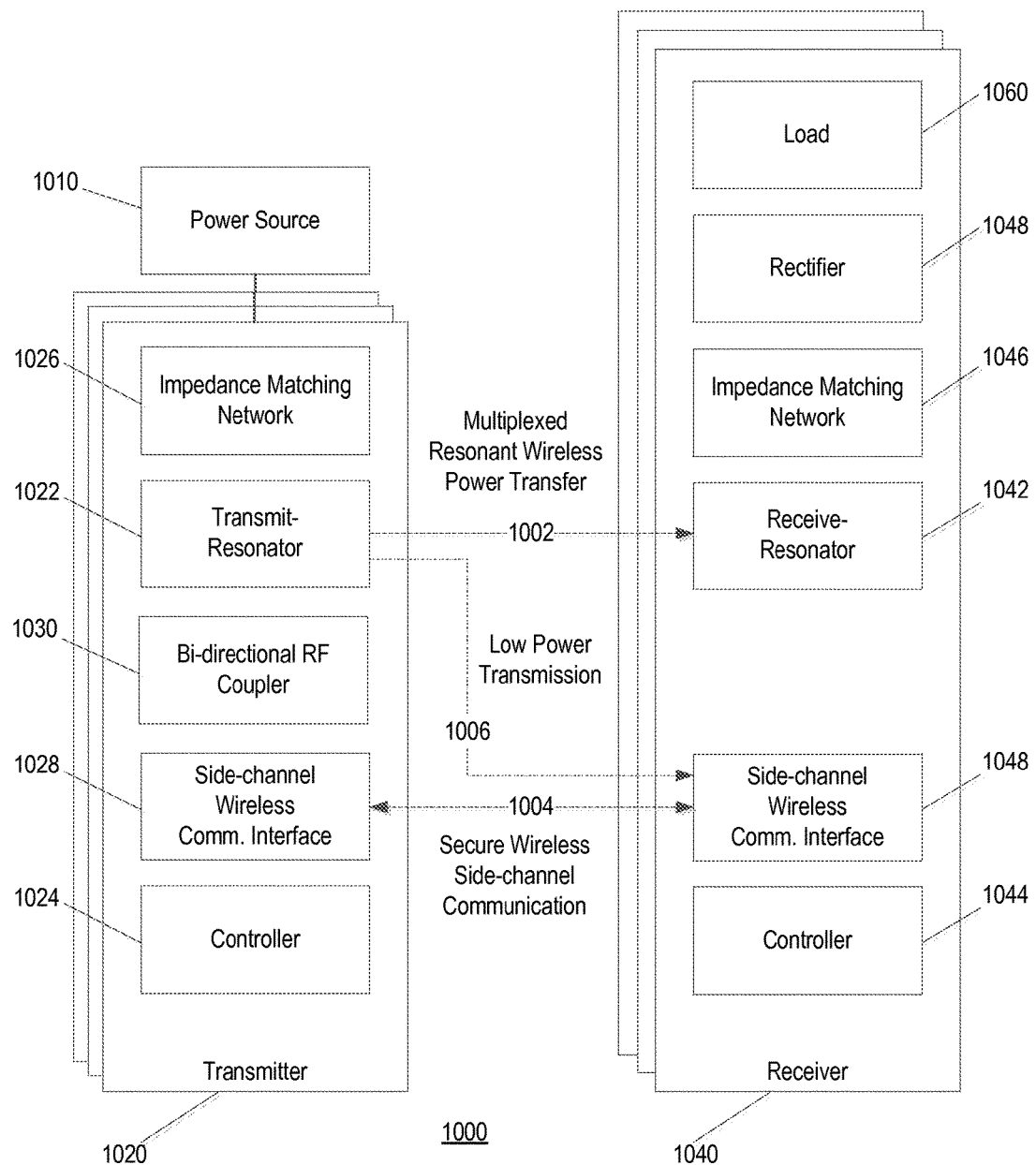
FIG. 10 is a functional block diagram illustrating a wireless power delivery system employing side-channel communications, according to an example embodiment.

FIG. 10 illustrates a resonant wireless power delivery system 1000 according to an example embodiment. The system 1000 includes a power source 1010, a transmitter 1020, and a receiver 1040. The transmitter 1020 receives power from the power source 1010 and wirelessly transfers this power to the receiver 1040. The transmitter 1020 may be one of a plurality of transmitters. The receiver 1040 is one of a plurality of receivers that may receive power from the transmitter 1020.

The transmitter 1020 includes a transmit-resonator 1022, and the receiver 1040 includes a receive-resonator 1042. The transmit-resonator 1022 is supplied with a power signal from the power source 1010 oscillating at a resonant frequency $\omega_0$. As described above, the transmit-resonator 1022 resonates at the resonant frequency $\omega_0$ and generates a field that oscillates at the resonant frequency $\omega_0$. The receiver-resonator 1042 is correspondingly configured to resonate at the resonant frequency $\omega_0$. The receiver 1040 is placed in sufficient proximity to the transmitter 1020 to couple the receive-resonator 1042 with the field generated by the transmit-resonator 1022, e.g., the receiver-resonator 1042 is within the field of the transmit-resonator 1022 depending for instance on the quality factor Q as described above. This coupling establishes a resonant power transfer link 1002 that provides a wireless conduit for power transfer between the transmit-resonator 1022 and the receive-resonator 1042. As also described above, the transmit-resonator 1022 and the receive-resonator 1042 may be coupled via an oscillating magnetic field and/or an oscillating electric field. In particular, the coupling may include any one or more of the following three modes: (i) inductive mode, (ii) differential capacitive mode, and (iii) common capacitive mode.

While the receive-resonator 1042 resonates in response to the oscillating field, a rectifier 1048 or other power conversion circuit may convert power from the receive-resonator 1042 and subsequently deliver the power to a load 1060. While the load 1060 is incorporated into the receiver 1040 as illustrated in FIG. 10, some embodiments may include loads that are physically separate or otherwise apart from the receiver 1040.

As shown in FIG. 10, the transmitter 1020 includes a controller 1024. In an example embodiment, the controller 1024 may determine what coupling mode(s) to employ and may control various elements of the transmitter 1020 so as to establish and/or maintain wireless resonant coupling links according to the determined coupling mode(s). The controller 1024 may also determine the amount of power that is transferred via the respective coupling mode(s).

As also described above, higher efficiencies can be achieved by adjusting impedances (resistance and/or reactance) on the transmitting side and/or the receiving side, e.g., impedance matching. Accordingly, the transmitter 1020 may include an impedance matching network 1026 coupled to the transmit-resonator 1022. Similarly, the receiver 1040 may include an impedance matching network 1046 coupled to the receive-resonator 1042.

In an example embodiment, a plurality of devices and objects may be present within a local environment of the transmitter 1020. In such a scenario, the example system 1000 may be configured to distinguish legitimate receivers from illegitimate devices that are not intended recipients of power transfer. Without an ability to discriminate between possible recipients of power transfer, illegitimate devices may act as parasitic loads that may receive power from the transmitter without permission. Thus, prior to transferring power to the receiver 1040, the transmitter 1020 may carry out an authentication process to authenticate the receiver 1040. In an example embodiment, the authentication process may be facilitated via a wireless side-channel communication link 1004.

The transmitter 1020 may include a wireless communication interface 1028 and the receiver 1040 may include a corresponding wireless communication interface 1048. In such a scenario, the transmitter 1020 and the receiver 1040 may establish a side-channel communication link 1004 via a wireless communication technology. For instance, classic BLUETOOTH® or BLUETOOTH® LOW ENERGY (BLE) (2.4 to 2.485 GHz UHF) or WIFI™ (2.4 GHz UHF/5 GHz SHF) may be employed to provide secure communications between the transmitter 1020 and the receiver 1040. Other wireless communication protocols are possible and contemplated. As shown in FIG. 10, the side-channel link 1004 communicatively couples the transmitter 1020 and the receiver 1040 over a secondary channel that is separate from the resonant power transfer link 1002. In alternative embodiments, however, the transmitter 1020 and the receiver 1040 may employ the same channel to transfer power and communicate information as described herein, e.g., by modulating aspects of the power transfer to communicate the information.

In an example embodiment the transmitter 1020 can communicate with the receiver 1030 over the side-channel communication link 1004 to determine that the receiver 1040 is authorized or otherwise permitted to receive power. The receiver 1040 may be configured to provide any type of information and/or acknowledgement required by the transmitter 1020 to authenticate the receiver 1040. For instance, the receiver 1040 may transmit an authentication code, a message, or a key to the transmitter 1020. In such scenarios, a device without the ability to establish side-channel communications with the transmitter 1020 may not be identified as a legitimate device.

The receiver 1040 may also include a controller 1044. As such, the controllers 1024, 1044 can conduct communications via the side-channel link 1004 and process the information exchanged between the transmitter 1020 and the receiver 1040.

As described above, when power is transferred from the transmitter 1020 to the receiver 1040, power may be reflected back to the transmitter 1020 As FIG. 10 illustrates, the transmitter 1020 may include a bi-directional RF coupler 1030 to measure the reflected power as also described above. Using measurements from the bi-directional RF coupler 1030, an optimal efficiency for the power transfer link 1002 may be ascertained, and the impedance(s) on the transmitting and/or receiving sides can be adjusted via the impedance matching networks 1026, 1046 so as to optimize or otherwise modify power delivery efficiency.

The impedance associated with the receiver 1040 may be determined based on the reflected power detected by measurement devices in conjunction with the bi-directional RF coupler 1030. If a nominal impedance (e.g., a designed impedance) of the receiver 1040 is known, a difference between the nominal impedance and the calculated impedance based on the measurement of reflected power may indicate a presence of one or more parasitic loads. Such parasitic loads may include illegitimate receivers. Using the side-channel communication link 1004 established between the transmitter 1020 and the receiver 1040, the receiver 1040 may be operable to communicate its nominal impedance to the transmitter 1020. Thus, the calculation of impedance using the bi-directional RF coupler 1030 may enable the identification of parasitic loads as well as enable dynamic impedance matching as disclosed elsewhere herein. The impedance(s) of the transmitter 1020 and/or the receiver 1040 can be adjusted via the impedance matching networks 1026, 1046 to account for the parasitic loads.

As described herein, the transmitter 1020 may be operable to identify the existence of the legitimate receiver 1040 through authentication communications via the side-channel communication link 1004. Additionally or alternatively, the transmitter 1020 may be operable to distinguish the legitimate receiver 1040 from other legitimate or illegitimate devices by other methods. In particular, the transmitter 1020 may be operable to control the power transfer link 1002 and the communication over the side-channel communication link 1004 with the same receiver 1040.

Figure 11:
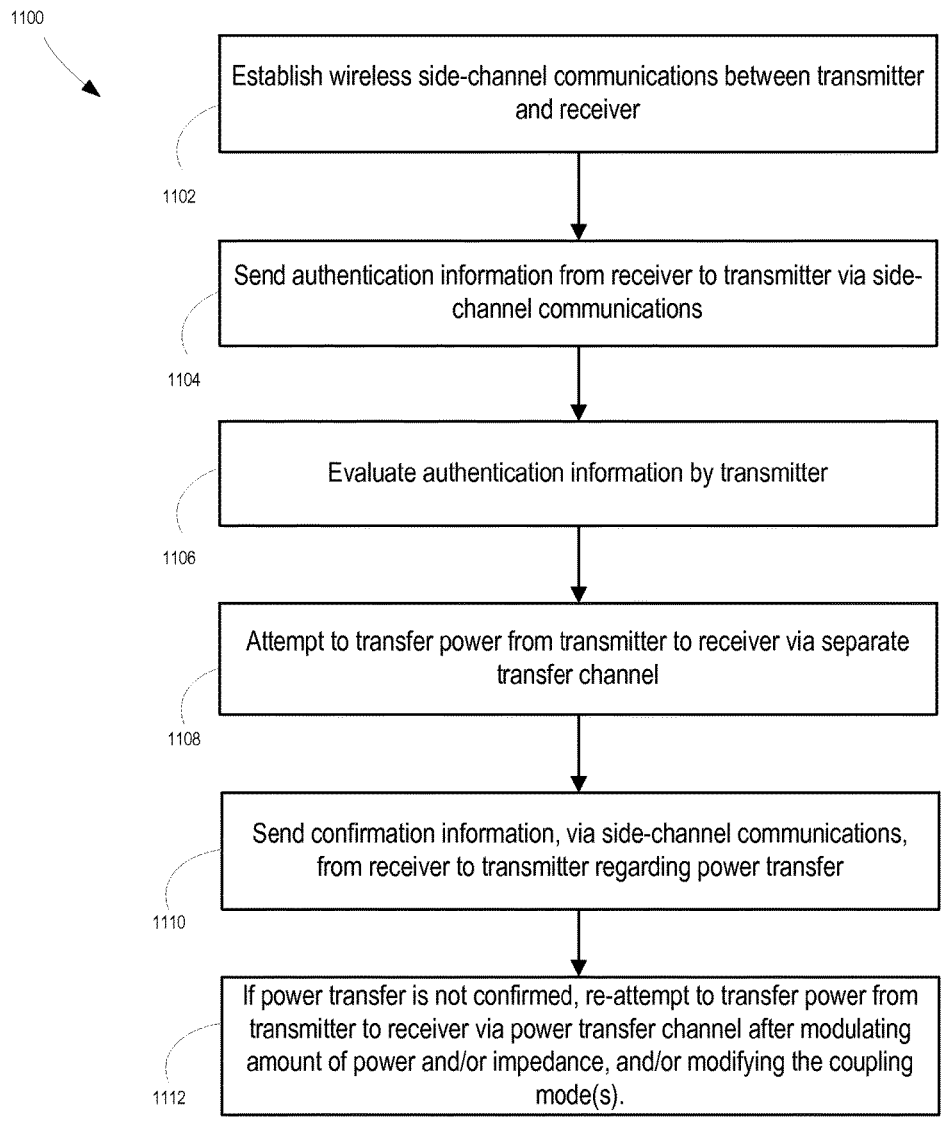
FIG. 11 illustrates a method for confirming that a power transfer link and a side-channel communication link are established with the same receiver, according to an example embodiment.

FIG. 11 illustrates an example method 1100 for confirming that the power transfer link 1002 and the side-channel communication link 1004 are established with the same receiver 1040. In step 1102, the transmitter 1020 and the receiver 1040 may establish wireless communications via the side-channel communication link 1004. In step 1104, the receiver 1040 sends authentication information to the transmitter 1020 via side-channel communication link 1004, and in step 1106, the transmitter 1020 evaluates the authentication information to determine that the receiver 1040 is permitted to receive power.

Having identified the existence of the legitimate receiver 1040 via the side-channel communication link 1004, the transmitter 1020 may attempt to determine that the corresponding power transfer link 1002 is occurring with the same receiver 1040. Accordingly, in step 1108, the transmitter 1020 attempts to send a predetermined amount of power to the receiver 1040 via the power transfer link 1002. In step 1110, the transmitter 1020 communicates with the receiver 1040 via the side-channel communication link 1004 to confirm that the receiver 1040 received the power transmission from step 1108. For instance, the receiver 1040 can detect and report the power received. If the receiver 1040 fails to provide information confirming the power transmission from the transmitter 1020, the transmitter 1020 in step 1112 can re-attempt to establish the power transfer link 1002 with the receiver 1040. With each re-attempt, the transmitter 1020 can change the amount of power and/or modulate an impedance in an attempt to account for any parasitic loads that may be interfering with the power transfer to the correct receiver 1040. Additionally or alternatively, the transmitter 1020 can change the coupling mode(s) for the power transfer link. Once the power transfer link 1002 to the correct receiver 1040 is established, the transmitter 1020 can further modulate impedance, if necessary, and continue to transfer power to the receiver 1040.

In view of the foregoing, the side-channel communication link 1004 may be employed to identify and authenticate the receiver 1040 and to establish and adjust aspects of the power transfer link 1002, particularly to account for parasitic loads. Specifically, the side-channel communication link 1004 and the power transfer link 1002 may enable a variety of authentication protocols so as to provide secure communications and power delivery. For example, the transmitter 1020 and receiver 1040 may be operable to conduct a password authentication protocol (PAP), a challenge-handshake authentication protocol (CHAP), multi-factor authentication, or another type of cryptographic protocol. In general, however, the transmitter 1020 and the receiver 1040 may employ the side-channel communication link 1004 to exchange any type of information to manage any aspect of the power transfer link 1002.

In an example embodiment, the system 1000 may help ensure the availability of the side-channel communication link 1004 by intermittently or continuously transmitting a certain amount of power via a predetermined wireless resonant coupling link configuration. This transmission 1006 can power the wireless communication interface 1048 and allow it to remain active even if other aspects of the receiver 1040 do not receive power. As such, the receiver 1040 may receive sufficient power to establish initial communications with the transmitter 1020. Thereafter, the receiver 1040 may establish the power transfer link 1002. For instance, the transmission 1006 may provide a low power, e.g., approximately 1 W. In such a scenario, the power distribution efficiency of the transmission 1006 is less of a concern at relatively low powers.

As described above, the controller 1024 may determine what coupling mode to employ in the example system 1000. The controller 1024 may select coupling mode(s) based on the identification of parasitic loads. For instance, the transmitter 1020 may deliver power to the receiver 1040 via a common capacitive mode during a first time period. However, subsequent to the first time period, the controller 1024 may detect a parasitic device that may also be coupled to the transmitter 1020 via common capacitive mode. Consequently, the controller 1024 may cause the transmitter 1020 and/or the receiver 1040 to a switch to differential capacitive mode and/or inductive mode.

Figure 12:
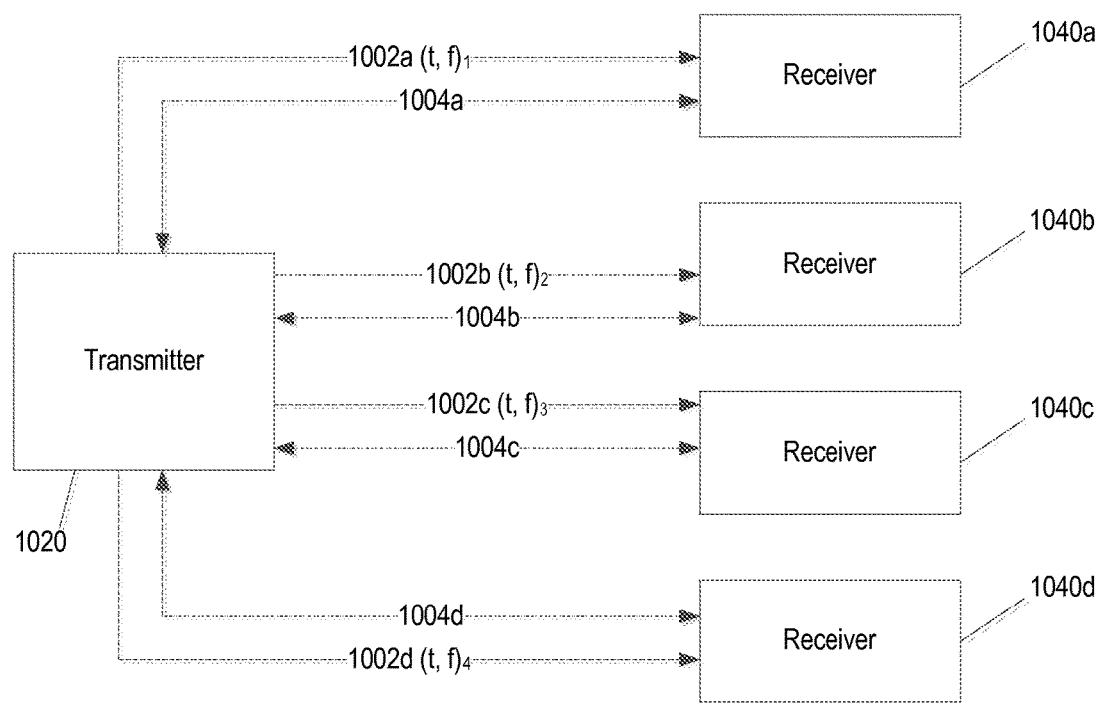
FIG. 12 is a functional block diagram illustrating a wireless power delivery system employing multiplexed power transfer, according to an example embodiment.

As shown in FIG. 12, the transmitter 1020 may also employ time-division and/or frequency-division multiplexing for the power transfer links 1002a-d to a plurality of legitimate receivers 1040a-d, respectively. Although FIG. 12 may illustrate four receivers, it is understood that any number of receivers may receive power from a transmitter according to the present disclosure.

Multiplexing may allow the transmitter 1020 to control how power is distributed to the receivers 1040a-d. For example, with time-division multiplexing, power transfer during a given time period may be assigned to one or more specified receivers. With frequency-division multiplexing, power may be transferred to specified receivers via respective frequencies. In such a scenario, the transmitter may be configured to transmit a plurality of the respective frequencies simultaneously. Thus, as illustrated in FIG. 12, the power transfer links 1002a-d may occur at various designated time and/or frequency combinations $(t, f)_1$, $(t, f)_2$, $(t, f)_3$, $(t, f)_4$, respectively. Accordingly, the use of multiplexing may promote coordinated delivery and availability of power to the receivers 1040a-d.

Although the transmitter 1020 may transfer power to one receiver via a single power transfer link having a particular time and/or frequency combination as shown in FIG. 12, the transmitter 1020 in alternative embodiments may transfer power to one receiver via multiple power transfer links having different time and/or frequency combinations. Such an approach provides some redundancy in case the transmitter 1020 is unable to transfer power with one or more of the power transfer links, e.g., due to interference from illegitimate receiver(s). The transmitter 1020 can fall back on the remaining power transfer links to transfer power to the receiver without interruption. In general, the transmitter 1020 can establish and selectively use any number of power transfer links with a single receiver, where the power transfer links use different respective time and/or frequency combinations.

The transmitter 1020 and the receivers 1040a-d may employ side-channel communication links 1004a-d as described above to coordinate the multiplexed transfer of power. For instance, the transmitter 1020 can communicate what time slots and/or which frequencies will be employed to transfer power to the receivers 1040a-d. In an example embodiment, wireless power delivery utilizing time and frequency multiplexing may be more secure than other wireless power delivery methods at least because the multiplexing scheme employed by the transmitter 1020 is likely to be unknown to illegitimate devices.

Without multiplexing, illegitimate devices with impedances or load profiles similar to legitimate devices might receive power without permission. In cases where power resources may be limited, unpermitted use of such power resources might result in denial of power to legitimate receivers. Thus, multiplexing may allow more efficient and robust power transfer from the transmitter to any number of legitimate receivers even in the presence of illegitimate or parasitic receivers.

It is understood that the use of a side-channel link is not limited to the examples above. In an alternative implementation, for instance, a transmitter and a plurality of receivers may be pre-programmed with information regarding the multiplexing scheme for power delivery to the plurality of receivers. Additionally or alternatively, the transmitter may be pre-programmed with information regarding the nominal impedances for the receivers. In some cases, the receivers may have the same impedance. A side-channel communication link can then be used to communicate information that is not pre-programmed into the transmitter and/or the receivers. For instance, if a wireless power delivery system is pre-programmed with the multiplexing scheme as well as information relating to the nominal impedances for the receivers, a side-channel communication link can be used by a receiver to report the power received it has received so that the existence of any parasitic loads can be determined as described above.

C. Repeaters

In accordance with example embodiments, the system may include one or more resonant repeaters (or simply repeaters) configured to spatially extend the near field region of the oscillating field. Doing so may enlarge the region around the transmitter within which receivers may be placed in order to resonantly couple to, and receive power from, the oscillating field, as described above. In one example, a resonant repeater may include a repeat resonator configured to resonate at the resonant frequency $\omega_0$ of the system (the system resonant frequency) when positioned in the transmitter near field. Driven by the resonating repeat resonator, the repeater may then repeat the transmitter near field, thereby extending the range of the near field. Such repeater may be passive, in the sense that they may be powered only by the near field in which they are positioned.

In an embodiment, a resonant repeater may receive a power signal via a wireless resonant coupling link that may have been established with the transmitter or with another repeater. As explained above, the wireless resonant coupling link may be established when the repeater couples with a first near field of the transmitter or of another repeater. The repeater may then emit the signal via a second wireless coupling link established with another repeater and/or a receiver. Further, the signal that is emitted by the repeater has an associated near field, with which another repeater and/or a receiver may couple. In some embodiments, the repeater may emit a signal such that the near field associated with the emitted signal is farther away from the transmitter than the extent of the first near field.

In further accordance with example embodiments, a plurality of repeaters may be configured in a chain-like configuration, such that each subsequent repeater in the chain resonantly repeats the near field of an earlier link in the resonant repeater chain. The plurality of repeaters may also be configured in array-like configuration. In such scenarios, the transmitter near field may be continually extended beyond its original range. Within examples, a repeater may establish several wireless coupling links with one or more receivers and/or with one or more repeaters. In some embodiments, a repeater may transmit power to one or more repeaters and/or to one or more receivers via a single wireless resonant coupling link.

Furthermore, each repeater may be configured to couple with a magnetic near field and/or an electric near field. Each repeater may also be configured to repeat a magnetic near field and/or an electric near field. A repeater may couple with, and may repeat, various field types depending at least on the operational state of the system. For example, each repeater may couple with a transmitter or another repeater using at least one coupling mode, according to the operational state of the system. Accordingly, each repeater may include at least one of a common mode resonator, a differential mode resonator, and an inductive resonator. The one or more resonator types that may be included in a repeater may be collectively referred to as a repeat resonator.

While the transmitter near field can be extended using one or more repeaters, there may, however, be physical limitations to how far the near field may be extended by chaining repeaters. Specifically, the near field will decay to some degree from one repeater to the next, so that each repeated field produced by a passive repeater may have slightly lower, or substantially lower, average energy density than that produced by an earlier passive link. Thus, an accumulated decay may eventually yield little or no power transfer.

In accordance with example embodiments, the physical limitation due to decay of the near field may be overcome by including additional capabilities in the repeaters. For example, each repeater may include an impedance matching circuit that may improve the power transfer efficiency from one repeater to another. In other examples, a system may mitigate decay of the near field by using active repeaters, each of which includes an independent (secondary) power source. As such, the active repeaters can "inject" additional power into the repeated fields. In one example embodiment, all of the repeaters of the system are active repeaters. In another example embodiment, only some of the repeaters are active repeaters, while others may be passive repeaters.

Within examples, an active repeater may "inject" additional power into the repeated fields by applying a signal gain to the power signal that the active repeater receives from the transmitter or another repeater. The repeater may then emit the signal to another repeater or a receiver. In some embodiments, a repeater may be configured to apply a predefined gain to the received signal. In other examples, a controller of the system may determine the gain that each active repeater applies to the received signal. For example, a controller may direct the active repeater to apply a gain that is equivalent to the propagation losses of the signal. Thus, a load may receive the signal that has the same magnitude as the original signal provided by the primary power source. Furthermore, in such a scenario, the extent of each repeater near field may be similar to the extent of the transmitter near field. In other examples, an active repeater may be configured to emit a signal that may be larger in magnitude than the signal that was emitted by the transmitter.

Another physical limitation, discussed below, may arise due to accumulated phase delay across chained repeaters. Also as discussed below, compensation for the effects of phase accumulation may be achieved by introducing adjustable phase shifts in repeaters, in accordance with example embodiments.

D. Metamaterials and Phase Shift Adjustment

Generally, a phase shift may occur between the near field that a repeater couples with and the near field that is repeated by the repeater. Specifically, the phase shift may occur due to a propagation delay of the power signal as the signal is received and subsequently emitted by a repeater. Alternatively or additionally, the phase shift may occur, at least in part, due to propagation of the electromagnetic wave in a medium (e.g., air) between the transmitter and the repeater. Accordingly, each repeated near field produced by a given repeater will be shifted in oscillatory phase with respect to that produced by an earlier repeater. However, if the accumulated phase shift across repeaters in a chain approaches one-quarter of the resonant wavelength, the transmitter and the chain of repeaters will appear to behave like a radiating antenna array, and thus radiate power as an electromagnetic wave in a far-field region of the antenna array. Such radiative behavior may result in overall power loss and inefficient power delivery.

Radiation loss due to cumulative phase delay across a chain or an array of repeaters may be suppressed or eliminated by including one or more phase adjustment elements in some or all of the repeaters. Specifically, a repeater having a phase adjustment element may adjust the phase of its repeated near field. By appropriate phase adjustment, the near field of the system may be extended without becoming a radiating antenna array. Phase adjustment may be provided in a repeater by lumped elements, such as inductors and capacitors, or by use of metamaterials, or both. Additionally and/or alternatively, the phase may be adjusted by distributed elements that may have capacitive and/or magnetic properties.

A repeater may include phase adjustment elements that may be configured to adjust the phase of a magnetic and/or electric field. As explained above, a near field type may depend on the operational state of the system. For example, a system may operate using inductive resonant coupling and/or capacitive resonant coupling. As such, the near field that is produced by a transmitter, and which is then repeated by each repeater, may be a magnetic field (associated with inductive resonant coupling) and/or an electric field (associated with capacitive resonant coupling). Within examples, the phase adjustment elements included in each repeater may include any circuit element operable to adjust the induced magnetic near field and/or the induced electric near field that is associated with each signal emitted by each repeater. For example, each repeater may include lumped or distributed reactive components (i.e. capacitors and inductors) arranged to adjust a phase of a received signal before and/or while repeating the signal.

In some embodiments, the phase adjustment elements of a repeater may be operable to shift the phase of a near field that the repeater may couple with. The repeater may subsequently regenerate the phase shifted near field such that another repeater and/or a receiver may couple with the phase shifted near field. More specifically, the repeater may shift the phase of the near field with respect to a phase of the near field at the respective location of the repeater. Alternatively, the repeater may shift the phase, of the near field that it couples with, with respect to a reference phase of the oscillating field generated by the transmit-resonator of the transmitter.

In accordance with some embodiments, a repeater may include a metamaterial configured to couple with a near field, and to repeat the near field with a finite phase shift. Generally, a metamaterial is a material that may have properties not found in nature, due to the fact that its properties depend on its structure rather than on the composition of its elements. As a non-limiting example, the metamaterial may include a split-ring resonator. In some embodiments, a metamaterial may be configured to have a negative permeability, $\mu$, and a negative permittivity, $\epsilon$. Such metamaterials may have a negative index of refraction, and thus may be referred to as negative index metamaterials (NIM). The index of refraction of a material may be defined as the ratio of the speed of light to the phase velocity in a material.

Therefore, a field that is incident on or that couples with an NIM may be refracted with a negative phase velocity. Accordingly, a NIM may be configured to adjust the phase of a field oscillating at a resonant frequency to which it may couple. In some embodiments, all of the repeaters of a system may include a NIM with negative permeability and permittivity at the resonant frequency. In other embodiments, some of the repeaters of a system may be NIM, while other repeaters may be repeaters that include lumped/distributed reactive components.

Within examples, NIM may be configured such that the material may be adjustable so as to controllably shift the phase of a field (magnetic and/or electric) at least based on a given resonant frequency. As explained herein, a repeater may couple with fields oscillating within a range of different frequencies, as the resonant frequency of the system may be adjusted dynamically. Accordingly, the metamaterial (NIM) repeater may be tunable so as to couple with, and shift the phase of, fields oscillating at different frequencies. In some embodiments, a metamaterial (NIM) repeater may be an active repeater, which may "inject" power into the repeated field with the shifted phase.

Within examples, each repeater may be configured to adjust the phase such that the near field of the emitted signal (i.e. repeated field) is in phase (or nearly so) with the near field produced by the earlier link in the array of repeaters. Accordingly, the phase of each repeated field may be "locked" to the phase of the transmitter near field. In such a scenario, phase-locking may prevent the overall electrical length of the repeaters from approaching one-quarter of the resonant wavelength. Such a configuration of repeaters may be referred to as a "phase locked" array of repeaters.

However, shifting the phase of fields in a system may increase the overall reactive power in the system. The increase in the reactive power in the system may result in an increase of power losses in the system. Accordingly, in some embodiments, each repeater may be configured to adjust the phase of each repeated field by a determined amount such that the reactive power is reduced, while keeping the overall electrical length of repeaters in an array shorter than one-quarter of the resonant wavelength. As such some repeaters need not be configured to shift the phase of their respective repeated field to avoid increasing the overall reactive power in the system. In some examples, the controller of a system may adjust the phase shifting elements of one or more repeaters in order to adjust the reactive power in the system. This adjustment of reactive power in a system may be viewed as similar or analogous to a power factor correction, which may occur in conventional power transmission systems.

Figure 13:
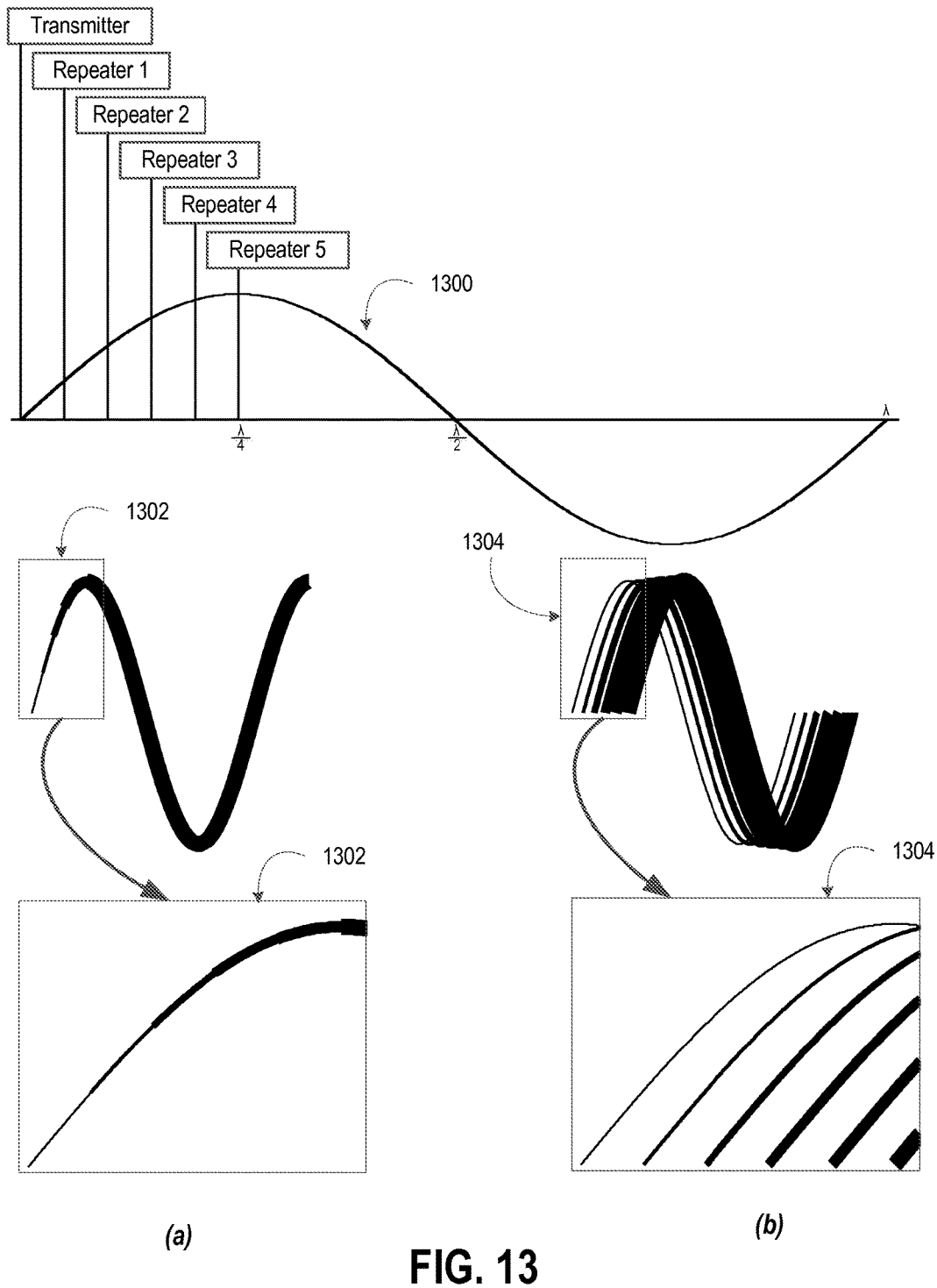
FIG. 13 illustrates a phase shift of a chain of repeaters repeating a transmitter near field, according to an example embodiment.

FIG. 13 is a conceptual illustration of a relationship between a chain of repeaters and the phases of the respectively repeated near field at each repeater, according to an exemplary embodiment. By way of example, a transmitter and a chain of five repeaters (labeled Repeater 1-5) are shown. For purposes of illustration, one full wavelength 1300 of a near field transmitted by transmitter as the resonant frequency of the system is shown. Also by way of example, the repeaters are placed at increments of 0.1 wavelength from the transmitter, so that the last repeater in the chain is at one quarter wavelength from the transmitter. Wave 1300 is not representative of the amplitude of the transmitter field, as the transmitter field decays with distance. Rather, wave 1300 is meant to illustrate a wavelength of the transmitter field oscillating at the resonant frequency of the system.

FIG. 13A illustrates a resonant transmitter near field, which is repeated by the repeaters 1-5 for the example case that includes no phase adjustment at the repeaters. As illustrated in magnified image 1302 of FIG. 13A, each repeated field adds to the aggregate near field, and as such, the line representing the wave gets thicker as each repeater repeats the field that it couples with. Furthermore, each repeated field is phase shifted with respect to the field that precedes it. Thus, the aggregate of the phase shifted fields, at the 5th repeater, approaches one quarter wavelength of the transmitter near field. Accordingly, and as explained above, the aggregate of the transmitter field and each of the repeated fields of repeaters 1-5, may cause the transmitter and the chain of repeaters to behave like a radiating antenna. Thus power may be radiated as an electromagnetic wave into a far-field region of the transmitter.

FIG. 13B illustrates a resonant transmitter near field, which is repeated by the repeaters 1-5 for the example case that now includes phase adjustment at the repeaters. As illustrated in FIG. 13B, the phase of each repeated field is phase shifted, by its respective repeater, to match the phase of the transmitter near field. This may be an example of a "phase locked" array of repeaters described above. More significantly, and as illustrated in magnified image 1304 of FIG. 13B, the aggregate of the phase shifted fields does not combine into a quarter wavelength of the transmitter near field. Thus, the transmitter and repeaters 1-5 may not behave like a radiating antenna. Accordingly, far field radiation may be suppressed or eliminated.

Furthermore, both the passive and active repeaters may include side channel communication interfaces, described above, in order to communicate with other components of the system, such as the transmitter, the receiver(s), and the repeaters. For example, an active repeater may receive instructions from a controller of the system, which may be located in the transmitter, to "inject" a specific amount of power into its repeated field. In an example, the controller may make the determination for an active repeater to inject power based on information received from a receiver at the end of a repeater chain that includes the active repeater.

Furthermore, an array of repeaters configured to control the phase of a field may behave as a sort of collective metamaterial. As explained above, a metamaterial is a material that may have properties that are not found in nature. As the array of repeaters may control the phase shift in a way that is different from the natural phase shift that occurs while repeating and/or propagating a field, the array of repeaters may be considered as a collective metamaterial. Such an array of repeaters may be described as a metamaterial configured to suppress far field radiation by controlling the phase of the field with which the metamaterial couples.

Accordingly, a chain or an array of repeaters configured to control the phase of a near field may be modeled as a single metamaterial element/unit. For example, the single metamaterial unit may couple with a transmitter near field at one end. On the other end, a receiver may couple with the phase shifted near field that is repeated by the single metamaterial. The phase shift of the repeated field may be the aggregate of the phase shifts of the individual repeaters that make up the metamaterial. In another example, the metamaterial may be a "phase-locked" metamaterial, such that the phase of the near field that it repeats is identical to, or nearly identical to, a phase of the near field of the transmitter.

Figure 14:
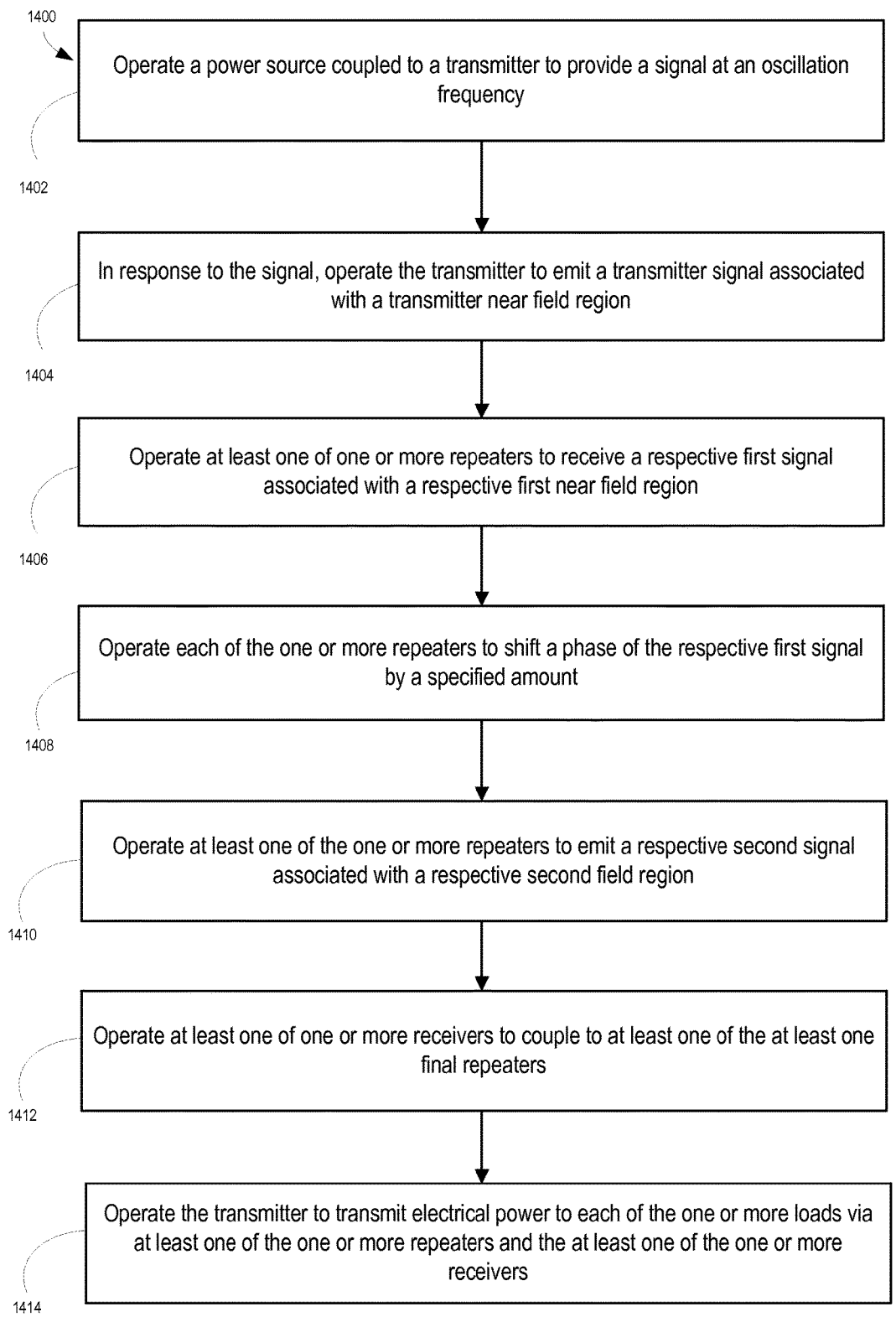
FIG. 14 illustrates a method of controlling the phase shift of near fields in a system, according to an example embodiment.

FIG. 14 illustrates a flowchart showing a method 1400 that may adjust the phase of a signal from a transmitter near field as it is repeated by one or more repeaters of a system, according to an exemplary embodiment. In some embodiments, method 1400 may be carried out by a controller of a system.

As shown by block 1402, of FIG. 14, method 1400 may involve causing a power source coupled to a transmitter to provide a signal at an oscillation frequency. The oscillation frequency may be one of the one or more resonant frequencies of the transmit-resonator of the transmitter. As shown by block 1404, method 1400 further includes causing the transmitter, in response to the signal from the source, to emit a transmitter signal associated with a transmitter near field region. Accordingly, as shown by block 1406, the method further includes causing at least one of the one or more repeaters to receive a respective first signal associated with a respective first near field region. Furthermore, the method includes causing each of the one or more repeaters to shift a phase of the respective first signal by a specified amount. The respective first near field region of each repeater may be the transmitter near field, or may be a near field that had been repeated by a prior repeater.

The method 1400 may cause at least one of the one or more repeaters to emit a respective second signal associated with a second respective near field region, as shown by block 1410. An extent of the second respective near field region may be configured to be farther away from the transmitter than the first respective near field. Block 1412 may include causing at least one of one or more receivers to couple to at least one of the at least one final repeater. Accordingly, a wireless resonant coupling link may be established between the each of the one or more receivers and at least one of the at least one final repeater. As such, block 1414 may include causing the transmitter to transmit electrical power to each of the one or more loads via at least one of the one or more repeaters and the at least one of the one or more receivers.

E. Dynamic Wireless Power Distribution System Probe

Resonant wireless power transfer can be viewed as power transmission via one or more wireless transmission "paths" or "links." In addition to generating an oscillating field for wireless power transmission as described herein, the transmitter may also emit a "probe" signal in order to ascertain various properties of the wireless power transmission "paths" and entities that interact with the power transferred via the paths (e.g., receivers, repeaters, etc.). Such a probe can be used as a tool for dynamic diagnosis and analysis of electrical "circuit" properties of a wireless power distribution system.

Thus, in accordance with example embodiments, a transmitter may include a signal generator, or the like, configured to transmit one or more types of wireless signals in order to determine one or more electromagnetic properties of propagation paths in the region in which wireless power transfer may occur, and to further help distinguish and/or disambiguate between legitimate receivers and possible unauthorized devices and/or parasitic loads. More specifically, the signal generator may generate test signals that span a broad frequency range to provide a frequency sweep, in a manner like that of a vector network analyzer (VNA) frequency sweep. By analyzing phase and amplitude information of transmitted signals and their reflections, the transmitter may thus determine electrical properties of a reflecting entity, as well as of the transmission path between the transmitter and the reflecting entity.

In further accordance with example embodiments, the transmitter may include a test-signal receiver component configured to receive and measure reflections of transmitted test signals. A controller associated with the transmitter may then determine one or more electromagnetic properties of a reflecting entity by comparing the transmitted test signals with their corresponding reflections. By analyzing reflections of transmitted test signals, electromagnetic properties of various propagation paths, including the presence of, and electrical distances to, reflecting entities, and electromagnetic properties of those reflecting entities, may be ascertained. In practice, electrical distance can be measured in terms phase shift or delay of a reflected signal with respect to a transmitted (reference) signal. With this information, power delivery to legitimate devices can be optimized, and illegitimate power consumption can be identified and suppressed. Measurements and analyses can be carried out continuously, periodically, or episodically.

Test signals can carry both amplitude and phase information. In further accordance with example embodiments, both types of information can be analyzed to determine properties of a reflecting entity and of the propagation path between the transmitter and the reflecting entity. In an example application, test signals may be generated as continuous waves of one or more frequencies, such one or more continuous sinusoids. In particular, by varying the frequency of a sinusoid (or other form or continuous wave) with time, either continuously or in a stepwise fashion, a test signal can be generated that sweeps across frequencies. For a typical application, the frequency may be varied linearly with time such that the frequency sweep resembles a ramp (or staircase) in frequency with time. Such a sweep can be repeated from time to time, for example. The reflections of a sweep signal can be measured by the test-signal receiver and analyzed in a manner similar to a frequency sweep carried out with vector network analyzer. For example, the reflected sweep signal may display frequency-dependent phase delays corresponding to electrical distance to a reflecting entity, as well phase delays resulting from frequency-dependent interactions with the reflecting entity In an alternative example application, test signals can be time-pulse modulated. With this arrangement, reflections may correspond to individually reflected pulses. Again, reflected signals may be measured by the test-signal receiver. Measurement of pulsed signals and their reflections may be used for time-of-flight analyses and/or other ranging techniques. Single frequency continuous wave test signals, frequency sweep test signals, and pulsed test signals are non-limiting examples of the types of test signals that can be used to probe electrical properties of a wireless power transmission region of a transmitter Electromagnetic properties determined by analysis of test signals and their reflections can include impedance and admittance, for example. Reflecting entities can include receivers (both legitimate and unauthorized), repeaters, parasitic loads, and other that can interact electrically with an electric and/or magnetic field. In an example embodiment, an analysis of phase and amplitude information from test pulses and their respective reflections may be used to determine electrical "locations" of sources of impedance. For example, frequency-dependent characteristics of reflections and measured phase delays can be used to map out electrical properties along a propagation path. This can be viewed as analogous to how a VNA may locate stubs, taps, or shorts along a transmission path. In the context of wireless power delivery via an oscillating field, test signals can provide a sort of virtual "circuit diagram" of entities as mapped out in the wireless power delivery region.

In accordance with example embodiments, the virtual circuit diagram provided by a frequency sweep can be used in the virtual circuit model of the system to enhance the accuracy of the model and to help identify legitimate receivers. As an example, by virtue of detected reflections, repeaters may appear as "hops" along propagation paths. Phase delays can then be used to ascertain locations of repeaters in terms of electrical distances to discontinuities in path impedances, for example. In an example embodiment, mapping the system with one or more frequency sweeps can be carried out as part of the system initialization and repeated from time to time to update the map. The initial map can then be used to associate circuit locations with respective receivers as they make their presence known (e.g., authenticating, requesting power, etc.).

In an example system, analysis of phase delay and amplitude from a frequency sweep can be used to measure the impedance and coupling constant of a receiver. This information can also be input to a virtual circuit model of the system to improve the accuracy of the deduced coupling constant at the operational resonant frequency of power transfer, and thereby further optimize power transfer.

In further accordance with example embodiments, a frequency sweep test signal and its reflection from a receiver can be used to determine a number of repeater hops to the receiver. This can in turn be used to distinguish between a legitimate receiver known to be a certain number of receiver hops away from the transmitter and an otherwise apparently similar unauthorized receiver determined to be a different number of hops away. For example, if analysis of a frequency sweep indicates the presence of more than one receiver having the same (or nearly the same) impedance, these receivers may still be disambiguated by the respective number of repeater hops to each respective receiver, as also determined from analysis of test signals and reflections. A receiver determined to be at an unrecognized number of hops away can thus be considered an unauthorized receiver, in which case the transmitter may take actions to prevent power transfer, as described above.

In accordance with example embodiments, the controller of the transmitter can carry out the analysis of transmitted and reflected test signals, including continuous wave signals, frequency sweep signals, and time-pulse modulated signals, among others. In particular, the controller can control a signal generator to cause a specified type of test signal or signals. The controller can also control a test-signal receiver configured to detect one or more reflections and correlate them with corresponding transmitted test signals. The controller can also perform one or more analyses of the transmitted and reflected signals to determine the various properties and results described above.

Within examples, the controller may use test signals described herein to optimize or otherwise adjust wireless power transfer as elements are added to or removed from the system. In some embodiments, a system may incorporate portable and/or non-stationary repeaters to extend the range of a transmitter. For example, a portable repeater may be added into the system in order to increase the range of a transmitter in a specific direction. After an authentication process described herein, the controller may probe the environment of the system using a frequency sweep or other form of test signal in order to determine one or more electromagnetic properties of the added propagation path.

Furthermore, as explained above, a repeater may include phase elements, which may be adjustable. After determining the properties of the propagation path that may include the repeater, the controller may accordingly send instructions to the repeater that direct its operation. Within examples, the controller may adjust the phase adjusting elements of the repeater. In other examples, if the repeater is an active repeater, the controller may also determine the amount of power that the repeater may want to inject into its repeated field.

Figure 16:
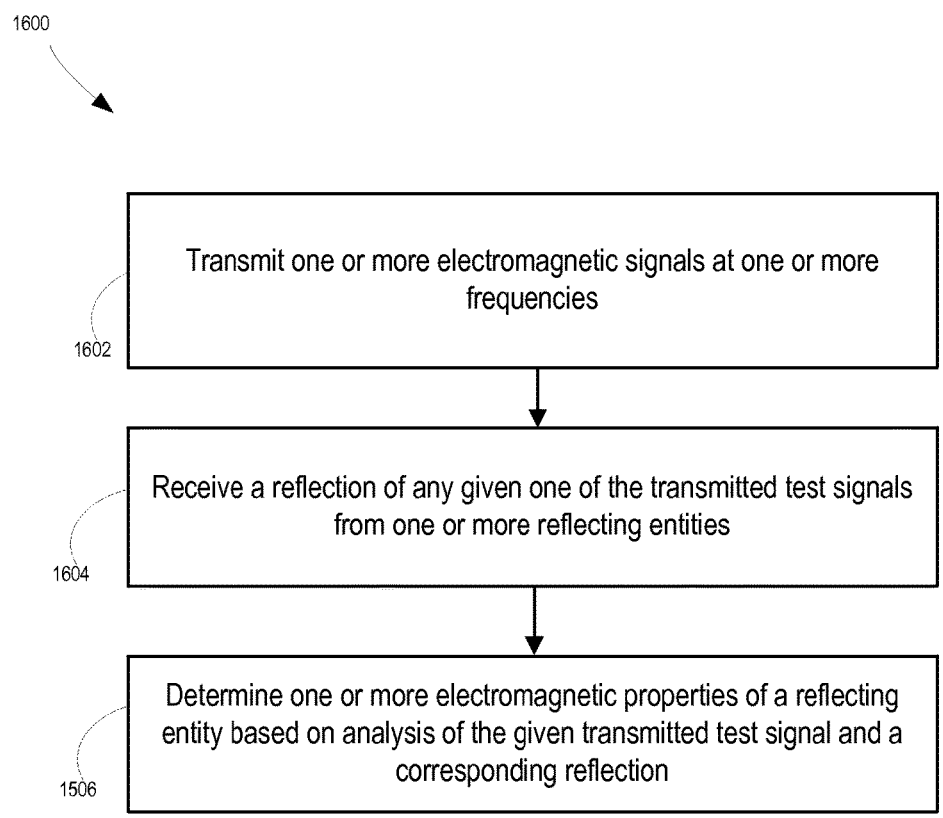
FIG. 16 is a flowchart illustrating a method of using a high-frequency test pulse to determine one or more properties of reflecting entities in a near-field region of an oscillating field of a transmitter, according to an example embodiment.

Operations relating to use test signals described above may be implemented as a method by one or more processors of a transmitter. In particular, the transmitter can include a transmit-resonator that is configured to couple power from a power source into an oscillating field generated by the transmit-resonator resonating at a resonant frequency. As discussed above, the oscillating field can be an oscillating electric field, an oscillating magnetic field, or both. An example method 1600 is illustrated in the form of a flowchart in FIG. 16.

At step 1602, a signal generator of the transmitter transmits one or more electromagnetic test signals at one or more frequencies. In accordance with example embodiments, the transmitted test signals will carry both phase and amplitude information.

At step 1604, a test-signal receiver of the transmitter receives a reflection of any given one of the transmitted test signals from one or more reflecting entities. By way of example, a reflecting entity could be a repeater or a receiver. Like the given transmitted test signal, the reflection will carry both phase and amplitude information.

At step 1606, a processor of the transmitter determines one or more electromagnetic properties of a reflecting entity based on an analysis the given transmitted test signal and a corresponding reflection. In particular, phase and amplitude information of the given transmitted test signal and its corresponding reflection can be analyzed in a system of equations to determine such properties as impedance of the reflecting entity and/or characteristic impedance of a propagation path followed by the given transmitted test signal and its reflection.

It should be understood that steps or blocks of method 1600 as described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

F. Example Applications

The example wireless power delivery systems described herein may be operable to provide power to the any number of devices, systems, and/or elements of an "Internet of Things." The Internet of Things may include any number or combination of devices in a variety of configurations and/or arrangements. In particular, one or more transmitters and optionally one or more repeaters may be spatially organized to provide resonant oscillating fields within a given region, zone, area, volume, or other spatial bound. Other devices acting as receivers may each include receive-resonators so that they may be operably coupled to these resonant oscillating fields when located within the spatial bound. In such a scenario, each device may operably receive power via the resonant oscillating fields and may provide the power to one or more loads.

An example implementation may provide a household wireless power delivery system. For example, appliances and other electrically-powered household devices may be configured to receive power from transmitters and repeaters located throughout the household.

In such a scenario, the wireless power delivery system may increase the convenience of using electrically-powered devices. As an example, the use of the devices need not be limited to locations in the household near where wired power is accessible (e.g., wall outlets). In addition, the household may be dynamically reconfigured because devices with different functions can be easily relocated in the household space without requiring new wired power connections.

In some embodiments, a greater number of electrically-powered devices may be powered in the household at least because delivery of wireless power need not depend on a fixed number of physical connections to wall outlets, power strips, or extension cords. Rather, the wireless power delivery system may be configured to provide power to a large number of devices (e.g. hundreds or thousands of devices, or more). Furthermore, the wireless power delivery system may be configured to more-easily accommodate upgrades. In contrast to adding wall outlets and installing electrical conduit in the household, an upgrade to a wireless power delivery system may include an-over-the-air software update. In such a scenario, the software update may enable the wireless power delivery system to provide wireless power to a larger number of devices by improved time-domain multiplexing. Other upgrade types, functions, and/or purposes are possible.

Wireless power delivery systems contemplated herein may provide increased household automation without extensive wiring. For instance, the household wireless power delivery system may provide power to a system of automated windows, window treatments, doors, and/or locks. Also, the household wireless power delivery system may be configured to accommodate room thermostats and other environmental monitoring devices in each room. Additionally, the household wireless power delivery system may be operable to extend to exterior areas. For example, wireless power delivery to exterior areas may include providing electrical power to automated garden sprinklers, outdoor lighting, outdoor cameras, security devices, and/or motion, heat, or other sensors. Furthermore, the household wireless power delivery system may allow controls (e.g., control panels for automated devices) to be flexibly and/or moveably located conveniently throughout the household.

As described above, example wireless power delivery systems may be configured to detect and identify various receivers within a local proximity. For example, the household wireless power delivery system may be configured to locate household items that are resonantly coupled to it. Furthermore, the ability to locate household items need not be limited to electrically-powered devices that receive power from the wireless power delivery system. Non-electrically-powered devices, such as keys, tools, utensils, and clothing, may also be located if, for example, such objects may include a characteristic tag that may be identifiable by the wireless power delivery system. For instance, the objects may incorporate an RFID tag, may have a characteristic RF impedance, or may include a receive-resonator as described elsewhere herein. Other types of tags or location devices may be incorporated into objects so as to find them via the wireless power delivery system.

In contrast to battery-powered devices, the household wireless power delivery system may provide continuous power to a device without need for a battery or another type of energy-storage device. For instance, a robotic vacuum cleaning device receiving wireless power may move continuously within the household space without need for replacement or recharging of batteries.

In another example implementation, a hospital wireless power delivery system is contemplated. Electrically-powered medical devices may be configured to receive power from transmitters and/or repeaters located throughout the hospital. The hospital wireless power delivery system may provide advantages that are similar to the household wireless power delivery system above. For instance, medical equipment and other devices can be easily and conveniently moved within the hospital without need for new wired power connections. Additionally, the wireless power delivery system may be employed to locate hospital items that are coupled to the resonant oscillating fields of the wireless power delivery system. In particular, surgical items may include a tag with a receive-resonator and/or a characteristic impedance detectable by the wireless power delivery system. In such a scenario, locating surgical items may help ensure nothing is inadvertently left in a surgical site before closing the body cavity.

Currently, the use of portable electronic devices, such as phones, computer tablets, computer laptops, and watches, may be limited by the extent of their rechargeable battery power or access to a fixed wall outlet. Furthermore, the recharging process often requires a power connector to be attached to, and detached from, the portable electronic devices. Repeated use of the power connector may lead to wear and tear and cause damage to the portable electronic devices.

Some portable electronic devices may employ conventional wireless power delivery systems. As described above, however, the coupling factor k in such conventional systems must be maintained at a sufficiently high level in order to establish efficient power transfer. In other words, the portable electronic devices must be to be located in close proximity to, and precisely positioned relative to, the transmitter. In conventional wireless power delivery systems, the transmitter must typically have access to a fixed wall outlet. As such, compared to wired recharging which also requires access to a fixed wall outlet, conventional wireless power delivery systems merely eliminate the need to physically attach a power connector to the portable electronic device and provide no additional positional freedom for the use of the portable electronic devices.

Thus, in yet another example implementation, wireless power delivery systems may be employed in common spaces, such as airports, cars, planes, trains, buses, etc., to conveniently allow portable electronic devices to be recharged and/or powered wirelessly. The portable electronic devices may include receive-resonators that can be coupled to the wireless power delivery system. In some cases, the recharging process may occur automatically without user action when a portable electronic device enters one of these common spaces. That is, the portable electronic device may automatically couple to wireless power delivery systems in proximity to the device. In other cases, a portable electronic device may need to be registered via a wireless power account and/or may need to be authenticated prior to receiving power from the wireless power delivery system. In some scenarios, the wireless power account may be a paid account that may be associated with a wireless communication network that may provide cellular (e.g. voice communication) and/or data services for the portable electronic device.

Figure 15:
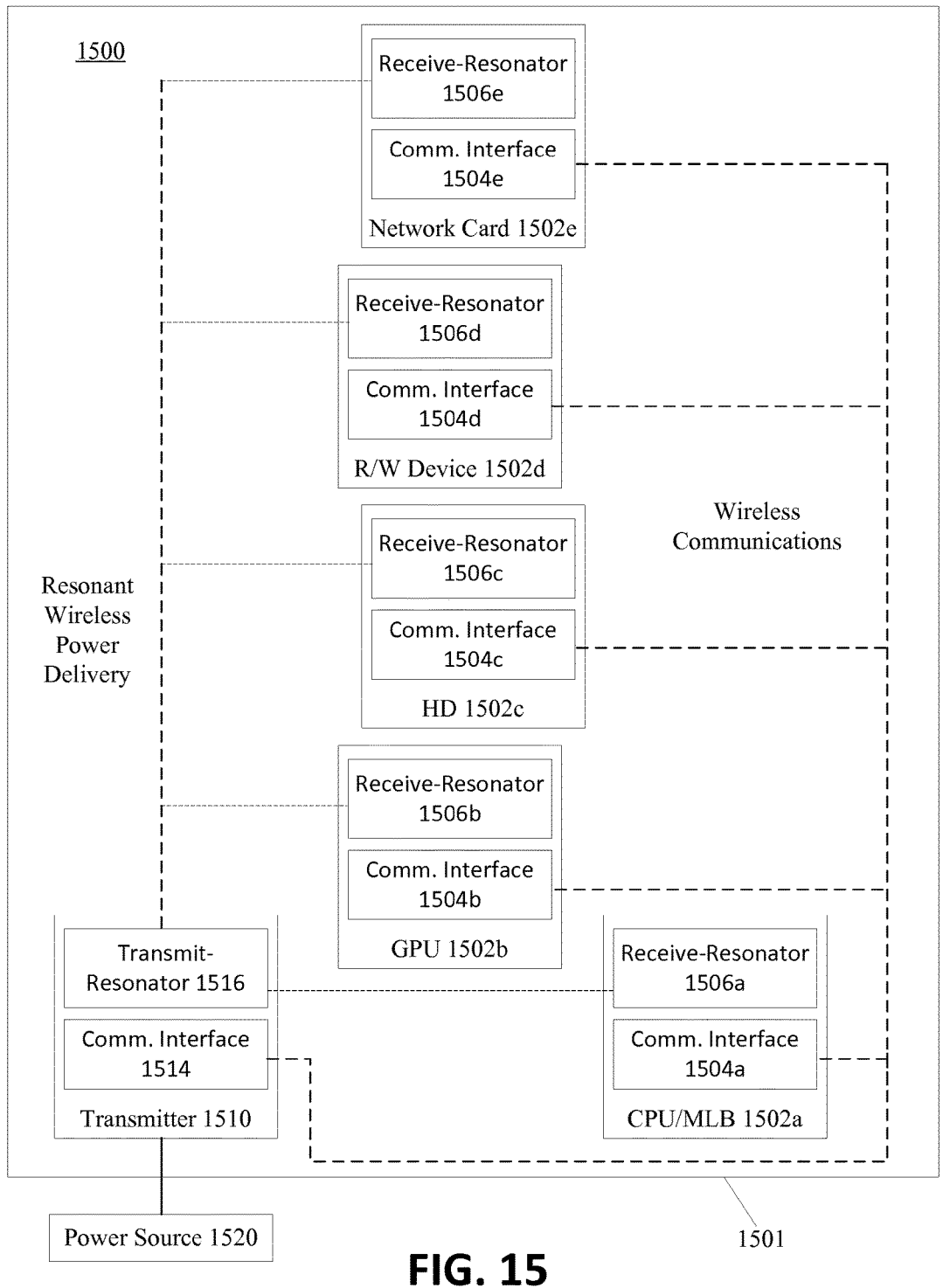
FIG. 15 illustrates an implementation of a wireless power delivery system according to an example embodiment.

In a further example implementation, aspects of the present disclosure may be employed to wirelessly assemble modular computer components. As shown in FIG. 15, a computer system 1500 includes a plurality of modular computer components, which may include a computer processing unit/main logic board (CPU/MLB) 1502a, a graphics processing unit (GPU) 1502b, one or more hard disks (HD) 1502c, a secondary optical read/write (R/W) device 1502d, and a wide area network (WAN) card 1502e. In other embodiments, the computer system 1500 may include other/additional computer components.

The GPU 1502b, the HD 1502c, the R/W device 1502d, and the network card 1502e may be communicatively coupled to the CPU/MLB 1502a. By exchanging data and other signals with the computer components 1502b-e, the CPU/MLB 1502a can centrally control the computer components 1502b-e. To establish such communications, the components 1502a-e may include respective wireless communication interfaces 1504a-e as shown in FIG. 15. For instance, the wireless communication interfaces 1504a-e may establish radio frequency (RF) communications (e.g., 60 Ghz RF) and/or optical freespace communications between the computer components 1502a-e.

The computer system 1500 also includes a wireless power delivery system to provide the components 1502a-e with power. In particular, one or more transmitters 1510 (and optionally one or more repeaters) are spatially organized to provide resonant oscillating fields within a defined spatial bound 1501. The spatial bound 1501, for instance, may correspond to the interior space of a hard case for a computer desktop/tower. Each transmitter 1510 may be coupled to a power source 1520 and may include a transmit-resonator 1516 to generate the resonant oscillating fields. The computer components 1502a-e may each include a respective receive-resonator 1506a-e configured to be coupled to the resonant oscillating field(s). When located within the spatial bound 1501, each computer component 1502a-e can receive power via the resonant oscillating field(s) to perform its respective function. In some embodiments, the transmitter(s) 1510 may be integrated with the CPU/MLB 1502a to centralize control of the computer system 1500 further.

By establishing wireless communications and receiving wireless power, the computer components 1502a-e within the spatial bound 1501 can function together as a computer. Advantageously, the wireless configuration of the computer system 1500 eliminates the need for a complex system of hardwired connections, e.g., wiring harnesses, to connect the computer components 1502a-e. Additionally, the wireless configuration facilitates installation and removal of the computer components 1502a-e, e.g., from a computer hard case. As such, the computer components 1502a-e can be easily maintained, repaired, and/or replaced. The computer system 1500 can also be upgraded just by placing additional computer components, such as additional hard disks 1502c, in the spatial bound 1501 without setting up any hardwired connections. In some embodiments, the CPU/MLB 1502a may detect the presence of new computer components via the wireless communications and thus incorporate the new computer components in the operation of the computer system 1500.

As described above, the wireless power delivery system may employ side-channel communications to coordinate aspects of the power transfer. As such, each transmitter 1510 may also include a wireless communication interface 1514 to communicate with each of the computer components 1502a-e acting as receivers. In other words, the communication interfaces 1504a-e may also be employed to provide side-channel communications with the transmitter(s) 1510.

As the computer system 1500 demonstrates, a system of components can be assembled according to a modular approach by employing a wireless power delivery system as well as wireless communications. Thus, in yet another example implementation, a computer data center may employ a system of transmitters and repeaters to allow computer servers to be implemented as modular components. The servers can receive power as long as they are located within the computer data center. In addition, wireless communications, e.g., freespace optical communications, may be employed to allow data exchange between the servers. The wireless power delivery system and the wireless communications allow the servers to be easily deployed in the computer data center without setting up wired power and wired network connections. The servers can be easily maintained, repaired, and/or replaced. Additionally, the servers can be spatially organized in the computer data center with greater freedom. Although the transmitters may receive wired power, the servers are not limited to locations where wired power and/or wired network connections are accessible.

Because the computer data center uses less wired power and fewer wired network connections, the physical design of the computer data center can place greater emphasis on other design considerations or features. For instance, the physical design can provide more optimal thermal management. Alternatively, the physical design may focus on lowering costs for building or implementing the computer data center.

G. Mobile Power-Delivery Systems

Some devices may operate out of range of a fixed resonant wireless power source. In some cases, it may be impractical or difficult to provide a fixed transmitter in a location where receivers operate or need to operate. Examples include field devices, such as mobile delivery/transportation vehicles, remote communication equipment, and clusters of devices in remote locations where fixed power sources are not available.

In accordance with example embodiments, a system for resonant wireless power delivery can include a mobile node or device that is a hybrid transmitter/receiver (TX/RX) configured to move, travel, or "commute" to remote receivers and deliver power wirelessly based on the techniques described herein. More specifically, a hybrid TX/RX device can include a transmitter component (TX) having functionality of a transmitter, a receiver (RX) component having functionality of a receiver, and a power store for storing power (e.g., a battery) for supply to receivers. The power store may also serve as a power supply for various functions of the hybrid TX/RX device including, but not limited to, mobility (commuting), communications, control, and processing. The TX/RX device can be configured in an autonomous unmanned vehicle operational to travel between one or more fixed transmitters and one or more specified locations that may be host to one or more remote receivers. In the location of the one or more remote receivers, the TX component may function to wirelessly transfer power from the power store to the one or more remote receivers. In the location of the fixed transmitter, RX component can be configured to receive power via wireless power transfer, and to use the received power to at least partially replenish (e.g., refill and/or recharge) the power store.

In an example embodiment, the hybrid TX/RX device may include a high-density stored power source, such as liquid fuel or a fuel cell. This source may be separate from the replenishable power store. A high-density stored power source can be used to power operations of the hybrid TX/RX device and/or to provide power for wireless electrical power transfer to receivers.

An autonomous unmanned vehicle can take on a variety of forms and modes of mobility. Non-limiting examples include an unmanned aerial vehicle (UAV), an unmanned ground vehicle (UGV), and an unmanned marine vehicle (UMV). A non-limiting example of a UAV is a multi-copter configured for aerial flight between locations and hovering at individual locations. A non-limiting example of a UGV is a robotic wheeled vehicle configured for driving between locations and "parking" at individual locations. A non-limiting example of a UMV is a robotic surface boat configured for traveling over the surface of a body of water (e.g., ocean, lake, river, etc.) between locations and floating on the surface at individual locations. A UMV could also be a robotic submarine vehicle. In some examples, the autonomous unmanned vehicle may not necessarily park or hover at a location, but rather just "drive by" the location, possibly at a reduced speed compared to the speed of travel to or between locations.

Further, an autonomous unmanned vehicle can be fully autonomous or semi-autonomous. A fully autonomous vehicle may be configured for operation without human assistance or intervention, except possibly for human actions in loading or installing instructions prior to operation, for example. A partially autonomous vehicle may be configured for operation with some degree of human assistance or intervention, such as remote or local control of at least some of the vehicle's operations. Unless otherwise specified or apparent from context, the term "autonomous unmanned vehicle" shall be taken herein to refer to both fully and partially autonomous unmanned vehicles.

In an example embodiment, an autonomous unmanned vehicle can be a UAV. Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others. The term "aerial vehicle" (manned or unmanned) used herein refers to a vehicle configured for flight, and, depending on context, applies either during flight or when the aerial vehicle is not flying. The term "airborne vehicle" (manned or unmanned) refers to a vehicle (such as an aerial vehicle) that is flying (or during flight).

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from 123 Main Street, Anytown, USA to 987 First Avenue, Anytown, USA), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone," "unmanned aerial vehicle system" ("UAVS"), or "unmanned aerial system" ("UAS") may also be used to refer to a UAV.

Figure 17:
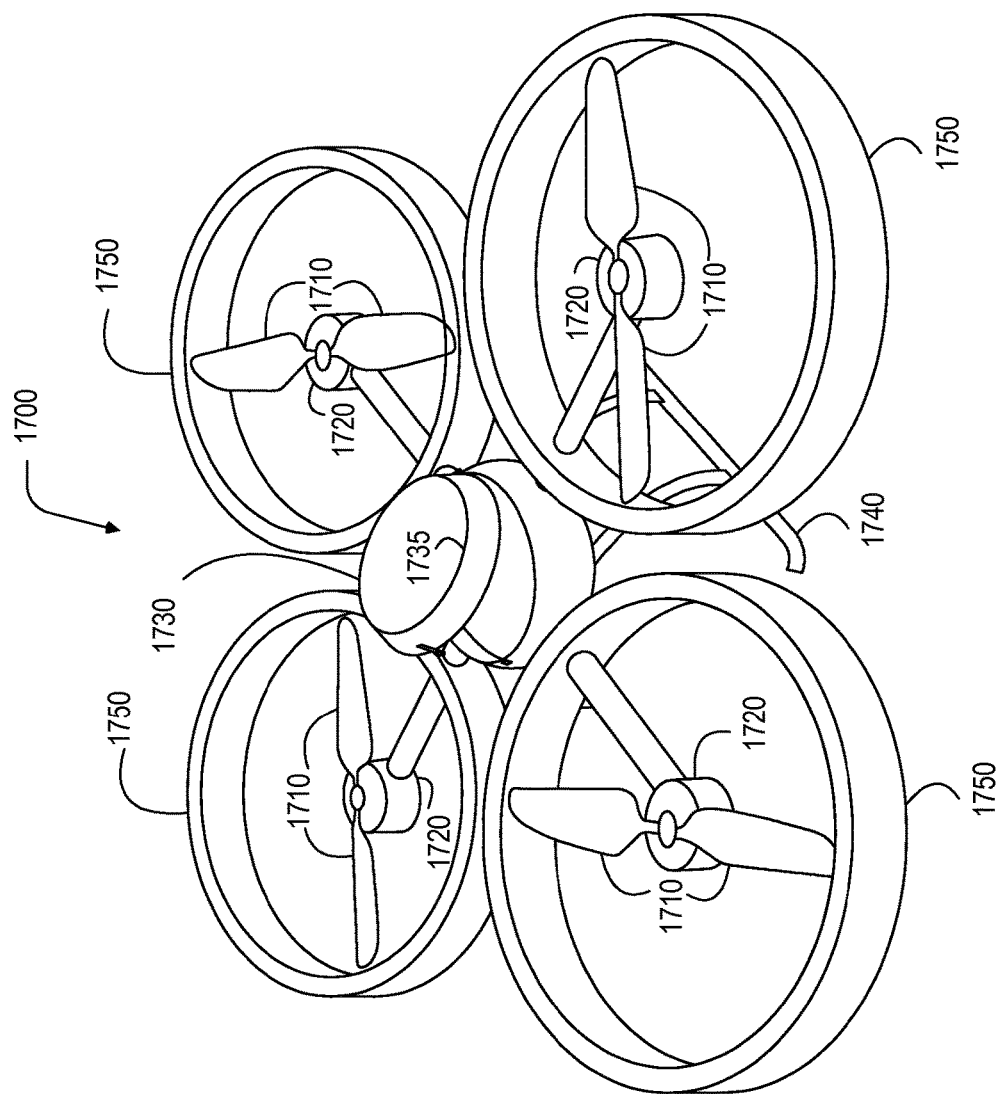
FIGS. 17, 18, 19A, and 19B are simplified illustrations of unmanned aerial vehicles, according to example embodiments.

FIG. 17 is a simplified illustration of a UAV, according to an example embodiment. In particular, FIG. 17 shows an example of a rotorcraft 1700 that is commonly referred to as a multicopter. Multicopter 1700 may also be referred to as a quadcopter, as it includes four rotors 1710. It should be understood that example embodiments may involve rotorcraft with more or less rotors than multicopter 1700. For example, a helicopter typically has two rotors. Other examples with three or more rotors are possible as well. Herein, the term "multicopter" refers to any rotorcraft having more than two rotors, and the term "helicopter" refers to rotorcraft having two rotors (e.g., a main rotor and a tail rotor).

Referring to multicopter 1700 in greater detail, the four rotors 1710 provide propulsion and maneuverability for the multicopter 1700. More specifically, each rotor 1710 includes blades that are attached to a motor 1720. Configured as such the rotors may allow the multicopter 1700 to take off and land vertically, to maneuver in any direction, and/or to hover. Furthermore, the pitch of the blades may be adjusted as a group and/or differentially, and may allow a multicopter 1700 to perform three-dimensional aerial maneuvers such as an upside-down hover, a continuous tail-down "tic-toc," loops, loops with pirouettes, stall-turns with pirouette, knife-edge, Immelmann, slapper, and traveling flips, among others. When the pitch of all blades is adjusted to perform such aerial maneuvering, this may be referred to as adjusting the "collective pitch" of the multicopter 1700. Blade-pitch adjustment may be particularly useful for rotorcraft with substantial inertia in the rotors and/or drive train, but is not limited to such rotorcraft.

Additionally or alternatively, multicopter 1700 may propel and maneuver itself and adjust the rotation rate of the motors, collectively or differentially. This technique may be particularly useful for small electric rotorcraft with low inertia in the motors and/or rotor system, but is not limited to such rotorcraft.

Multicopter 1700 also includes a central enclosure 1730 with a hinged lid 1735. The central enclosure may contain, e.g., control electronics such as an inertial measurement unit (IMU) and/or an electronic speed controller, batteries, other sensors, and/or a payload, among other possibilities.

The illustrative multicopter 1700 also includes landing gear 1740 to assist with controlled take-offs and landings. In other embodiments, multicopters and other types of UAVs without landing gear are also possible.

In a further aspect, multicopter 1700 includes rotor protectors 1750. Such rotor protectors 1750 can serve multiple purposes, such as protecting the rotors 1710 from damage if the multicopter 1700 strays too close to an object, protecting the multicopter 1700 structure from damage, and protecting nearby objects from being damaged by the rotors 1710. It should be understood that in other embodiments, multicopters and other types of UAVs without rotor protectors are also possible. Further, rotor protectors of different shapes, sizes, and function are possible, without departing from the scope of the invention.

A multicopter 1700 may control the direction and/or speed of its movement by controlling its pitch, roll, yaw, and/or altitude. To do so, multicopter 1700 may increase or decrease the speeds at which the rotors 1710 spin. For example, by maintaining a constant speed of three rotors 1710 and decreasing the speed of a fourth rotor, the multicopter 1700 can roll right, roll left, pitch forward, or pitch backward, depending upon which motor has its speed decreased. Specifically, the multicopter may roll in the direction of the motor with the decreased speed. As another example, increasing or decreasing the speed of all rotors 1710 simultaneously can result in the multicopter 1700 increasing or decreasing its altitude, respectively. As yet another example, increasing or decreasing the speed of rotors 1710 that are turning in the same direction can result in the multicopter 1700 performing a yaw-left or yaw-right movement. These are but a few examples of the different types of movement that can be accomplished by independently or collectively adjusting the RPM and/or the direction that rotors Y10 are spinning.

Figure 18:
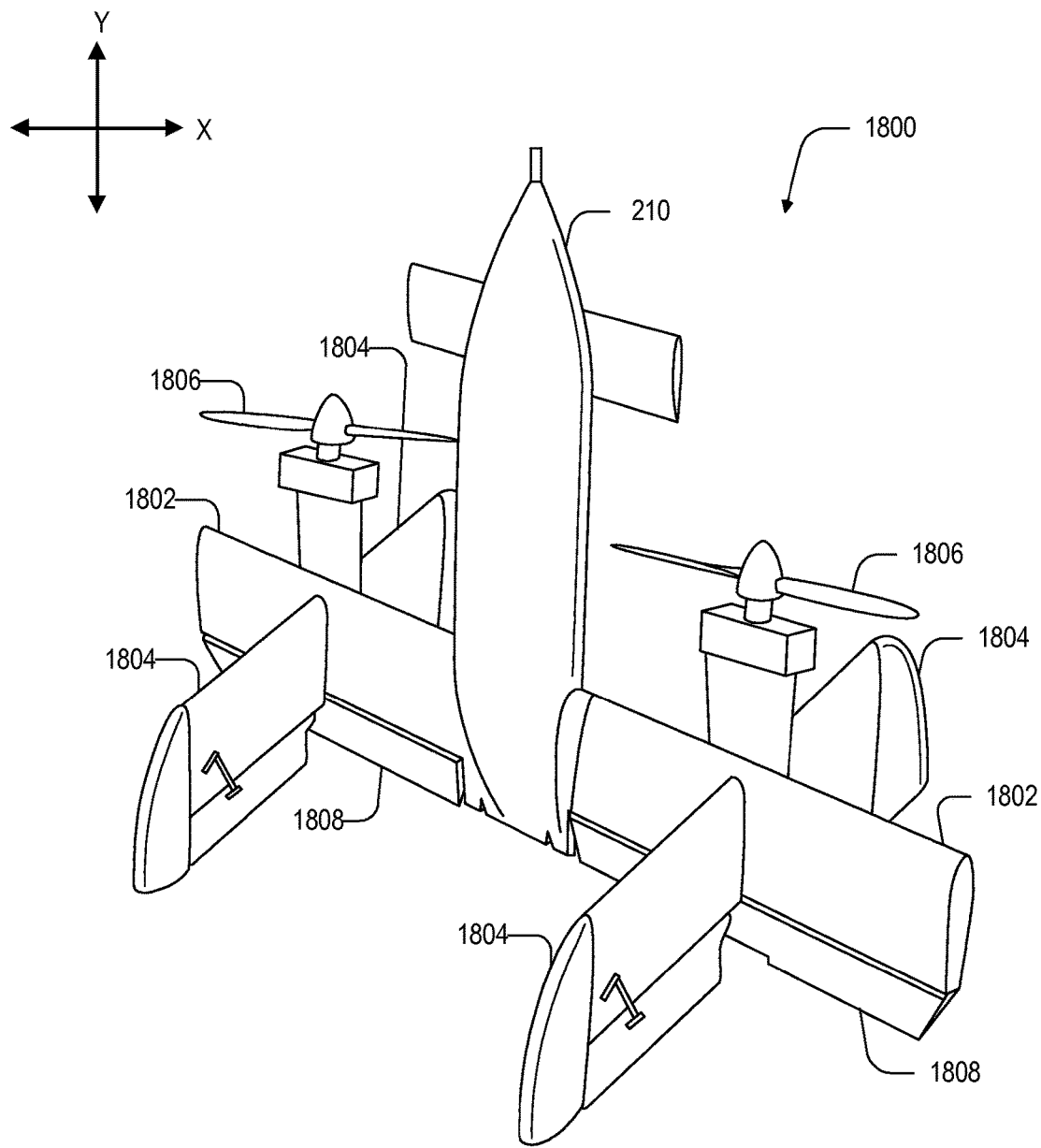

FIG. 18 is a simplified illustration of a UAV, according to an example embodiment. In particular, FIG. 18 shows an example of a tail-sitter UAV 1800. In the illustrated example, the tail-sitter UAV 1800 has fixed wings 1802 to provide lift and allow the UAV to glide horizontally (e.g., along the x-axis, in a position that is approximately perpendicular to the position shown in FIG. 18). However, the fixed wings 1802 also allow the tail-sitter UAV 1800 take off and land vertically on its own.

For example, at a launch site, tail-sitter UAV 1800 may be positioned vertically (as shown) with fins 1804 and/or wings 1802 resting on the ground and stabilizing the UAV in the vertical position. The tail-sitter UAV 1800 may then take off by operating propellers 1806 to generate the upward thrust (e.g., a thrust that is generally along the y-axis). Once at a suitable altitude, the tail-sitter UAV 1800 may use its flaps 1808 to reorient itself in a horizontal position, such that the fuselage 1810 is closer to being aligned with the x-axis than the y-axis. Positioned horizontally, the propellers 1806 may provide forward thrust so that the tail-sitter UAV 1800 can fly in a similar manner as a typical airplane.

Variations on the illustrated tail-sitter UAV 1800 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 1800 are also possible.

As noted above, some embodiments may involve other types of UAVs, in addition or in the alternative to multicopters. For instance, FIGS. 19A and 19B are simplified illustrations of other types of UAVs, according to example embodiments.

Figure 19A:
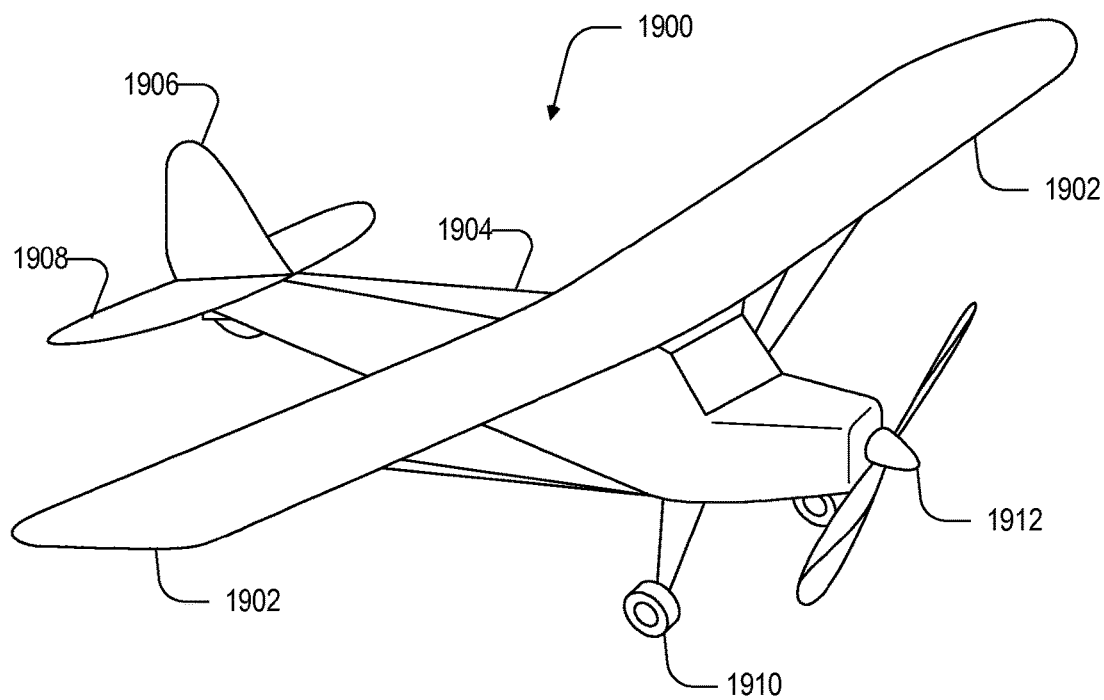

In particular, FIG. 19A shows an example of a fixed-wing aircraft 1900, which may also be referred to as an airplane, an aeroplane, or simply a plane. A fixed-wing aircraft 1900, as the name implies, has stationary wings 1902 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 19A depicts some common structures used in a fixed-wing aircraft 1900. In particular, fixed-wing aircraft 1900 includes a fuselage 1904, two horizontal wings 1902 with an airfoil-shaped cross section to produce an aerodynamic force, a vertical stabilizer 1906 (or fin) to stabilize the plane's yaw (turn left or right), a horizontal stabilizer 1908 (also referred to as an elevator or tailplane) to stabilize pitch (tilt up or down), landing gear 1910, and a propulsion unit 1912, which can include a motor, shaft, and propeller.

Figure 19B:
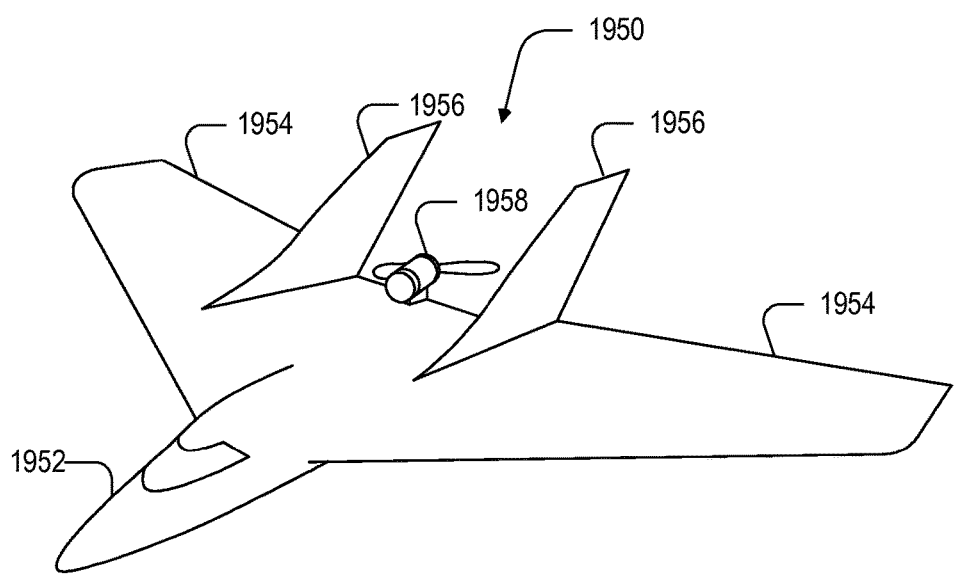

FIG. 19B shows an example of an aircraft 1950 with a propeller in a pusher configuration. The term "pusher" refers to the fact that the propulsion unit 1958 is mounted at the back of the aircraft and "pushes" the vehicle forward, in contrast to the propulsion unit being mounted at the front of the aircraft. Similar to the description provided for FIG. 19A, FIG. 19B depicts common structures used in the pusher plane: a fuselage 1952, two horizontal wings 1954, vertical stabilizers 1956, and a propulsion unit 1958, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In accordance with example embodiments, a mobile TX/RX device may travel to a location of a receiver that is otherwise out or range of any other fixed transmitter. At the location, the mobile TX/RX device may then position itself sufficiently close to the receiver so that the receiver can couple to an oscillating field produced by the TX component of the mobile TX/RX device. The mobile device may determine an appropriate distance of approach according to its resonant wavelength, for example. It may also determine the distance to the receiver using a range detector, such as a laser. Additionally or alternatively, it may use a test-signal generator in a mode that transmits a test pulse, as described above, and measure a round-trip delay based on a reflection from the receiver. Once the mobile TX/RX device determines it is sufficiently close to the receiver, it may begin wirelessly transferring power from its power store (e.g., a battery) to the receiver according the techniques described above.

In an example embodiment, the mobile TX/RX device may travel to a location of a transmitter. At the location, the mobile TX/RX device may then position itself sufficiently close to the transmitter so that its RX component can couple an oscillating field of the transmitter. The mobile device may determine the distance to the transmitter using a range detector, such as a laser. Additionally or alternatively, it may use a test-signal generator in a mode that transmits a test pulse, as described above, and measure a round-trip delay based on a reflection from the transmitter. Once the mobile TX/RX device determines is it sufficiently close to the transmitter, it may request wireless power according the techniques described above. It may use the received wireless power to power its own operations (e.g., flying or driving) and/or to replenish its power store (e.g., recharging a battery) for subsequent delivery of wireless power to one or more remote receivers.

In an example embodiment, the mobile TX/RX device may include a far-field receiver configured for receiving power from a far-field beaming transmitter. Non-exclusive examples of a far-field beaming transmitter include a microwave transmitter and a laser transmitter. In either example, power may be wirelessly transmitted to the far-field receiver at a level sufficient to replenish the power store. Far-field beaming of power may be used when a line-of-sight path between the far-field transmitter and the far-field receiver is available.

Figure 20:
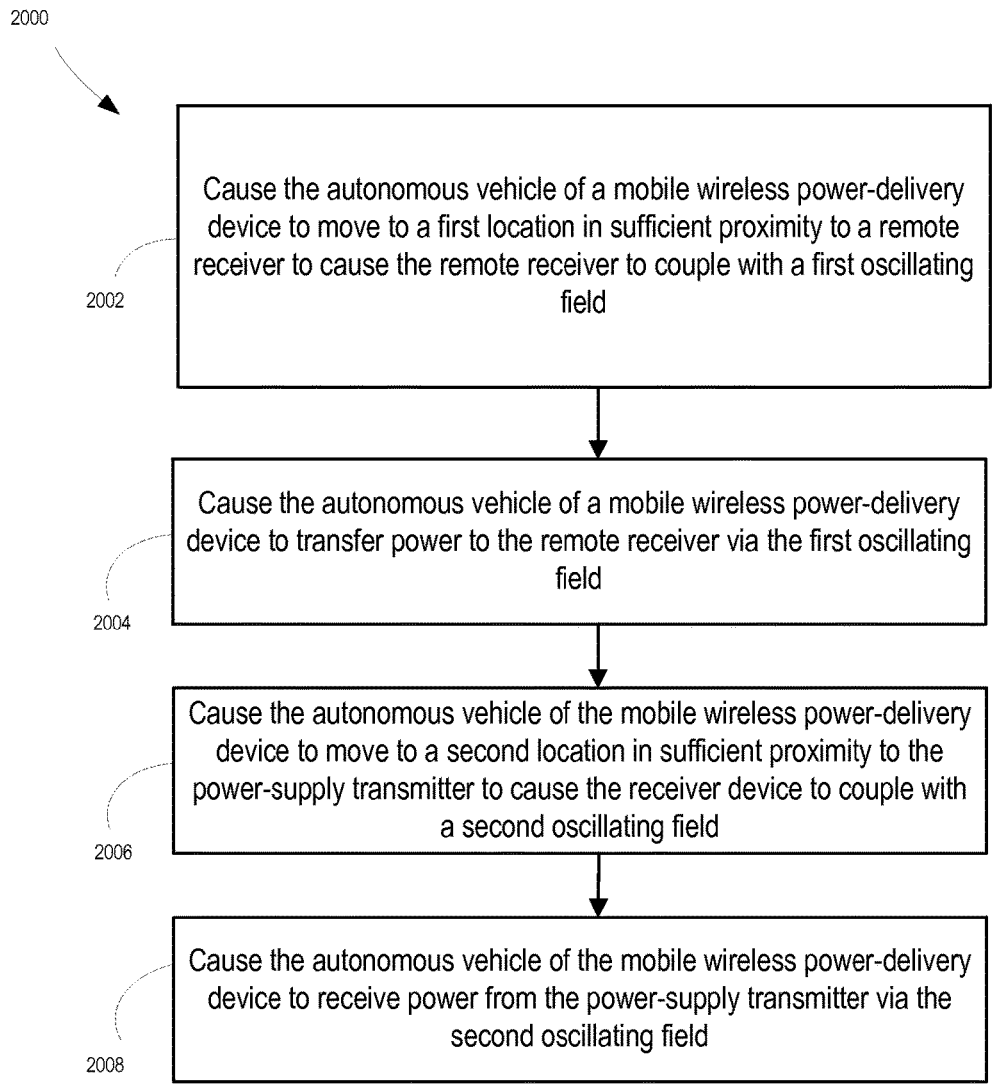
FIG. 20 illustrates a method of resonant wireless power transfer using a mobile wireless power-delivery device, according to an example embodiment.

Operations relating to mobile TX/RX device described above may be implemented as a method by one or more processors of the mobile TX/RX device. In particular, the mobile TX/RX device, more generally referred to as a mobile wireless power-delivery device (MWPD), can include an autonomous mobile vehicle, a power source, and a transmitter device including a transmit-resonator that is configured to couple power from the power source into a first oscillating field generated by the transmit-resonator resonating at a first resonant frequency. The MWPD can also include a receiver device including a receive-resonator configured to resonate at a second resonant frequency in response to being situated in a second oscillating field generated by a power-supply transmitter other than the transmitter device of the MWPD. Further, in response to the receive-resonator resonating at the second resonant frequency, the receiver device may transfer at least a portion of power of the second oscillating field to a rechargeable component of the power source. The first and second oscillating fields can each be an oscillating electric field, an oscillating magnetic field, or both. An example method is illustrated in the form of a flowchart in FIG. 20.

At step 2002, a controller of the MWPD causes the autonomous vehicle to move to a first location in sufficient proximity to a remote receiver to cause the remote receiver to couple with the first oscillating field. Step 2004 includes the controller causing the autonomous vehicle to transfer power to the remote receiver via the first oscillating field.

At step 2006, the controller of the MWPD causes the autonomous vehicle to move to a second location in sufficient proximity to the power-supply transmitter to cause the receiver device to couple with the second oscillating field. Step 2008 includes causing the autonomous vehicle to receive power from the power-supply transmitter via the second oscillating field.

It should be understood that method 2000 is described herein for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Figure 21:
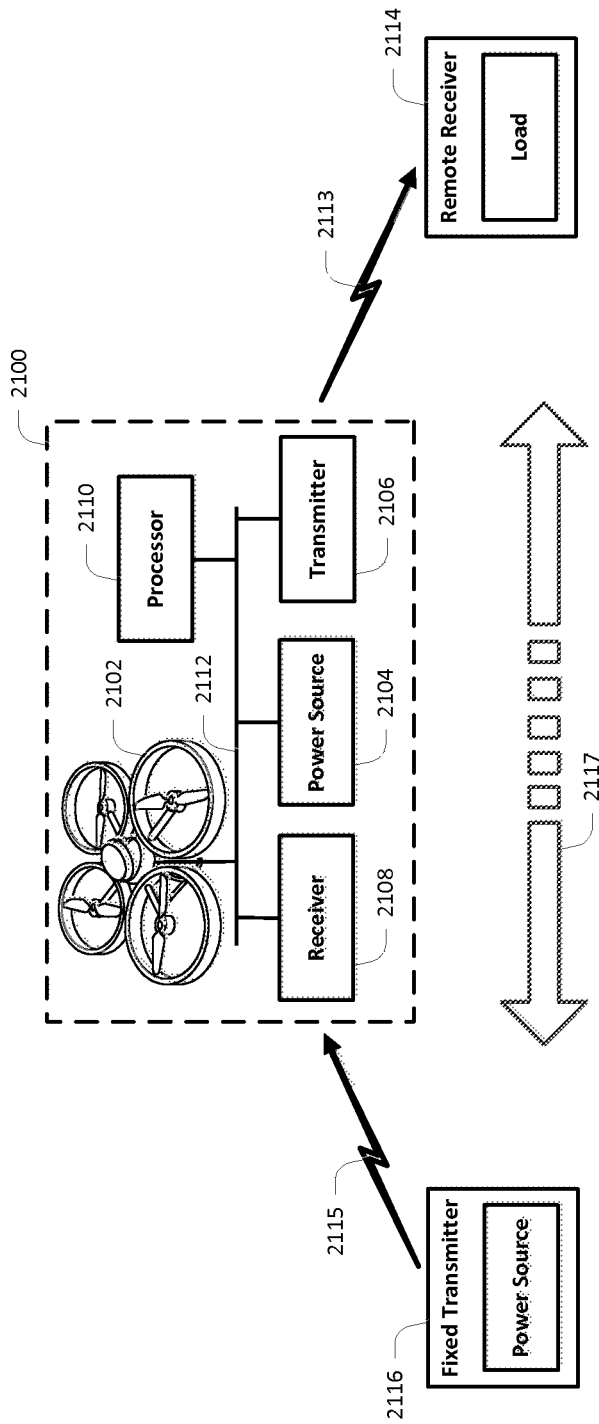
FIG. 21 is a simplified block diagram of a mobile power-delivery device, in accordance with an example embodiment.

FIG. 21 depicts a simplified block diagram of a MWPD 2100 in accordance with an example embodiment. As shown, the MWPD 2100 includes a representative autonomous vehicle 2102, which in practice may constitute a physical platform for some or all of the other components of the MWPD 2100. The MWPD 2100 also includes a power source 2104, a transmitter 2106, and a receiver 2108. By way of example, the components are depicted as being connected by a bus 2112, which could support communication between components, as well as power supply and/or other operational aspects of the MWPD 2100. Although not shown in FIG. 21, the MWPD 2100 could include a payload for carrying out other tasks.

By way of example, FIG. 21 also includes a representative remote receiver 2114, including a receiver load, and a representative fixed transmitter 2116, including its own power supply. Example operation, such as described above and discussed in connection with FIG. 20, is illustrated conceptually by the motion arrow 2117 representing travel of the MWPD 2100 between the fixed transmitter 2116 and the remote receiver 2114. While at the location of the fixed transmitter 2116, the receiver 2108 of the MWPD 2100 may receive power wirelessly via an oscillating field 2115 generated by the fixed transmitter 2116. The received power may be used to power operations of the MWPD 2100 and possibly to recharge or replenish the power source 2104 of the MWPD 2100. While at the location of the remote receiver 2114, the MWPD may deliver power wirelessly to the remote receiver via an oscillating field 2113 generated by the transmitter 2106 of the MWPD 2100. It will be appreciated that the simplified block diagram of FIG. 21 and the simplified example operation description are intended for illustrative purposes.

III. Conclusion

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A system for wireless power transfer, comprising:
a transmitter including:
a first resonator configured to receive power from a power source and to transfer the power, the first resonator including at least a first common mode capacitor formed between a first common mode conductor and ground, the first common mode capacitor configured to generate a common mode oscillating field at a common mode resonant frequency in response to receiving the power from the power source;
a first communication interface; and
a first controller configured to control the first resonator and to communicate data via the first communication interface; and
a plurality of receivers, one of the receivers including:
a second resonator configured to be wirelessly coupled to the first resonator to receive the power from the first resonator, the second resonator including at least a second common mode capacitor formed between a second common mode conductor and ground, the second common mode capacitor configured to resonate at the common mode resonant frequency in response to the common mode oscillating field generated by the first common mode capacitor; and a second communication interface configured to establish wireless side-channel communications with the first communication interface and to communicate the data with the first communication interface via the wireless side-channel communications, wherein the first controller is further configured to identify the one receiver from the plurality of receivers according to the data communicated via the wireless side-channel communications, and upon identifying the one receiver, the first controller is further configured to cause the first resonator to transfer the power to the second resonator, at least one of the transmitter or the one receiver includes a bidirectional RF coupler, the one receiver includes a second impedance, and the first controller is further configured to: (i) determine a measured response from the one receiver via the bidirectional RF coupler when the first resonator transfers the power to the second resonator, (ii) determine an expected response from a circuit model determined according to a nominal value for the second impedance for the one receiver, and (iii) identify one or more parasitic loads by comparing the measured response to the expected response.

2. The system of claim 1, wherein the first controller is pre-programmed to store the nominal value for the second impedance for the one receiver.

3. The system of claim 1, wherein the one receiver includes a second controller configured to communicate the nominal value for the second impedance to the first controller via the wireless side-channel communications.

4. The system of claim 1, wherein in response to identifying the one or more parasitic loads, the first controller is configured to cause the first resonator to transfer the power to the second resonator according to at least one of: time-division or frequency division multiplexing at least to minimize the power transferred to the one or more parasitic loads.

5. The system of claim 4, wherein the first controller is configured to communicate information regarding the multiplexing to the second controller via the wireless side-channel communications.

6. The system of claim 4, wherein the first controller and second controller are pre-programmed to store information regarding the multiplexing.

7. The system of claim 1, wherein in response to identifying the one or more parasitic loads, the first controller is configured to at least one of: (i) cause the transmitter to modify the power transferred from the first resonator to the second resonator to account for the one or more parasitic loads, or (ii) cause at least one of a first impedance for the transmitter or the second impedance of the one receiver to be modified to account for the one or more parasitic loads.

8. The system of claim 1, wherein in response to identifying the one or more parasitic loads, the first controller is configured to cause the first resonator to transfer at least some of the power via the first common mode capacitor and the second common mode capacitor.

9. The system of claim 1, wherein the first resonator further includes a first differential mode capacitor formed between two first differential mode conductors, the first differential mode capacitor configured to generate a differential mode oscillating field at a differential mode resonant frequency in response to receiving the power from the power source;

the second resonator further includes a second differential mode capacitor formed between two second differential mode conductors, the second differential mode capacitor configured to resonate at the differential mode resonant frequency in response to the differential mode oscillating field generated by the first differential mode capacitor; and in response to identifying the one or more parasitic loads, the first controller is configured to cause the first resonator to transfer at least some of the power via the first differential mode capacitor and the second differential mode capacitor.

10. The system of claim 1, wherein the first resonator further includes a first inductor, the first inductor configured to generate an inductive mode oscillating field at an inductive mode resonant frequency in response to receiving the power from the power source;

the second resonator further includes a second inductor, the second inductor configured to resonate at the inductive mode resonant frequency in response to the inductive mode oscillating field generated by the first inductor; and in response to identifying the one or more parasitic loads, the first controller is configured to cause the first resonator to transfer at least some of the power via the first inductor and the second inductor.

11. The system of claim 1, wherein the one receiver includes a second controller and the second controller is configured to send feedback to the first controller via the wireless side-channel communications, the feedback confirming whether the receiver has received an intended amount of power from the transmitter.

12. The system of claim 11, wherein the feedback indicates that the receiver has not received the intended amount of power, and in response to the feedback, the first controller is configured to at least one of: (i) cause the transmitter to modify the power transferred from the first resonator to the second resonator, (ii) cause the first resonator to transfer at least some of the power via at least one of a common mode oscillating field, a differential mode oscillating field, or an inductive mode oscillating field, or (iii) cause at least one of a first impedance for the transmitter or a second impedance of the one receiver to be modified.

13. The system of claim 1, wherein the first resonator is further configured to transfer another amount of power to the second resonator, and the second communication interface is powered by the other amount of power to communicate data to the first controller via the wireless side-channel communications.

14. A transmitter for wireless power transfer, comprising:
a first resonator configured to receive power from a power source and to transfer the power, the first resonator including at least a first common mode capacitor formed between a first common mode conductor and ground, the first common mode capacitor configured to generate a common mode oscillating field at a common mode resonant frequency in response to receiving the power from the power source, the first resonator being further configured to be wirelessly coupled to a second resonator of a receiver to provide the power to the second resonator, the second resonator including at least a second common mode capacitor formed between a second common mode conductor and ground, the second common mode capacitor configured to resonate at the common mode resonant frequency in response to the common mode oscillating field generated by the first common mode capacitor;

a first communication interface configured to establish wireless side-channel communications with a second communication interface of the receiver and to communicate data with the receiver via the wireless side-channel communications; and a first controller configured to identify the receiver from a plurality of receivers according to the data communicated via the wireless side-channel communications, and upon identifying the receiver, the first controller being further configured to cause the first resonator to transfer the power to the second resonator, wherein at least one of the transmitter or the one receiver includes a bi-directional RF coupler, and the first controller is further configured to: (i) determine a measured response from the one receiver via the bi-directional RF coupler when the first resonator transfers the power to the second resonator, (ii) determine an expected response from a circuit model determined according to a nominal value for a second impedance for the receiver, and (iii) identify one or more parasitic loads by comparing the measured response to the expected response.

15. The transmitter of claim 14, wherein the first controller is pre-programmed to store the nominal value for the second impedance for the one receiver.

16. The transmitter of claim 14, wherein the first controller is configured to receive, from the receiver, the nominal value for the second impedance via the wireless side-channel communications.

17. The transmitter of claim 14, wherein in response to identifying the one or more parasitic loads, the first controller is configured to cause the first resonator to transfer the power to the second resonator according to at least one of: time-division or frequency division multiplexing at least to minimize the power transferred to the one or more parasitic loads.

18. The transmitter of claim 17, wherein the first controller is configured to communicate information regarding the multiplexing to the receiver via the wireless side-channel communications.

19. The transmitter of claim 17, wherein the first controller and the receiver are pre-programmed to store information regarding the multiplexing.

20. The transmitter of claim 14, wherein in response to identifying the one or more parasitic loads, the first controller is configured to at least one of: (i) cause the transmitter to modify the power transferred from the first resonator to the second resonator to account for the one or more parasitic loads, (ii) cause the first resonator to transfer at least some of the power via at least one of a common mode oscillating field, a differential mode oscillating field, or an inductive mode oscillating field, or (iii) cause at least one of a first impedance for the transmitter or the second impedance of the one receiver to be modified to account for the one or more parasitic loads.

21. The transmitter of claim 14, wherein in response to identifying the one or more parasitic loads, the first controller is configured to cause the first resonator to transfer at least some of the power via the first common mode capacitor and the second common mode capacitor.

22. The transmitter of claim 14, wherein the first resonator further includes a first differential mode capacitor formed between two first differential mode conductors, the first differential mode capacitor configured to generate a differential mode oscillating field at a differential mode resonant frequency in response to receiving the power from the power source, and in response to identifying the one or more parasitic loads, the first controller is configured to cause the first resonator to transfer at least some of the power via the first differential mode capacitor and a second differential mode capacitor included in the second resonator, the second differential mode capacitor formed between two second differential mode conductors, the second differential mode capacitor configured to resonate at the differential mode resonant frequency in response to the differential mode oscillating field generated by the first differential mode capacitor.

23. The transmitter of claim 14, wherein the first resonator further includes a first inductor, the first inductor configured to generate an inductive mode oscillating field at an inductive mode resonant frequency in response to receiving the power from the power source;

the second resonator further includes a second inductor, the second inductor configured to resonate at the inductive mode resonant frequency in response to the inductive mode oscillating field generated by the first inductor; and in response to identifying the one or more parasitic loads, the first controller is configured to cause the first resonator to transfer at least some of the power via the first inductor and the second inductor.

24. The transmitter of claim 14, wherein the first controller receives feedback from the receiver via the wireless side-channel communications, the feedback confirming whether the receiver has received an intended amount of power from the transmitter.

25. The transmitter of claim 24, wherein the feedback indicates that the receiver has not received the intended amount of power, and in response to the feedback, the first controller is configured to at least one of: (i) cause the transmitter to modify the power transferred from the first resonator to the second resonator, or (ii) cause the first resonator to transfer at least some of the power via at least one of a common mode oscillating field, a differential mode oscillating field, or an inductive mode oscillating field, or (iii) cause at least one of a first impedance for the transmitter or the second impedance of the one receiver to be modified to account for the one or more parasitic loads.

26. The transmitter of claim 14, wherein the first resonator is further configured to transfer another amount of power to the second resonator, and the second communication interface is powered by the other amount of power to communicate data to the first controller via the wireless side-channel communications.

27. A receiver for wireless power transfer, comprising:

a second resonator configured to be wirelessly coupled to a first resonator of a transmitter to receive power from the first resonator, the first resonator including at least a first common mode capacitor formed between a first common mode conductor and ground, the first common mode capacitor configured to generate a common mode oscillating field at a common mode resonant frequency in response to receiving the power from the power source, and the second resonator including at least a second common mode capacitor formed between a second common mode conductor and ground, the second common mode capacitor configured to resonate at the common mode resonant frequency in response to the common mode oscillating field generated by the first common mode capacitor; and a second communication interface configured to establish wireless side-channel communications with a first communication interface of the transmitter and to communicate data with the transmitter via the wireless side-channel communications, wherein the data communicated via the wireless side-channel communications identifies the receiver from a plurality of receivers for transfer of the power from the first resonator to the second resonator, at least one of the transmitter or the receiver includes a bi-directional RF coupler, the receiver includes a second impedance, and the transmitter is further configured to: (i) determine a measured response from the receiver via the bi-directional RF coupler when the first resonator transfers the power to the second resonator, (ii) determine an expected response from a circuit model determined according to a nominal value for the second impedance for the one receiver, and (iii) identify one or more parasitic loads by comparing the measured response to the expected response.

28. The receiver of claim 27, further comprising a second controller configured to communicate the nominal value for the second impedance to the first controller via the wireless side-channel communications.

29. The receiver of claim 27, wherein in response to the transmitter identifying the one or more parasitic loads, the second resonator is configured to receive the power from the first resonator according to at least one of: time-division or frequency division multiplexing at least to minimize the power transferred to the one or more parasitic loads.

30. The receiver of claim 29, wherein the receiver is configured to receive information from the transmitter regarding the multiplexing via the wireless side-channel communications.

31. The receiver of claim 29, wherein the receiver and the transmitter are pre-programmed to store the information regarding the multiplexing.

32. The receiver of claim 27, wherein in response to the transmitter identifying the one or more parasitic loads, the second resonator is configured to receive at least some of the power from the first resonator via the first common mode capacitor and the second common mode capacitor.

33. The receiver of claim 27, wherein the second resonator further includes a second differential mode capacitor formed between two second differential mode conductors, the second differential mode capacitor configured to resonate at a differential mode resonant frequency in response to a differential mode oscillating field generated by a first differential mode capacitor of the first resonator, the first differential mode capacitor being formed between two first differential mode conductors, and in response to the transmitter identifying the one or more parasitic loads, the second resonator is configured to receive at least some of the power from the first resonator via the first differential mode capacitor and the second differential mode capacitor.

34. The receiver of claim 27, wherein the second resonator further includes a second inductor, the second inductor configured to resonate at an inductive mode resonant frequency in response to an inductive mode oscillating field generated by a first inductor of the first resonator, and in response to the transmitter identifying the one or more parasitic loads, the second inductor is configured to receive at least some of the power from the first resonator via the first inductor and the second inductor.

35. The receiver of claim 27, wherein the receiver includes a second controller and the second controller is configured to send feedback to the transmitter via the wireless side-channel communications, the feedback confirming whether the receiver has received an intended amount of power from the transmitter.

36. The receiver of claim 27, wherein the feedback indicates that the receiver has not received the intended amount of power, and in response to the feedback the first controller is configured to at least one of: (i) cause the transmitter to modify the power transferred from the first resonator to the second resonator, or (ii) cause the first resonator to transfer at least some of the power via at least one of a common mode oscillating field, a differential mode oscillating field, or an inductive mode oscillating field, or (iii) cause at least one of a first impedance for the transmitter or the second impedance of the one receiver to be modified to account for the one or more parasitic loads.

37. The receiver of claim 27, wherein the second resonator is further configured to receive another amount of power from the first resonator and to provide the other amount of power to the second communication interface to communicate data to the first controller via the wireless side-channel communications.

* * * * *